United States Patent
Xiong et al.

(10) Patent No.: US 10,355,812 B2
(45) Date of Patent: Jul. 16, 2019

(54) MULTIPLE ACCESS METHOD, AND CORRESPONDING TRANSMISSION METHOD, RECEIVER AND TRANSMITTER

(71) Applicant: Samsung Electronics Co., Ltd., Suwon-si, Gyeonggi-do (KR)

(72) Inventors: Qi Xiong, Beijing (CN); Bin Yu, Beijing (CN); Chen Qian, Beijing (CN); Chengjun Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/425,239

(22) Filed: Feb. 6, 2017

(65) Prior Publication Data

US 2017/0230138 A1  Aug. 10, 2017

(30) Foreign Application Priority Data

Feb. 5, 2016  (CN) .......................... 2016 1 0082443
May 12, 2016  (CN) .......................... 2016 1 0319570

(51) Int. Cl.
| | | |
|---|---|---|
| *H04L 27/26* | (2006.01) | |
| *H04L 1/00* | (2006.01) | |
| *H04W 72/04* | (2009.01) | |
| *H04J 13/16* | (2011.01) | |

(52) U.S. Cl.
CPC .......... *H04L 1/0009* (2013.01); *H04L 1/0003* (2013.01); *H04L 1/005* (2013.01); *H04L 1/0041* (2013.01); *H04L 1/0048* (2013.01); *H04L 1/0071* (2013.01); *H04L 27/264* (2013.01); *H04W 72/042* (2013.01); *H04W 72/0446* (2013.01); *H04W 72/0453* (2013.01); *H04W 72/0473* (2013.01); *H04J 13/16* (2013.01); *H04L 2001/0093* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,188,717 B1* | 2/2001 | Kaiser | .................. | H04B 7/2628 375/148 |
| 7,848,708 B2* | 12/2010 | Matsumoto | ........... | H04L 1/0009 375/260 |
| 9,397,779 B2* | 7/2016 | Gaddam | ............... | H04L 1/0001 |
| 10,219,265 B2* | 2/2019 | You | ........................ | H04L 5/0048 |
| 2009/0028324 A1 | 1/2009 | Eroz et al. | | |

(Continued)

FOREIGN PATENT DOCUMENTS

WO  2015/197376 A1  12/2015

*Primary Examiner* — Linda Wong
(74) *Attorney, Agent, or Firm* — Jefferson IP Law, LLP

(57) ABSTRACT

The present disclosure relates to a pre-5th-Generation (5G) or 5G communication system to be provided for supporting higher data rates beyond 4th-Generation (4G) communication system such as Long Term Evolution (LTE). A transmission method for multiple access is provided. The transmission method including performing, by a transmitter, channel coding on a bit sequence to determine a coded sequence, performing, by the transmitter, symbol modulation on the coded sequence, performing, by the transmitter, grid mapping on the modulated symbol sequence to determine a mapped sequence, and transmitting the mapped sequence.

14 Claims, 52 Drawing Sheets

(56) References Cited

U.S. PATENT DOCUMENTS

| | | | |
|---|---|---|---|
| 2009/0122839 A1* | 5/2009 | Luo | H04B 1/70735 375/145 |
| 2011/0255635 A1* | 10/2011 | Lee | H04B 7/0413 375/295 |
| 2012/0147842 A1* | 6/2012 | Sato | H04W 72/08 370/329 |
| 2012/0147989 A1* | 6/2012 | Murakami | H04B 7/0413 375/295 |
| 2013/0072213 A1* | 3/2013 | Agrawal | H04W 72/1231 455/452.2 |
| 2013/0121295 A1* | 5/2013 | Saito | H04L 5/001 370/329 |
| 2013/0272248 A1* | 10/2013 | Hamaguchi | H04L 5/0044 370/329 |
| 2014/0023156 A1* | 1/2014 | Zhang | H04L 5/0048 375/260 |
| 2014/0133593 A1 | 5/2014 | Lim et al. | |
| 2015/0256295 A1* | 9/2015 | Nammi | H04L 1/1845 370/329 |
| 2015/0263825 A1* | 9/2015 | Kim | H04L 1/0042 375/260 |
| 2015/0289239 A1* | 10/2015 | Saito | H04L 5/001 370/329 |
| 2015/0382327 A1 | 12/2015 | Kishiyama et al. | |
| 2016/0014790 A1* | 1/2016 | Takehana | H04W 72/085 370/329 |
| 2016/0037516 A1* | 2/2016 | Seo | H04B 7/12 370/329 |
| 2017/0339713 A1* | 11/2017 | Kimura | H04W 24/10 |

* cited by examiner

FIG. 9
$\beta_1$ = {43, 67, 365, 430, 46, 208, 263, 277, ·····, 170, 199, 427, 360}
$\beta_2$ = {451, 500, 113, 220, 437, 359, 187, 214, ·····, 368, 262, 9, 17}
$\beta_3$ = {117, 469, 123, 290, 99, 305, 174, 428, ·····, 89, 397, 244, 435}
$\beta_4$ = {497, 34, 268, 175, 255, 67, 363, 152, ·····, 376, 173, 480, 140}
Transmitter 1 : $S_1$[43], $S_1$[67], 0, 0, $S_1$[46], $S_1$[208], 0, 0, ·····, $S_1$[170], $S_1$[199], 0, 0
+
Transmitter 2 : 0, 0, $S_2$[113], $S_2$[220], 0, 0, $S_2$[187], $S_2$[214], ·····, 0, 0, $S_2$[9], $S_2$[17]
+
Transmitter 3 : $S_3$[117], 0, $S_3$[123], 0, $S_3$[99], 0, $S_3$[174], 0, ·····, $S_3$[89], 0, $S_3$[244], 0
+
Transmitter 4 : 0, $S_4$[34], 0, $S_4$[175], 0, $S_4$[67], 0, $S_4$[152], ·····, 0, $S_4$[173], 0, $S_4$[140]
{$S_1$[43]+$S_3$[117]}, {$S_1$[67]+$S_2$[34]}, {$S_2$[113]+$S_3$[123]}, {$S_2$[220]+$S_2$[175]}, ······,
{$S_2$[9]+$S_3$[244]}, {$S_2$[17]+$S_4$[140]}

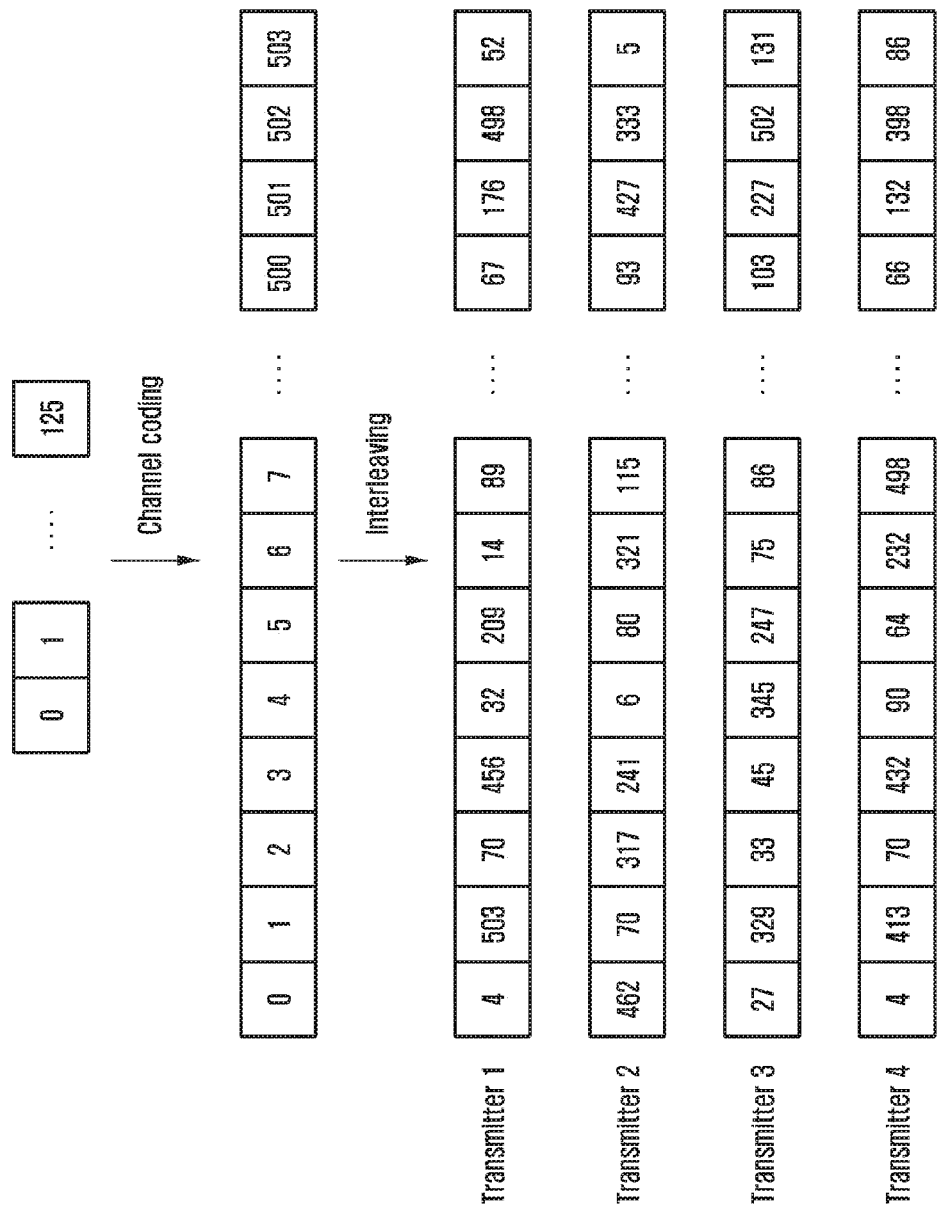

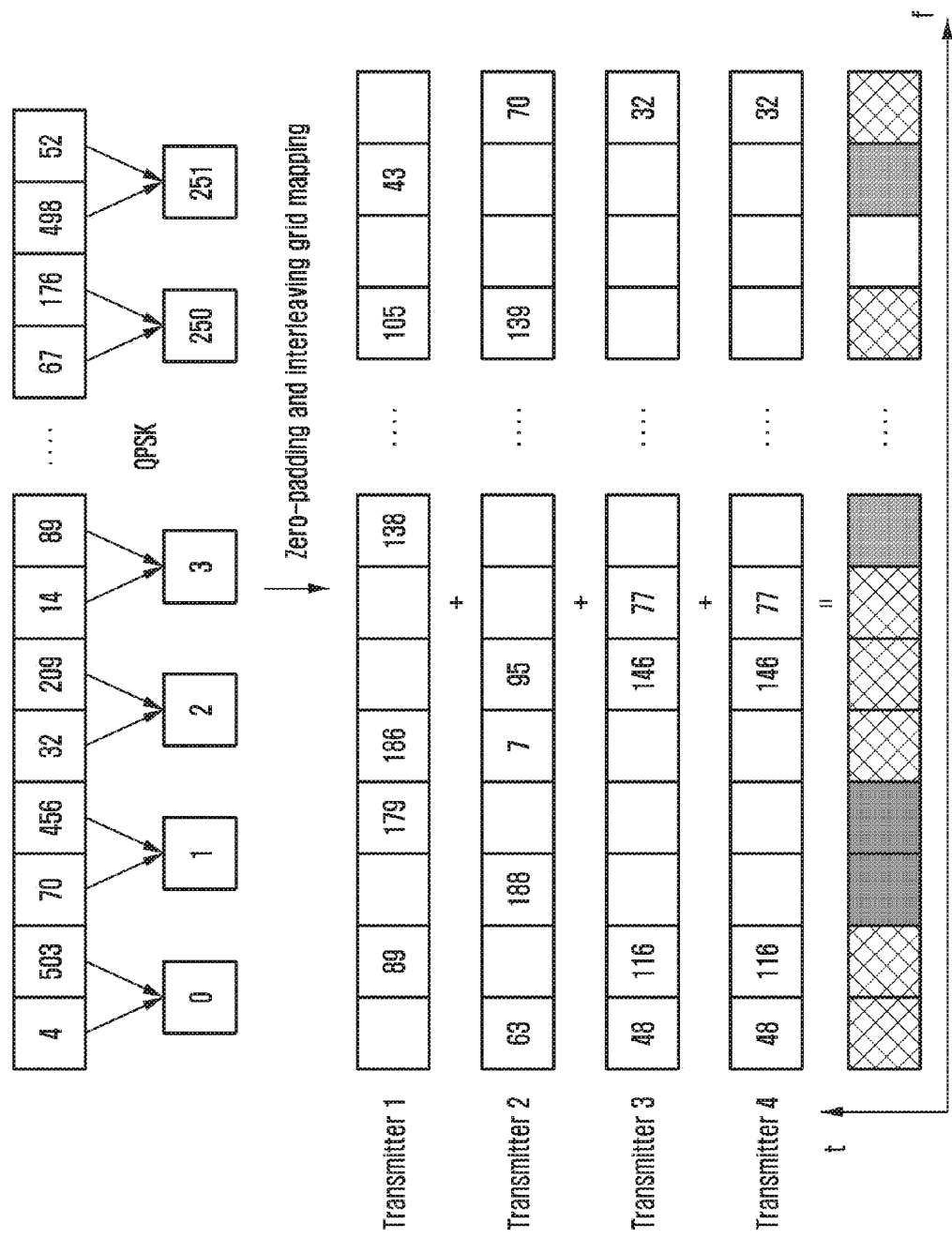

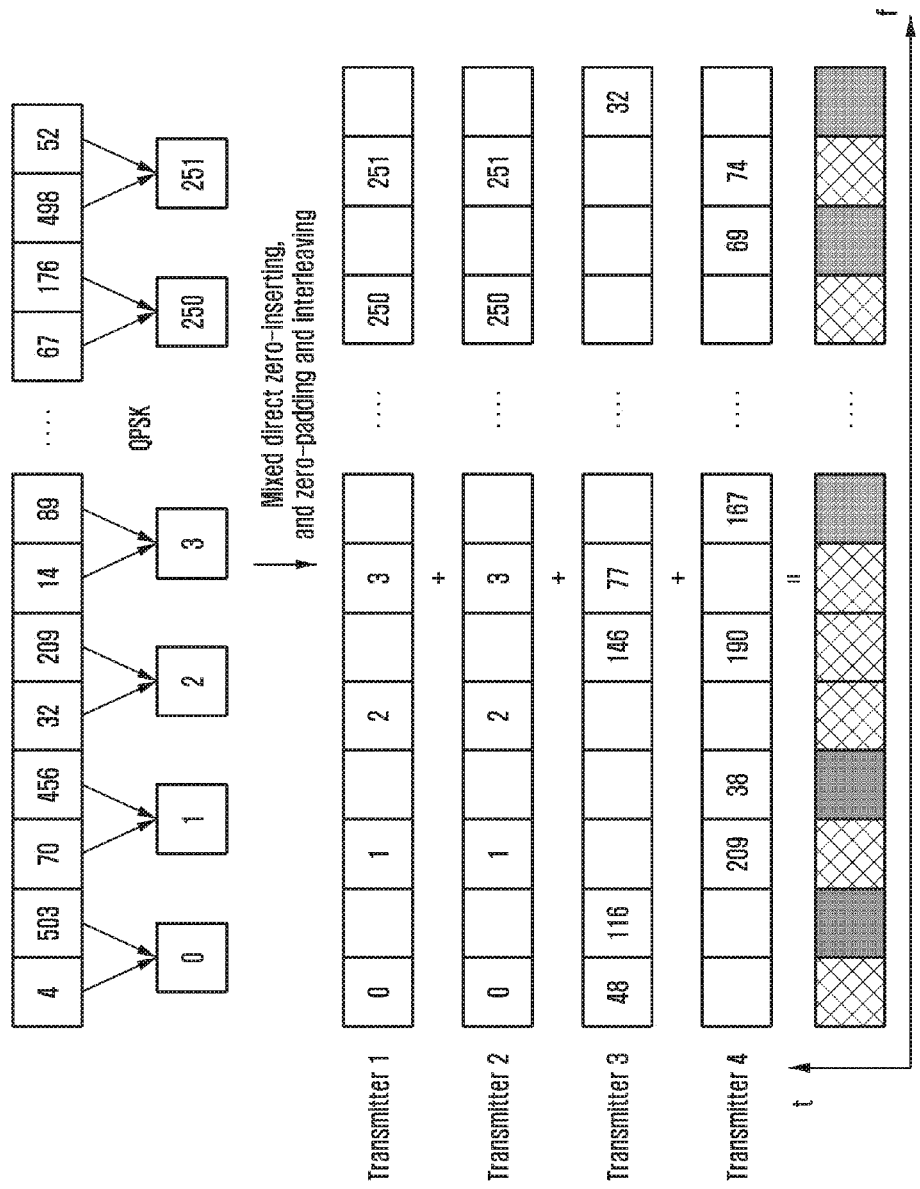

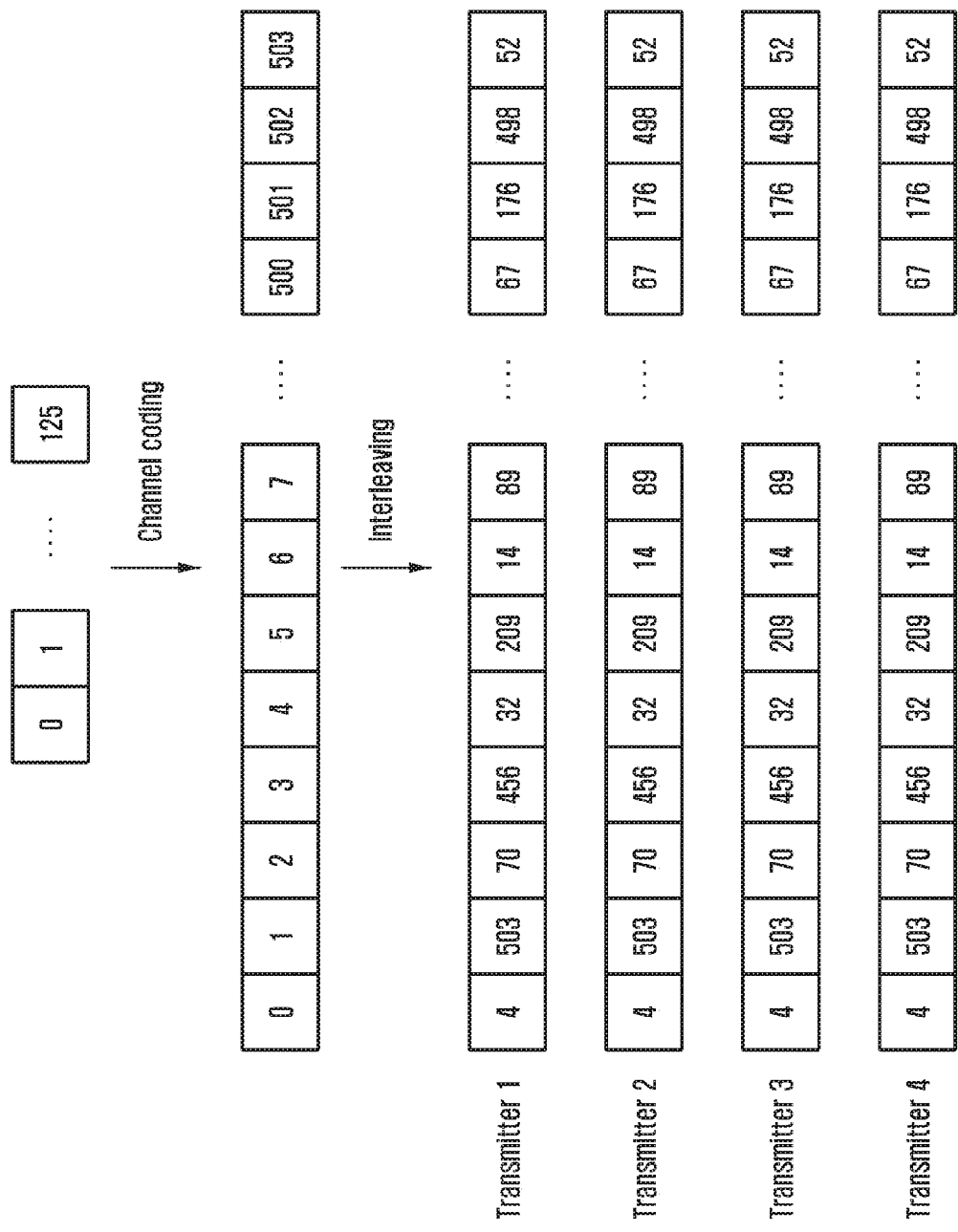

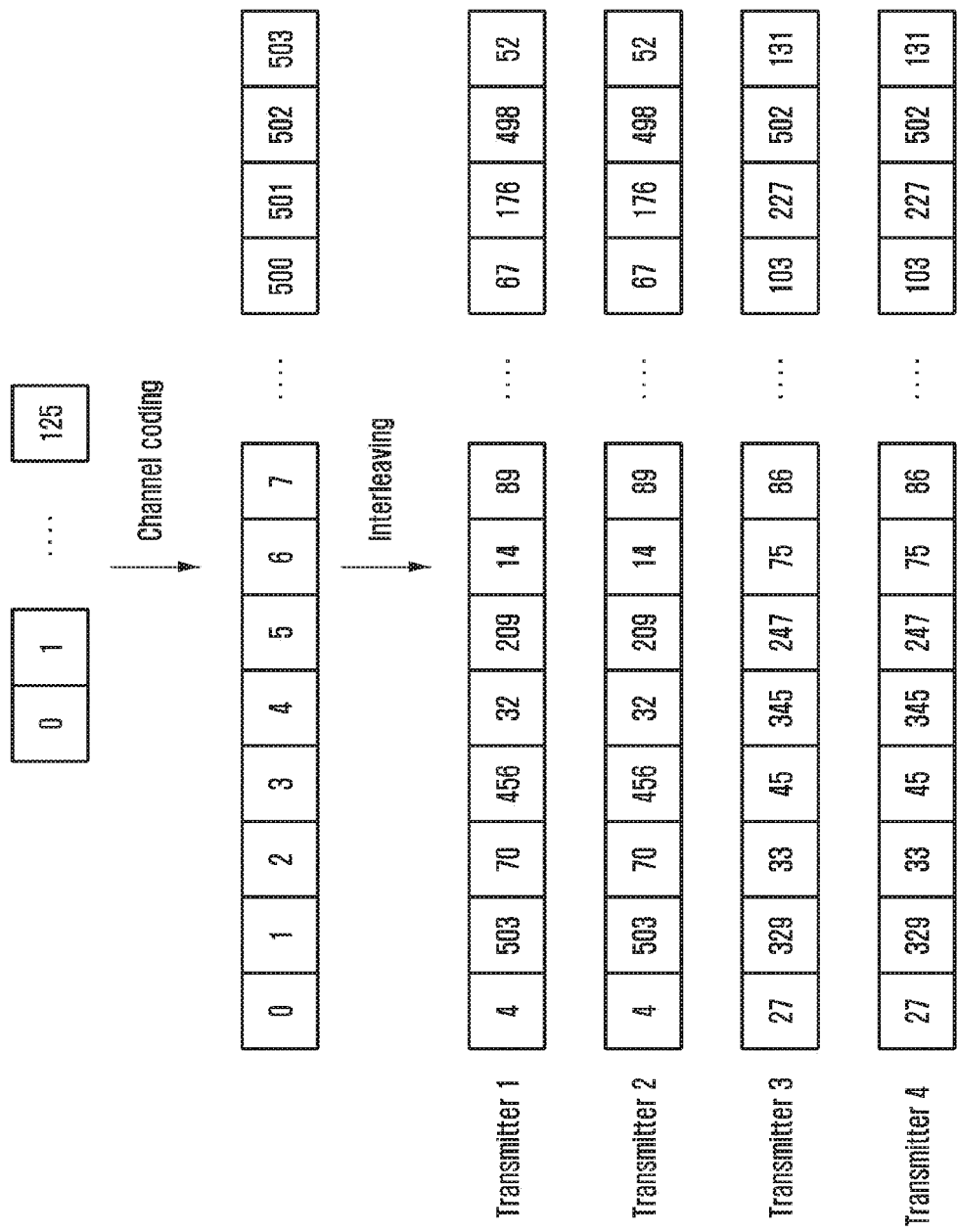

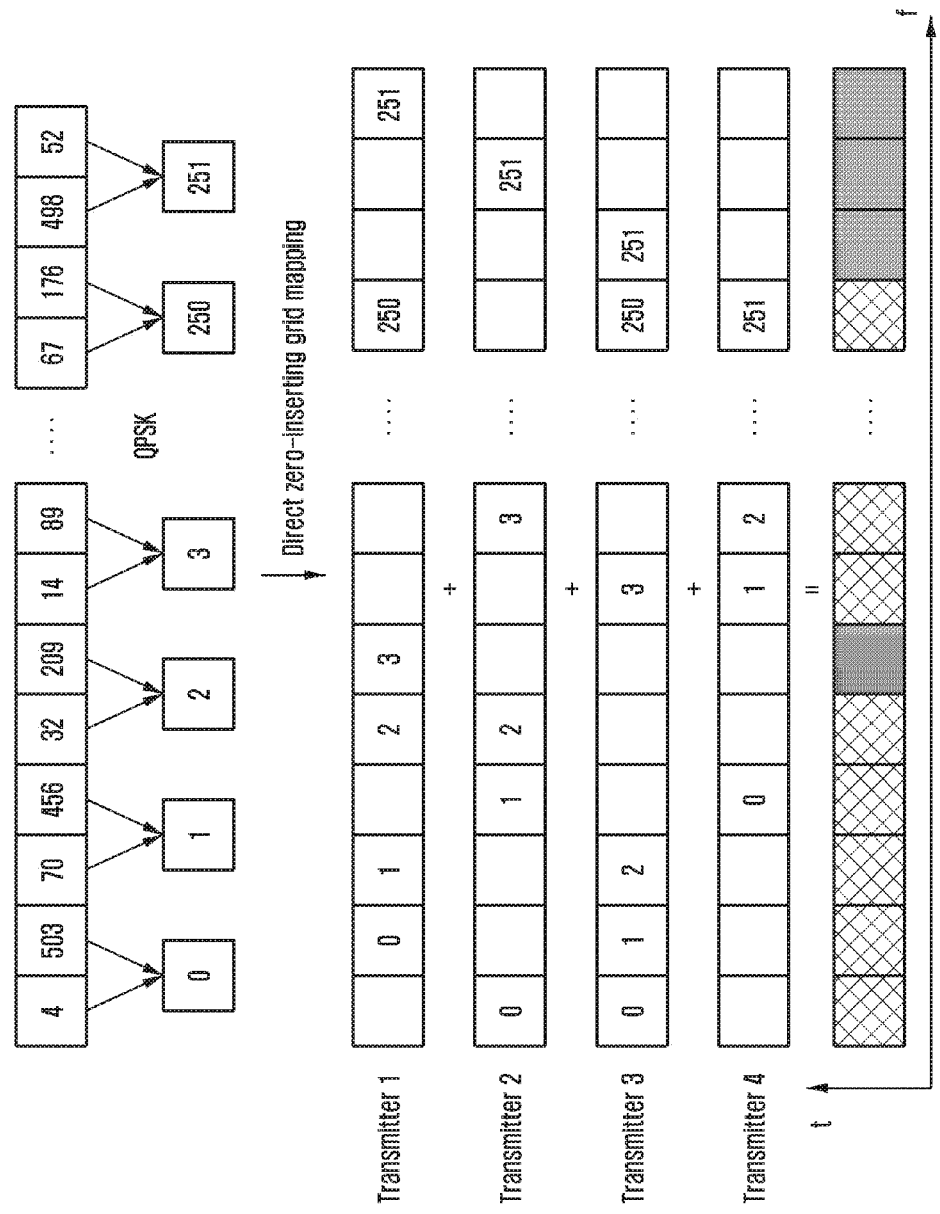

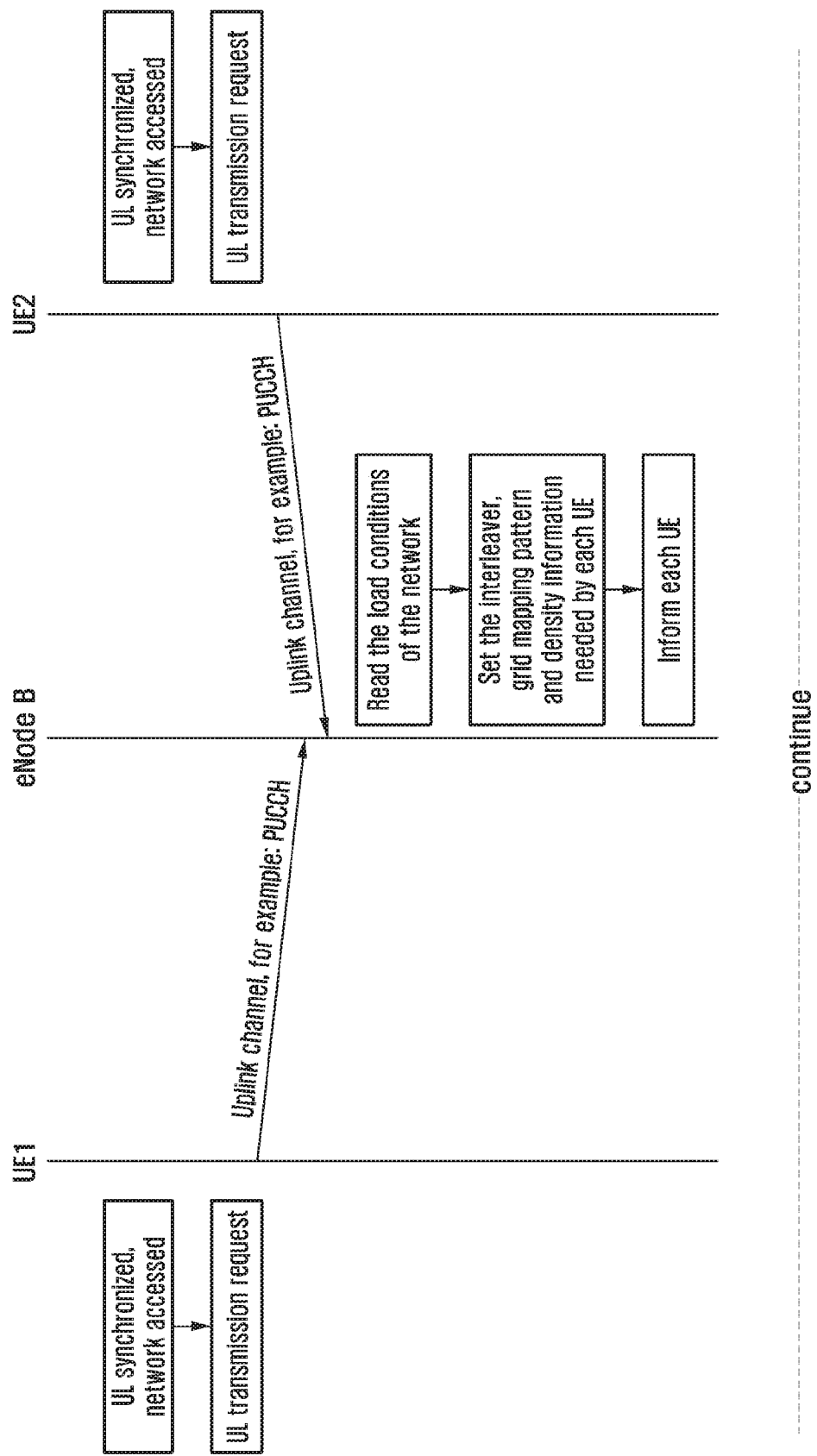

MULTIPLE ACCESS METHOD, AND CORRESPONDING TRANSMISSION METHOD, RECEIVER AND TRANSMITTER

CROSS-REFERENCE TO RELATED APPLICATION(S)

This application claims the benefit under 35 U.S.C. § 119(a) of a Chinese patent application filed on Feb. 5, 2016 in the State Intellectual Property Office and assigned Serial number 201610082443.9, and of a Chinese patent application filed on May 12, 2016 in the State Intellectual Property Office and assigned Serial number 201610319570.6, the entire disclosure of each of which is hereby incorporated by reference.

TECHNICAL FIELD

The present disclosure relates to the field of mobile communication. More particularly, the present disclosure relates to a multiple access method, a transmission method for multiple access, and a transmitter and a receiver for multiple access.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The rapid development of the information industry, particularly the increasing demand from the mobile Internet and the Internet of Things (IoT), brings about unprecedented challenges in the future mobile communications technology. According to the ITU-R M. [IMT.BEYOND 2020.TRAFFIC] issued by the International Telecommunication Union (ITU), it can be expected that, by 2020, mobile services traffic will grow nearly 1,000 times as compared with that in 2010 (4G era), and the number of user device connections will also be over 17 billion, and with a vast number of IoT devices gradually expand into the mobile communication network, the number of connected devices will be even more astonishing. In response to this unprecedented challenge, the communications industry and academia have prepared for the 2020s by launching an extensive study of the fifth generation of mobile communications technology (5G). Currently, in ITU-R M. [IMT.VISION] from ITU, the framework and overall objectives of the future 5G have been discussed, where the demands outlook, application scenarios and various important performance indexes of 5G have been described in detail. In terms of new demands in 5G, the ITU-R M. [IMT.FUTURE TECHNOLOGY TRENDS] from ITU provides information related to the 5G technology trends, which is intended to address prominent issues such as significant improvement on system throughput, consistency of the user experience, scalability so as to support IoT, delay, energy efficiency, cost, network flexibility, support for new services and flexible spectrum utilization, etc.

For more diverse business scenarios of 5G, the flexible multiple access technology is required to support various scenarios and business requirements. For example, for a business scenario with massive connections, how to allow more user equipments (UEs) to access in limited resources becomes a core problem to be solved in the 5G multiple access technology. In the present 4G LTE network, the orthogonal frequency division multiplexing (OFDM) based multiple access technologies are mainly employed, for example, downlink OFDM Access (OFDMA) and uplink single-carrier frequency division multiple access (SC-FDMA). However, obviously, the existing orthogonal multiple access technologies cannot meet the requirements of 5G in improving the spectrum efficiency by 5 to 15 times and having millions of UEs accessed per square kilometer. The non-orthogonal multiple access (NMA) technology can greatly increase the connection number of supported UEs since it shares the same resources to multiple UEs. Since there are more opportunities for UEs to access, the overall throughput of network and the spectrum efficiency are improved. In addition, for the massive machine type communication (mMTC) scenario, considering the cost of the terminal and the complexity in implementation, it may need to use more simply operated multiple access technologies. For business scenarios requiring low delay or low power consumption, the use of the non-orthogonal multiple access technology can better achieve scheduling-free and contention-based access and further low-delay communication, and can shorten the startup time and reduce the power consumption of the equipment.

The currently major non-orthogonal multiple access technologies in research are, multiple user shared access (MUSA), non-orthogonal multiple access (NOMA), pattern division multiple access (PDMA), sparse code multiple access (SCMA) and interleave division multiple access (IDMA) etc. For MUSA, UEs are distinguished by code words, for SCMA, UEs are distinguished by a codebook, for NOMA, UEs are distinguished by power, for PDMA, UEs are distinguished by different feature patterns, and for IDMA, different UEs are distinguished by interleaver. For details of IDMA, please refer to Li Ping, Lihai Liu, Keying Wu and W. K. Leung, "Interleave Division Multiple Access", IEEE Transactions on Wireless Communication, Vol. 5, No. 4, pp. 938-947, April 2006.

Accordingly, it is necessary to provide an effective multiple access implementation scheme, to better achieve scheduling-free contention-based access, low-delay communication, short startup time, low power consumption of the equipment and more, thus to ultimately support more diverse business scenarios and business requirements of 5G.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below.

In accordance with an aspect of the present disclosure, a transmission method for multiple access is provided. The method includes performing, by a transmitter, channel coding on a bit sequence to determine a coded sequence, performing by the transmitter, symbol modulation on the coded sequence, performing, by the transmitter, grid mapping on the modulated symbol sequence to determine a mapped sequence, and transmitting the mapped sequence.

Preferably, the method of performing channel coding includes but is not limited to performing channel coding by one component code or by multiple concatenated component codes.

Preferably, the component code includes at least any one type of a Turbo code, a low density parity check code, a repetition code, and a spreading code.

Preferably, performing symbol modulation on the coded sequence includes performing interleaving on the coded sequence and performing symbol modulation on the interleaved sequence.

Preferably, performing interleaving on the coded sequence in at least one of the following ways, performing interleaving on the coded sequence by interleaving pattern information, or performing interleaving on the coded sequence by scrambling code information, wherein the transmitter acquires the interleaving pattern information or scrambling code information by any one of a physical broadcast channel, a physical downlink control channel, and a physical downlink shared channel.

Preferably, the method of performing symbol modulation includes but is not limited to constellation modulation, or waveform modulation. The constellation modulation at least includes quadrature amplitude modulation or phase shift keying modulation, and the waveform modulation at least includes frequency shift keying modulation.

Preferably, the performing of grid mapping on the modulated symbol sequence includes performing grid mapping on the modulated symbol sequence by grid mapping pattern information.

Preferably, performing grid mapping on the modulated symbol sequence includes at least one of the following ways performing grid mapping on the overall modulated symbol sequence together, and performing segmenting on the modulated symbol sequence and successively performing grid mapping on the modulated symbol sequence segments obtained by the segmentation.

Preferably, the method of performing the grid mapping includes any one of zero-padding and interleaving grid mapping, direct zero-inserting grid mapping, interleaving and zero-inserting grid mapping, interleaving grid mapping, direct grid mapping, codebook grid mapping, and codebook interleaving grid mapping.

Preferably, the zero-padding and interleaving grid mapping is to perform zero-padding and interleaving on the symbol sequence according to grid mapping pattern information and perform resource mapping on the zero-padded and interleaved sequence, the direct zero-inserting grid mapping is to perform zero-inserting on the symbol sequence according to grid mapping pattern information, and perform resource mapping on the zero-inserted sequence, the interleaving and zero-inserting grid mapping is to perform interleaving on the symbol sequence according to grid mapping pattern information, generate an interleaved sequence, and perform zero-inserting on the interleaved sequence according to the grid mapping pattern information, the interleaving grid mapping is to perform interleaving on the symbol sequence according to grid mapping pattern information, and perform resource mapping on the interleaved sequence, the direct grid mapping is to perform resource mapping on the symbol sequence according to grid mapping pattern information, the codebook grid mapping is to perform codebook mapping on the symbol sequence according to a codebook contained in the grid mapping pattern information, and perform resource mapping on the codebook mapped sequence, and the codebook interleaving grid mapping is to perform codebook mapping on the symbol sequence according to a codebook contained in the grid mapping pattern information, perform interleaving on the codebook mapped symbol sequence according to a symbol-level interleaving pattern contained in the grid mapping pattern information, and finally perform resource mapping on the interleaved sequence, or the codebook interleaving grid mapping is to perform interleaving on the symbol sequence according to a symbol-level interleaving pattern contained in the grid mapping pattern information, then perform codebook mapping on the interleaved symbol sequence according to a codebook contained in the grid mapping pattern information, and perform resource mapping on the mapped sequence.

Preferably, the transmitter acquires the interleaving pattern information in a method, including but not limited to any one of a physical broadcast channel, a physical downlink control channel, and a physical downlink shared channel.

Preferably, a grid mapping pattern of a corresponding size and/or a corresponding density is selected according to the method of channel coding and the method of symbol modulation employed by the transmitter as well as the size of time-frequency resources allocated to the transmitter.

Preferably, the power for the symbol modulation is determined by the total power allocated to the transmitter and the density of the grid mapping pattern.

Preferably, the density of the grid mapping pattern is determined by the ratio of the number of non-zero values or the number of non-idle resources in the grid mapping pattern information and the total number of time-frequency resources allocated to the transmitter.

Preferably, the grid mapping pattern information includes the density of the grid mapping pattern.

Preferably, the transmitter acquires total power allocated thereto in a method including but not limited to any one of a physical broadcast channel, a physical downlink control channel, and a physical downlink shared channel.

Optionally, the method further includes by a transmitter, transmitting, by the transmitter, a density adjustment request of the grid mapping pattern and/or uplink channel state information, for the receiver adjusting, according to the received density adjustment request of the grid mapping pattern, uplink channel state information, the grid mapping pattern information, interleaving pattern information, scrambling code information, the method of channel coding and/or the method of symbol modulation employed by the transmitter.

In accordance with another aspect of the present disclosure, a multiple access method is provided. The multiple access method includes receiving, by a receiver, a mixed signal from multiple transmitters, the mixed signal being a signal obtained by performing grid mapping on data or a signal obtained by performing interleaving and grid mapping on data in each transmitter, and decoding, by the receiver, the mixed signal according to grid mapping pattern information corresponding to each of the transmitters or according to interleaving pattern information or scrambling code information and grid mapping pattern information corresponding to each of the transmitters, to obtain data from each transmitter.

Preferably, decoding the mixed signal according to grid mapping pattern information corresponding to each of the transmitters or according to interleaving pattern information or scrambling code information and grid mapping pattern information corresponding to each of the transmitters to obtain data from each of the transmitters includes performing de-mapping on the mixed signal by using grid mapping pattern information corresponding to each of the transmitters, or performing de-mapping on the mixed signal by using grid mapping pattern information corresponding to each of the transmitters, and performing de-interleaving on the de-mapped data by using interleaving pattern information or scrambling code information corresponding to each of the transmitters.

Preferably, the method of decoding the mixed signal includes performing grid de-mapping and de-interleaving, by the receiver, on the mixed signal according to same grid mapping pattern information and mutually different interleaving pattern information or scrambling code information corresponding to each of the transmitters, performing grid de-mapping and de-interleaving, by the receiver, on the mixed signal according to mutually different grid mapping pattern information and same interleaving pattern information or scrambling code information corresponding to each of the transmitters, or performing grid de-mapping and de-interleaving, by the receiver, on the mixed signal according to mutually different combinations of grid mapping pattern information and interleaving pattern information or scrambling code information corresponding to each of the transmitters.

Preferably, the receiver performs de-interleaving on the de-mapped data according to mutually different interleaving pattern information or scrambling code information, if the mixed signal is a signal received by the receiver and obtained by performing, by each of the transmitters, interleaving according to mutually different interleaving pattern information or scrambling code information and grid mapping on data to be transmitted, the receiver performs grid de-mapping on the mixed signal according to mutually different grid mapping pattern information, if the mixed signal is a signal received by the receiver and obtained by performing, by each of the transmitters, grid mapping on the interleaved data according to mutually different grid mapping pattern information, and the receiver performs grid de-mapping and de-interleaving on the mixed signal according to mutually different combinations of interleaving pattern information or scrambling code information and grid mapping pattern information, if the mixed signal is a signal received by the receiver and obtained by performing, by each of the transmitters, interleaving and grid mapping on data to be transmitted according to mutually different combinations of interleaving pattern information or scrambling code information and grid mapping pattern information.

Preferably, the mutually different combinations of interleaving pattern information or scrambling code information and grid mapping pattern information specifically include but are not limited to any one combination method of the interleaving pattern information or scrambling code information is the same while the grid mapping pattern information is mutually different, the interleaving pattern information or scrambling code information is mutually different while the grid mapping pattern information is the same, and the interleaving pattern information or scrambling code information is mutually different and the grid mapping pattern information is mutually different.

Preferably, the multiple data obtained by performing, by the receiver, grid de-mapping and de-interleaving on the mixed signal according to the mutually different combinations of interleaving pattern information or scrambling code information and grid mapping pattern information corresponding to each of the transmitters, are mutually different.

Preferably, the receiver determines interleaving pattern information or scrambling code information and grid mapping pattern information employed by the multiple transmitters according to network load.

Preferably, determining interleaving pattern information or scrambling code information and grid mapping pattern information employed by the multiple transmitters according to network load includes but is not limited to any one situation of determining that the multiple transmitters employ mutually different interleaving pattern information or scrambling code information or mutually different grid mapping pattern information, when the network load is lower than or equal to a preset threshold, and determining that the multiple transmitters employ the mutually different combinations of interleaving pattern information or scrambling code information and grid mapping pattern information, when the network load is higher than the preset threshold.

Preferably, the receiver adjusts, according to the density adjustment request of the grid mapping pattern and/or uplink channel state information from the receiver, the grid mapping pattern or scrambling code information and the grid mapping pattern information employed by the transmitter.

Preferably, the mixed signal is a signal received by the receiver and obtained by performing, by each of the transmitters, multi-carrier modulation or single-carrier modulation on the respective grid-mapped data and performing baseband-to-RF process on the carrier-modulated data.

Preferably, the receiver performs RF-to-baseband process on the received mixed signal, and demodulates the converted data in a method of multi-carrier modulation or single-carrier modulation corresponding to each of the transmitters.

Preferably, the method of performing multi-carrier modulation includes orthogonal frequency division multiplexing multi-carrier modulation, filtering-based orthogonal frequency division multiplexing multi-carrier modulation, filter-bank multi-carrier modulation, or universal-filtered multi-carrier modulation, and the single-carrier modulation at least includes single-carrier frequency division multiple access modulation.

Optionally, the method further includes a signal from a same transmitter is received by the receiver, and the signal is obtained by performing interleaving and grid mapping or performing grid mapping on multiple data streams from the same transmitter, and the signal is decoded according to interleaving pattern information or scrambling code information and grid mapping pattern information corresponding to each of the data streams, to obtain the multiple data streams from the same transmitter.

Preferably, the receiver performs de-interleaving on the de-mapped data according to mutually different interleaving pattern information or scrambling code information, if the signal received by the receiver is obtained by performing, on the multiple data streams from the same transmitter, interleaving by use of mutually different interleaving pattern information or scrambling code information and grid mapping, the receiver performs grid de-mapping on the received signal according to mutually different grid mapping pattern information, if the signal received by the receiver is obtained by performing grid mapping on the interleaved data of the multiple data streams from the same transmitter by use of mutually different grid mapping pattern, and the receiver performs de-interleaving and grid de-mapping on the received data according to mutually different combinations of interleaving pattern information or scrambling code information and grid mapping pattern information, if the signal received by the receiver is obtained by performing interleaving and grid mapping on the multiple data streams from the same transmitter by use of the mutually different combinations of interleaving pattern information or scrambling code information and grid mapping pattern information.

Preferably, the signal received by the receiver is obtained by performing, on the multiple data streams from the same transmitter, interleaving and grid mapping or performing grid mapping, and then phase and power adjustment.

Preferably, the receiver performs grid de-mapping on a signal of the multiple data streams from the same transmitter according to mutually different grid mapping pattern information, when the receiver performs de-interleaving on the de-mapped data from the multiple transmitters according to mutually different interleaving pattern information or scrambling code information, the receiver performs de-interleaving on the de-mapped data of the multiple data streams from the same transmitter according to mutually different interleaving pattern information or scrambling code information, when the receiver performs grid de-mapping on a mixed signal from the multiple transmitters according to mutually different grid mapping pattern information.

Preferably, the receiver performs grid de-mapping and de-interleaving on a signal of the multiple data streams from different transmitters according to mutually different combinations of interleaving pattern information or scrambling code information and grid mapping pattern information.

In accordance with another embodiment of the present disclosure, a transmitter for multiple access is provided. The transmitter includes a coding module, configured to perform channel coding on a bit sequence to determine a coded sequence, a modulation module, configured to perform symbol modulation on the coded sequence, and a mapping module, configured to perform grid mapping on the modulated symbol sequence to determine the mapped sequence and transmit the mapped sequence.

In accordance with another aspect of the present disclosure, a receiver for multiple access is provided. The receiver includes a receiving module, configured to receive a mixed signal from multiple transmitters, the mixed signal being a signal obtained by performing grid mapping on data or a signal obtained by performing interleaving and grid mapping on data by each of the multiple transmitters, and a decoding module, configured to decode the mixed signal according to grid mapping pattern information corresponding to each of the transmitters or according to interleaving pattern information or scrambling code information and grid mapping pattern information corresponding to each of the transmitters.

The present disclosure proposes a non-orthogonal multiple access. In comparison with the conventional code division multiple access (CDMA), the present disclosure utilizes the mutually different interleaving patterns or scrambling code information and/or grid mapping patterns to decode the data from different transmitters and distinguish the transmitters, and also avoid the limitation of orthogonal code resources. Further, the data transmission rate of transmitters can be flexibly configured by assigning different grid mapping patterns. Meanwhile, the grid mapping can map a symbol sequence onto all or part of the time-frequency resources. This facilitates the multiplexing of same time-frequency resources to the multiple transmitters, increases the number of served transmitters, and meanwhile combats interference and fading during the transmission through the channels.

The above embodiments as provided in the present disclosure make minor modification to the existing systems, and hence will not influence the system compatibility. Moreover, the implementations of these embodiments as provided are both simple and highly efficient.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9 is a diagram of the grid mapping pattern design through zero-padding and interleaving based on specific requirements according to an embodiment of the present disclosure;

FIG. 18 is a diagram of generation of different interleaving patterns by a transmitter according to an embodiment of the present disclosure;

FIGS. 19A, 19B and 19C are diagrams of various grid mapping implementations according to various embodiments of the present disclosure;

FIGS. 20A and 20B are diagrams of scenarios in which a same or different interleaving pattern is used by multiple transmitters according to an embodiment of the present disclosure;

FIGS. 21A, 21B and 21C are diagrams of various grid mapping implementations according to an embodiment of the present disclosure;

FIGS. 33A and 33B is a schematic flowchart of configuring interleaving pattern information and grid mapping pattern information by a base station according to an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
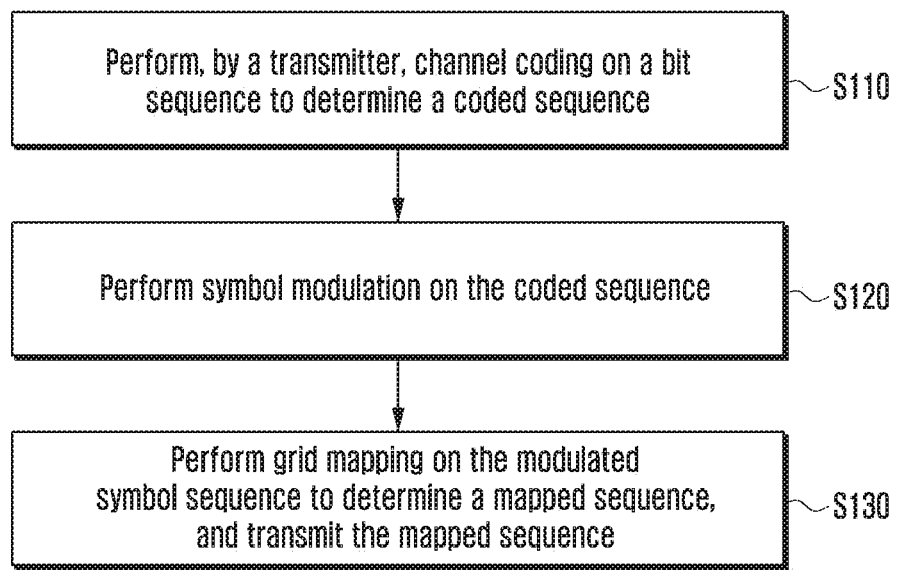
FIG. 1 is a schematic flow diagram of a transmission method for multiple access according to an embodiment of the present disclosure.

FIG. 1 is a schematic flow diagram of a transmission method for multiple access according to an embodiment of the present disclosure.

Referring to FIG. 1, in operation S110 a transmitter, performs channel coding on a bit sequence to determine a coded sequence. In operation S120, perform symbol modulation on the coded sequence. In operation S130, perform grid mapping on the modulated symbol sequence to determine a mapped sequence, and transmit the mapped sequence.

The method of performing channel coding includes but is not limited to performing channel coding by one component code or by multiple concatenated component codes.

The component code includes at least any one type of a Turbo code, a low density parity check code, a repetition code, and a spreading code.

In operation S120, perform interleaving on the coded sequence, and perform symbol modulation on the interleaved sequence.

Specifically, perform interleaving on the coded sequence by interleaving pattern information, or perform interleaving on the coded sequence by scrambling code information.

It is to be noted that, in the present disclosure, performing interleaving on the coded sequence is implemented by any one of performing interleaving by interleaving pattern information or performing interleaving by scrambling code information. With regard to performing interleaving on the coded sequence by interleaving pattern information, only the order of the coded sequence is changed by the interleaving pattern information, without changing the data of the coded sequence. With regard to performing interleaving on the coded sequence by scrambling code information, the data of the coded sequence will be changed on the basis of the scrambling code information.

The transmitter acquires the interleaving pattern information or scrambling code information in a method, including but not limited to any one of a physical broadcast channel, a physical downlink control channel, and a physical downlink shared channel.

The method of performing symbol modulation includes but is not limited to constellation modulation, or waveform modulation.

The constellation modulation at least includes but is not limited to quadrature amplitude modulation (QAM) or phase shift keying (PSK) modulation, and the waveform modulation at least includes but is not limited to frequency shift keying (FSK) modulation.

Specifically, in operation S130, perform grid mapping on the modulated symbol sequence by grid mapping pattern information. Perform grid mapping on the modulated symbol sequence by grid mapping pattern information in at least one of performing grid mapping on the overall modulated symbol sequence together, and performing segmenting on the modulated symbol sequence, and successively performing grid mapping on the modulated symbol sequence segments obtained by the segmentation.

The method of performing grid mapping includes but is not limited to any one of zero-padding and interleaving grid mapping, direct zero-inserting grid mapping, interleaving and zero-inserting grid mapping, interleaving grid mapping, direct grid mapping, codebook grid mapping, and codebook interleaving grid mapping.

Specifically, the zero-padding and interleaving grid mapping is to perform zero-padding and interleaving on the symbol sequence according to grid mapping pattern information and perform resource mapping on the zero-padded and interleaved sequence.

Specifically, the direct zero-inserting grid mapping is to perform zero-inserting on the symbol sequence according to grid mapping pattern information, and perform resource mapping on the zero-inserted sequence.

Specifically, the interleaving and zero-inserting grid mapping is to perform interleaving on the symbol sequence according to grid mapping pattern information, generate an interleaved sequence, and perform zero-inserting on the interleaved sequence according to the grid mapping pattern information.

Specifically, the interleaving grid mapping is to perform interleaving on the symbol sequence according to grid mapping pattern information, and perform resource mapping on the interleaved sequence.

Specifically, the direct grid mapping is to perform resource mapping on the symbol sequence according to the grid mapping pattern information.

Specifically, the codebook grid mapping is to perform codebook mapping on the symbol sequence according to a codebook contained in the grid mapping pattern information, and perform resource mapping on the codebook mapped sequence.

Specifically, the codebook interleaving grid mapping is to perform codebook mapping on the symbol sequence according to a codebook contained in the grid mapping pattern information, then perform interleaving on the codebook mapped symbol sequence according to a symbol-level interleaving pattern contained in the grid mapping pattern information, and finally perform resource mapping on the interleaved sequence, or the codebook interleaving grid mapping is to perform interleaving on the symbol sequence according to a symbol-level interleaving pattern contained in the grid mapping pattern information, then perform codebook mapping on the interleaved symbol sequence according to a codebook contained in the grid mapping pattern information, and finally perform resource mapping on the mapped sequence.

The transmitter acquires the grid mapping pattern information in a method including but not limited to any one of a physical broadcast channel, a physical downlink control channel, and a physical downlink shared channel.

Preferably, a grid mapping pattern of a corresponding size and/or a corresponding density is selected according to the method of channel coding and the method of symbol modulation employed by the transmitter as well as the size of time-frequency resources allocated to the transmitter.

Preferably, the power for the symbol modulation is determined by the total power allocated to the transmitter and the density of the grid mapping pattern.

Preferably, the density of the grid mapping pattern is determined by a ratio of the number of non-zero values or the number of non-idle resources in grid mapping pattern to the total number of time-frequency resources allocated to the transmitter.

Preferably, the grid mapping pattern information includes the density of a grid mapping pattern.

The transmitter acquires total power allocated thereto in a method including but not limited to any one of a physical broadcast channel, a physical downlink control channel, and a physical downlink shared channel.

Preferably, a transmitter transmits a density adjustment request of the grid mapping pattern and/or uplink channel state information, for the receiver adjusting, according to the received density adjustment request of the grid mapping pattern and/or uplink channel state information, the grid mapping pattern information and/or interleaving pattern information and/or scrambling code information and/or the method of channel coding and/or the method of symbol modulation employed by the transmitter.

Figure 2:
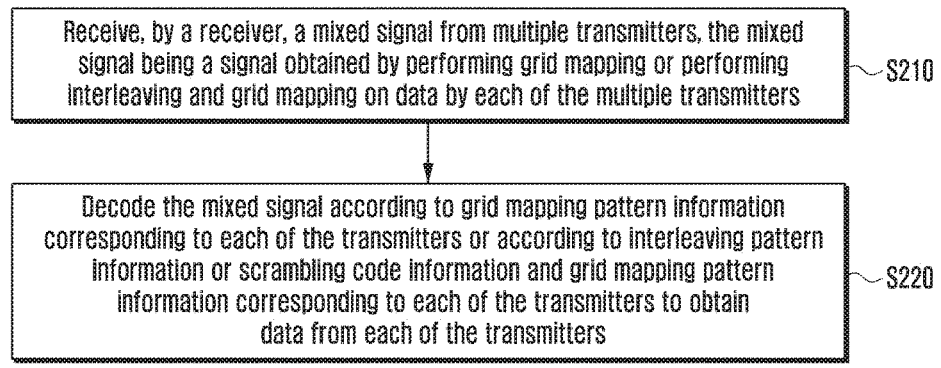
FIG. 2 is a schematic flow diagram of a multiple access method according to an embodiment of the present disclosure.

FIG. 2 is a schematic flow diagram of a multiple access method according to an embodiment of the present disclosure.

Referring to FIG. 2, a method includes operations S210 and S220. In operation S210 a receiver receives a mixed signal from multiple transmitters, and the mixed signal is a signal obtained by performing grid mapping on data or a signal obtained by performing interleaving and grid mapping on data by each of the multiple transmitters. In operation S220 the mixed signal is decoded according to grid mapping pattern information corresponding to each of the transmitters or according to interleaving pattern information or scrambling code information and grid mapping pattern information corresponding to each of the transmitters.

Preferably, operation S220 specifically includes any one of the mixed signal is de-mapped by using grid mapping pattern information corresponding to each of the transmitters, or perform de-mapping on the mixed signal by using grid mapping pattern information corresponding to each of the transmitters, and perform de-interleaving on the de-mapped data by using interleaving pattern information or scrambling code information corresponding to each of the transmitters.

The method of decoding the mixed signal includes but is not limited to any one of performing grid de-mapping and de-interleaving, by the receiver, on the mixed signal respectively according to same grid mapping pattern information and mutually different interleaving pattern information or scrambling code information corresponding to each of the transmitters, performing grid de-mapping and de-interleaving, by the receiver, on the mixed signal respectively according to mutually different grid mapping pattern information and same interleaving pattern information or scrambling code information corresponding to each of the transmitters, and performing grid de-mapping and de-interleaving, by the receiver, on the mixed signal respectively according to mutually different combinations of grid mapping pattern information and interleaving pattern information or scrambling code information corresponding to each of the transmitters.

Preferably, the receiver performs de-interleaving on the de-mapped data according to mutually different interleaving pattern information or scrambling code information, if the mixed signal is a signal received by the receiver and performing, by each of the transmitters, interleaving according to mutually different interleaving pattern information or scrambling code information and grid mapping on data to be transmitted.

Preferably, the receiver performs grid de-mapping on the mixed signal according to mutually different grid mapping pattern information, if the mixed signal is a signal received by the receiver and obtained by performing, by each of the transmitters, grid mapping on the interleaved data according to mutually different grid mapping pattern information.

Preferably, the receiver performs grid de-mapping and de-interleaving on the mixed signal according to mutually different combinations of interleaving pattern information or scrambling code information and grid mapping pattern information, if the mixed signal is a signal received by the receiver and obtained by performing, by each of the transmitters, interleaving and grid mapping on data to be transmitted according to mutually different combinations of interleaving pattern information or scrambling code information and grid mapping pattern information.

The mutually different combinations of interleaving pattern information or scrambling code information and grid mapping pattern information specifically include but are not limited to any one combination method of the interleaving pattern information or scrambling code information is the same while the grid mapping pattern information is mutually different, the interleaving pattern information or scrambling code information is mutually different while the grid mapping pattern information is the same, and the interleaving pattern information or scrambling code information is mutually different and the grid mapping pattern information is mutually different.

The decoded data obtained by performing, by the receiver, grid de-mapping and de-interleaving on the mixed signal according to the mutually different combinations of interleaving pattern information or scrambling code information and grid mapping pattern information corresponding to each of the transmitters, are mutually different.

Preferably, the receiver determines interleaving pattern information or scrambling code information and grid mapping pattern information employed by the multiple transmitters according to network load.

Determining interleaving pattern information or scrambling code information and grid mapping pattern information employed by the multiple transmitters according to network load specifically includes but is not limited to any one situation of determining that the multiple transmitters employ mutually different interleaving pattern information or scrambling code information or mutually different grid mapping pattern information, when the network load is lower than or equal to a preset threshold, and determining that the multiple transmitters employ the mutually different combinations of interleaving pattern information or scrambling code information and grid mapping pattern information, when the network load is higher than the preset threshold.

Preferably, the receiver adjusts, according to the density adjustment request of the grid mapping pattern and/or uplink channel state information from the receiver, the interleaving pattern or scrambling code information and the grid mapping pattern information employed by the transmitter.

Preferably, the mixed signal is a signal received by the receiver and obtained by performing, by each of the transmitters, multi-carrier modulation or single-carrier modulation on the respective grid-mapped data and performing baseband-to-RF process on the carrier-modulated data.

More preferably, the receiver performs RF-to-baseband process on the received mixed signal, and demodulates the converted data in a method of multi-carrier modulation or single-carrier modulation corresponding to each of the transmitters.

The method of performing multi-carrier modulation includes but is not limited to at least any one of orthogonal frequency division multiplexing (OFDM) multi-carrier modulation, filtering-based OFDM (F-OFDM) multi-carrier modulation, filter-bank multi-carrier modulation (FBMC), and universal-filtered multi-carrier (UFMC) modulation. The single-carrier modulation at least includes single-carrier frequency division multiple access (SC-FDMA) modulation.

Preferably, this method further includes additional operations. An additional operation receives a signal from a same transmitter by the receiver, and the signal is obtained by performing interleaving and grid mapping on multiple data streams from the same transmitter. A further operation decodes the signal according to interleaving pattern information or scrambling code information corresponding to each of the data flow and grid mapping pattern information or grid mapping pattern information corresponding to each of the transmitters for obtaining multiple date flows form a same receiver.

Preferably, the receiver performs de-interleaving on the de-mapped data according to mutually different interleaving pattern information or scrambling code information, if the signal received by the receiver is obtained by performing, on the multiple data streams from the same transmitter, interleaving by use of mutually different interleaving pattern information or scrambling code information and grid mapping.

The receiver performs grid de-mapping on the received signal according to mutually different grid mapping pattern information, if the signal received by the receiver is obtained by performing grid mapping on the interleaved data of the multiple data streams from the same transmitter by use of mutually different grid mapping pattern information.

The receiver performs de-interleaving and grid de-mapping on the received data according to mutually different combinations of interleaving pattern information or scrambling code information and grid mapping pattern information, if the signal received by the receiver is obtained by performing interleaving and grid mapping on the multiple data streams from the same transmitter by use of the mutually different combinations of interleaving pattern information or scrambling code information and grid mapping pattern information.

Preferably, the signal received by the receiver is obtained by performing, on the multiple data streams from the same transmitter, interleaving and grid mapping or grid mapping and then phase and power adjustment.

Preferably, the receiver performs grid de-mapping on a signal of the multiple data streams from the same transmitter according to mutually different grid mapping pattern information or scrambling code information, when the receiver performs de-interleaving on the de-mapped data from the multiple transmitters according to mutually different interleaving pattern information.

The receiver performs de-interleaving on the de-mapped data of the multiple data streams from the same transmitter according to mutually different interleaving pattern information or scrambling code information, when the receiver performs grid de-mapping on a mixed signal from the multiple transmitters according to mutually different grid mapping pattern information.

The receiver performs grid de-mapping and de-interleaving on a signal of the multiple data streams from different transmitters according to mutually different combinations of interleaving pattern information or scrambling code information and grid mapping pattern information.

The present disclosure proposes a non-orthogonal multiple access. In comparison with the conventional code division multiple access (CDMA), the present disclosure utilizes the mutually different interleaving patterns or scrambling code information and/or grid mapping patterns to decode the data from different transmitters and distinguish the transmitters, and also avoid the limitation of orthogonal code resources. Further, the data transmission rate of transmitters can be flexibly configured by assigning different grid mapping patterns. The grid mapping can map a symbol sequence onto all or part of the time-frequency resources. This facilitates the multiplexing of same time-frequency resources to the multiple transmitters, increases the number of served transmitters, and combats interference and fading during the transmission through the channels.

Figure 3:
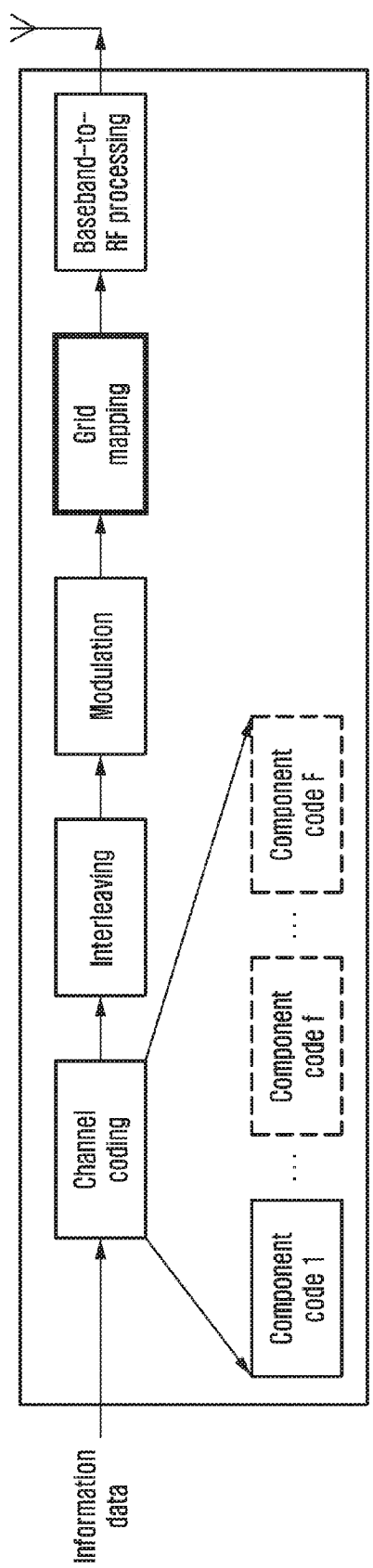
FIG. 3 is a schematic diagram of the principle of a transmitter according to an embodiment of the present disclosure.

FIG. 3 is a schematic diagram of the principle of a transmitter according to an embodiment of the present disclosure.

Referring to FIG. 3, when a multiple access based transmitter transmits data, the data to be transmitted is a bit sequence including one or more bits. First, channel coding 310 is performed on the bit sequence $d_k=\{d_k(m), m=0, \ldots, M-1\}$, wherein M is the size of the bit sequence. The method of performing channel coding can be channel coding by one component code with the code rate of $R_1$ or by a combination of multiple component codes. The component code can be a Turbo code, a low density parity check (LDPC) code, a repetition code, a spreading code, and more. For example, one Turbo code with a code rate of $R_1$ and a repetition spreading code with a code rate of $R_2$ are combined to generate a lower code rate $R_3=R_2R_1$. Alternatively, the method of performing channel coding can be constituted directly by a Turbo code with a code rate of $R_3$. Channel coding is performed on the bit sequence $d_k$ to obtain a coded sequence $c_k=\{c_k(n), n=0, \ldots, N-1\}$, where N is the size of the channel coded sequence. The coded sequence $c_k$ is interleaved 320 by an interleaving pattern $\alpha_k$ to obtain an interleaved sequence $x_k=\{x_k(n), n=0, \ldots, N-1\}$, where $\alpha_k$ is a bit (chip)-level interleaving pattern, and the size of the interleaved sequence is kept consistent with the size of the sequence before interleaving. By interleaving, the correlation of adjacent chips is decreased, and this is useful for the receiver to detect chip by chip. The interleaving pattern $\alpha_k$ can be generated by randomly shuffling of $\{0, 1, \ldots, N\}$, where numerical values from 0 to N denote an order of positions in which data occupies. The resulting interleaved sequence will pass through bit-to-symbol modulation 330 to obtain a symbol sequence $S_k=\{S_k(l), l=0, \ldots, L-1\}$, where L is the size of the symbol sequence and depends upon the modulation method and the size of the interleaved sequence. The modulation method can be constellation modulation such as QAM, PSK and more, or can be waveform modulation such as FSK. Grid mapping 340 is performed on the symbol sequence $S_k$ to generate a mapped symbol sequence, and a grid mapping pattern used in the grid mapping is represented as $\beta_k$. The symbol sequence $S_k$ can be grid mapped overall and then mapped onto the allocated time-frequency resources, or the symbol sequence $S_k$ can be segmented and each segment of the symbol sequence can be grid mapped respectively and then mapped onto the allocated time-frequency resource in a certain rule. By grid mapping, symbols carrying information about a transmitter can be mapped onto all or part of allocated time-frequency resources. This facilitates combatting interference and fading, and is useful for supporting more transmitters in same time-frequency resources. The resulting data sequence will pass through baseband-to-RF process 350 and more, and the mapped data sequence is transmitted out.

Figure 4A:
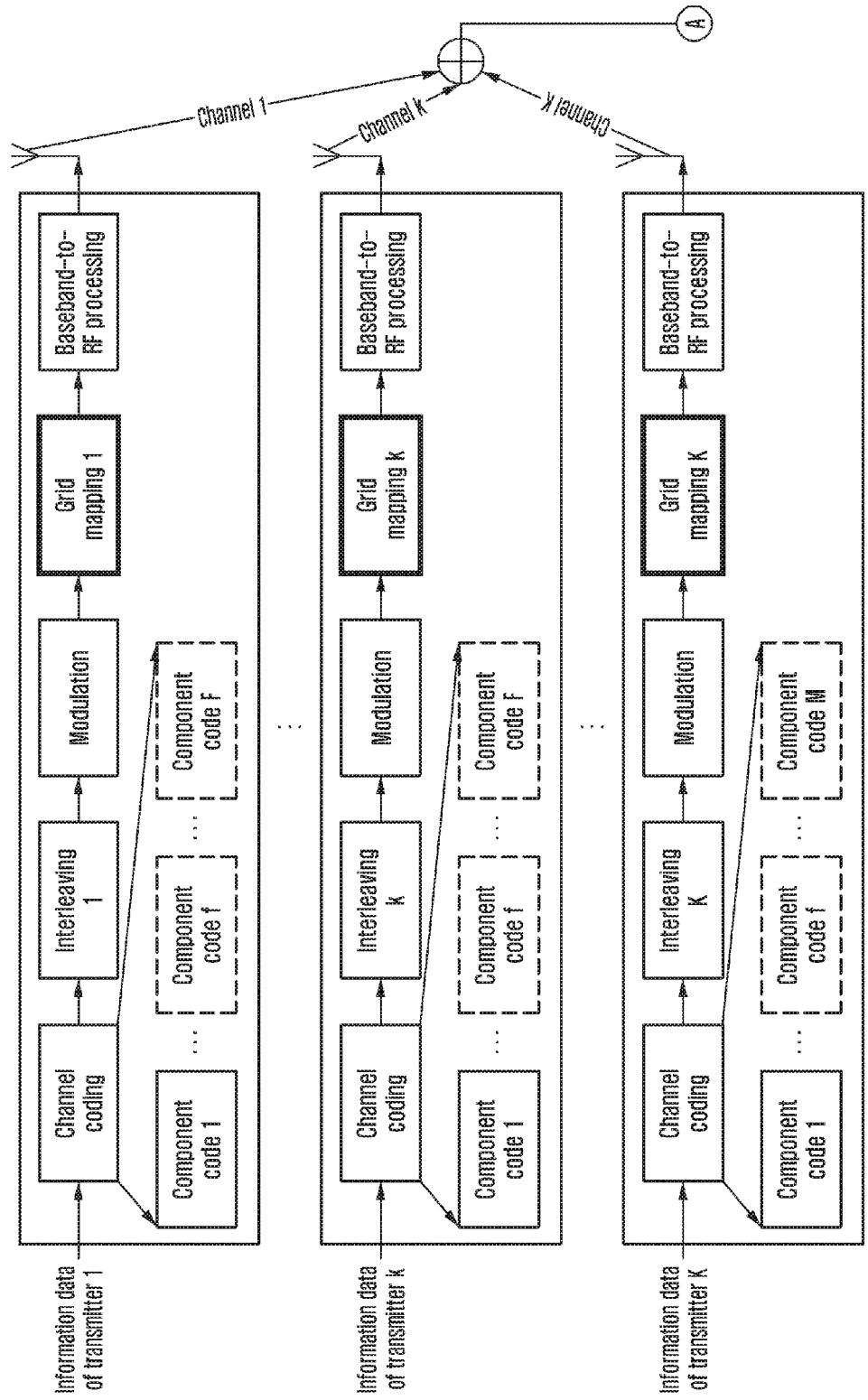
FIGS. 4A and 4B are schematic flow diagrams of the multiple access principle according to various embodiments of the present disclosure.
Figure 4B:
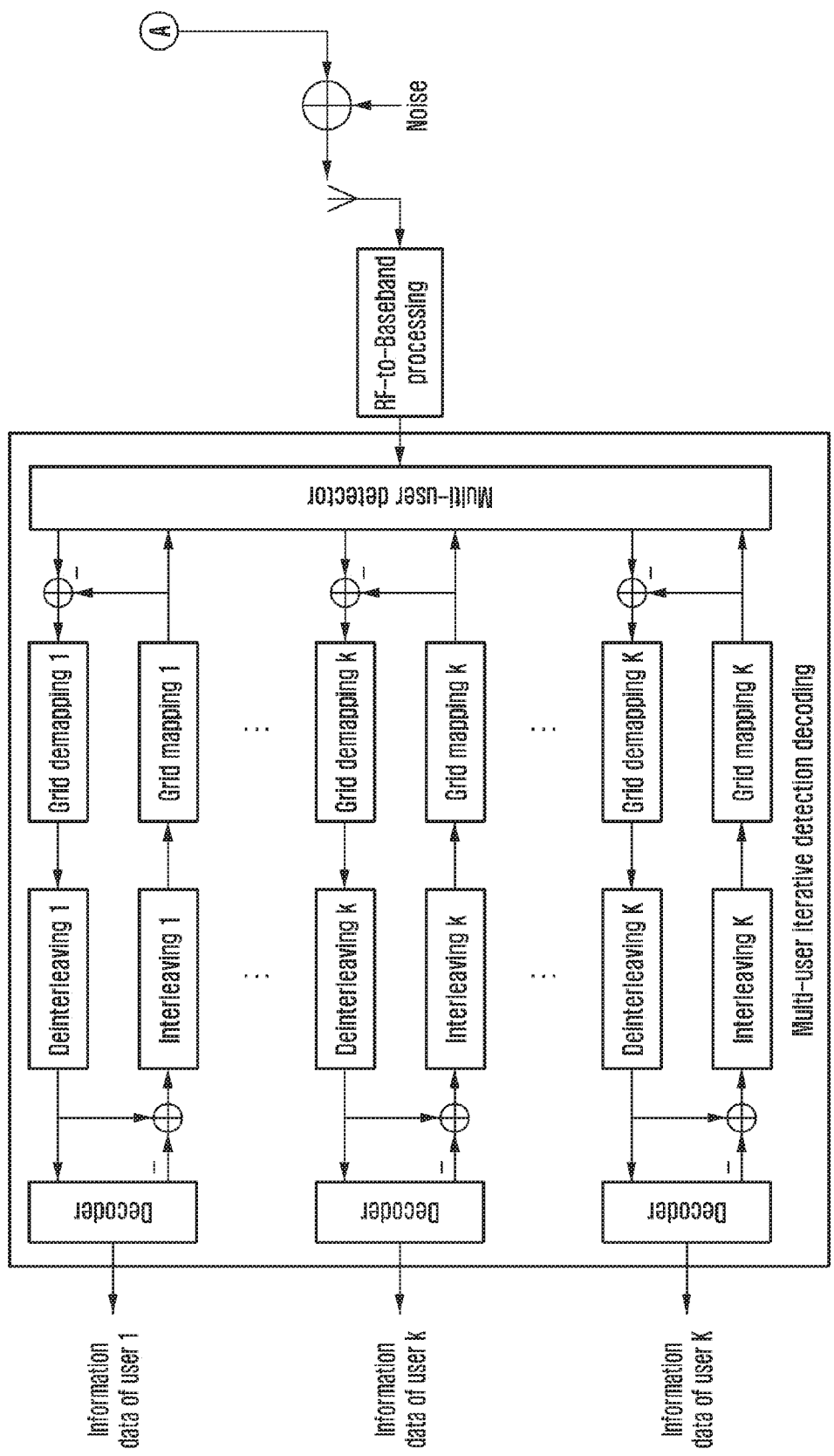

FIGS. 4A and 4B are schematic flow diagrams of the multiple access principle according to various embodiments of the present disclosure. On the basis of such a transmitter, the present disclosure provides a multiple access method.

Referring to FIG. 4A, K transmitters obtain respective interleaving pattern information and grid mapping pattern information by physical broadcast channels, physical downlink control channels, or physical downlink shared channels. The interleaving pattern information and grid mapping pattern information indicate an interleaving pattern and a grid mapping pattern, which can be indicated through a lookup table or more. In the multiple access method, the specific information of the interleaving pattern information can be directly configured, or the transmitters can be allowed to generate respective interleaving pattern according to a master interleaving pattern and a certain generation rule. The interleaving pattern information and the grid mapping pattern information are the unique identifiers by which a receiver distinguishes the different transmitters. K transmitters transmit data through the method as described above, and the data from different transmitter are joined together at the receiver after going through respective channels $h_k$, and interfered by the noise. The receiver employs multi-user iterative detection.

Referring to FIG. 4B, the receiver performs RF-to-baseband processing on a received mixed signal first, and then feeds the obtained signal to a multi-user detector as a baseband receiving signal. The multi-user detector calculates posterior probability information of each bit or each symbol according to the baseband receiving signal and prior probability information of each bit generated by the previous iteration, calculates extrinsic information in combination with the prior probability information input to the detector, perform grid de-mapping on the extrinsic information output by the detector according to the grid mapping pattern $\beta_k$ of each transmitter, and feeds the soft information sequence to be de-interleaved by using the same interleaving pattern $\alpha_k$ as in the transmitter side. After de-interleaving, the de-interleaved soft information feeds to a decoder. In the decoder, the soft information is correspondingly decoded according to the component code used by the transmitter, and finally the data of the transmitter is obtained by a process of decision. To prepare for a next iterative detection, it is necessary to perform channel coding on the soft information, which is obtained by decoding by the decoder, by the same component code or the combination of component codes as the transmitter again, subtract the previous soft information to obtain extrinsic information, re-interleave the obtained extrinsic information by the interleaving pattern $\alpha_k$ and perform grid re-mapping by the grid mapping pattern $\beta_k$, and finally, input the obtained extrinsic information sequence to the multi-user detector as the prior probability information. Hereto, one-time iterative detection is completed, and the above operations are repeated for a next iterative detection decoding. During the above process, information transferred in the iterative detection decoding process is all probability information, i.e., probability that the bit is 0 or 1 or probability that a symbol has a value. Such information is called soft information. The soft information can be represented by a log-likelihood ratio or a log probability, in order to simplify the operations. In the first iteration, there is no prior probability information, and the prior probability input to the multi-user detector is thus an equal-probability distribution, and the prior probability information, which is updated by the last iteration, is used in the subsequent iterations. When the number of iterations reaches a preset maximum value, a process of hard decision is performed in the decoder to obtain the final information data result of the transmitter. The multi-user signal detector as described above can be an elementary signal estimator (ESE), or a massage passing algorithm (MPA) based detector, or a successive interference cancellation (SIC) based detector, or more.

Figure 5:
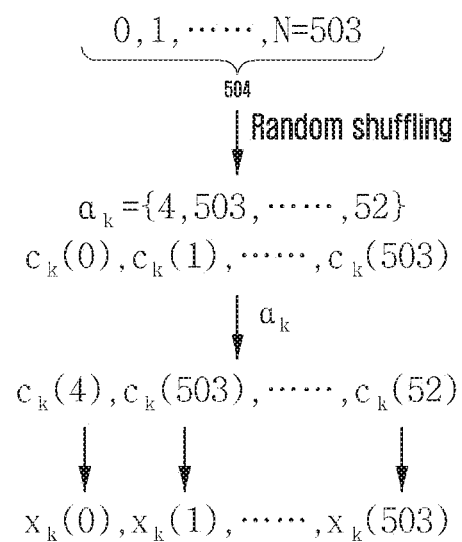
FIG. 5 is a schematic flow diagram of operation of an interleaving pattern generation according to an embodiment of the present disclosure.

FIG. 5 is a schematic flow diagram of operation of an interleaving pattern generation according to an embodiment of the present disclosure.

Referring to FIG. 5, a transmitter operates in combination with specific channel coding parameters, interleaving pattern and grid mapping design parameters and other system configurations. The schematic diagram of the principle of the multiple access method in this embodiment is shown in FIGS. 4A and 4B. It is assumed that one transmitter has a bit sequence $d_k=\{d_k(m), m=0, \ldots, M-1\}$ with a size of M=126, that is, the transmitter has 126 bits. This bit sequence will pass through channel coding process. Channel coding is implemented by combination of one LTE standard Turbo code with a code rate $R_1=\frac{1}{2}$ and one repetition spreading code with a size of 2, i.e., equivalent code rate $R_2=\frac{1}{2}$. In this case, the code rate of the whole channel coding is $R_3=R_2R_1=\frac{1}{4}$. Channel coding also can be implemented directly by one Turbo code with a code rate of $\frac{1}{4}$ or other component codes. The bit sequence $d_k$ will pass through channel coding to obtain a coded sequence $c_k=\{c_k(n), n=0, \ldots, N-1\}$, where N is the size of the channel coded sequence, $N=M/R_3=126*4=504$; and then, the coded sequence $c_k$ is interleaved by an interleaving pattern $\alpha_k$ to obtain an interleaved sequence $x_k=\{x_k(n), n=0, \ldots, N-1\}$. The interleaving pattern $\alpha_k$ is a bit (chip)-level interleaving pattern, and the size of the interleaved sequence is kept consistent with the size of the sequence before interleaving. By interleaving, the correlation of adjacent bits (chips) is decreased, and this is useful for the receiver to detect bit by bit (chip by chip). The transmitters obtain respective interleaving pattern information and grid mapping pattern information by physical broadcast channels, physical downlink control channels, or physical downlink shared channels. The interleaving pattern information and grid mapping pattern information indicate an interleaving pattern and a grid mapping pattern, which can be indicated in a form of a lookup table or more. In the multiple access method within this first specific embodiment of the present disclosure, the specific information of the interleaving pattern information can be directly configured, or the transmitters can generate respective interleaving pattern information according to a master interleaving pattern and a certain generation rule. For example, the $k^{th}$ transmitter obtains its interleaving pattern by cycling k bits to the master interleaving pattern. The interleaving pattern $\alpha_k$ can be generated by randomly shuffling $\{0, 1, \ldots, N\}$, where numerical values from 0 to N denote an order of positions in which data occupies. For example, in the first specific embodiment of the present disclosure, $\alpha_k=\{4, 503, \ldots, 52\}$, then $x_k(0)=c_k(4)$, $x_k(1)=c_k(503), \ldots, x_k(503)=c_k(52)$ can be obtained, as shown in FIG. 5.

The resulting interleaved sequence $x_k$ will pass through bit-to-symbol modulation to obtain a symbol sequence $S_k=\{S_k(l), l=0, \ldots, L-1\}$, where L is the size of the symbol sequence and depends upon the modulation method used and the size of the interleaved sequence. In the first specific embodiment of the present disclosure, the modulation method used is quadrature phase shift keying (QPSK), the modulation order is $M_s=2$, that is, two coded bits are mapped to one symbol. The size of the symbol sequence is $$L = \frac{N}{M_s} = 252.$$

The symbol sequence $S_k$ will pass through grid mapping to generate a symbol sequence $S'_k=\{S_k(l'), l=0, \ldots, L'-1\}$, where L' is the size of the grid mapped sequence. If the allocated time-frequency resources have Ns symbols and Nsc sub-carriers, then L'=Ns*Nsc. In this embodiment, $S_k$ obtained by performing grid mapping on the overall sequence $S_k$ together is entirely mapped onto the allocated time-frequency resources. Or, the symbol sequence $S_k$ can be divided into Ns segments, and symbols in each segment can be overall grid mapped to obtain Ns segments of symbol data each having a size of Nsc and then the Ns segments of symbol data are successively mapped onto the allocated time-frequency resources.

There can be various methods to implement grid mapping, the purpose of which is that symbols carrying information can be mapped onto all or part of the allocated time-frequency resources. This facilitates combatting interference and fading, and is useful for supporting more transmitters in same time-frequency resources. In addition, if signals are mapped to part of resources, the overall equivalent code rate R of the transmitter is further reduced with respect to the code rate $R_3$, and the degree of reduction is related to the density of the grid mapping pattern. In the first specific embodiment of the present disclosure, since the size of the symbol sequence is doubled, the equivalent code rate of the transmitter is further reduced by half, i.e., $$R = \frac{R_3}{2} = \frac{1}{8}.$$

The symbol sequence $S'_k$ will pass through a carrier modulation. In the first specific embodiment of the present disclosure, the $S'_k$ will pass through OFDM multi-carrier modulation, i.e., inverse fast fourier transform (IFFT) and then to digital to analog (D/A) conversion, up-conversion and other baseband-to-RF process, and finally the signal is transmitted.

Figure 6:
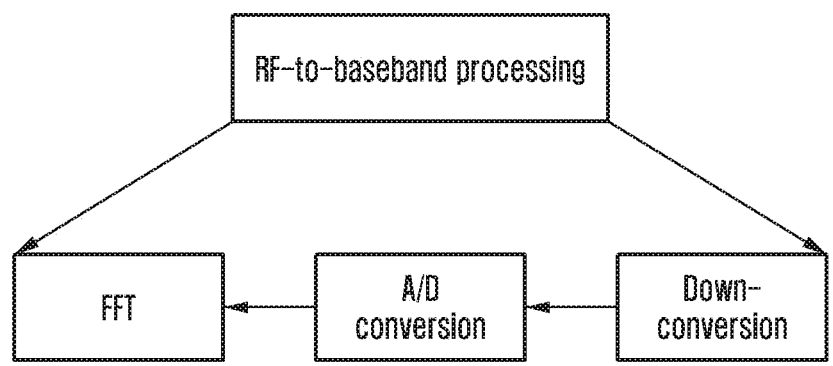
FIG. 6 is a schematic flow diagram of radio frequency (RF)-to-baseband processing according to an embodiment of the present disclosure.

FIG. 6 is a schematic flow diagram of RF-to-baseband processing according to an embodiment of the present disclosure.

Referring to FIG. 6, at the receiver, the signals received from multiple transmitters are joined together, and interfered by noise. In the first specific embodiment of the present disclosure, the receiver employs multi-user iterative detection decoding. The receiver performs RF-to-baseband processing on the received mixed signal first.

The signal obtained by fast fourier transform (FFT) is fed to a multi-user detector. In the first iteration, first, in the multi-user detector, the posterior probability information of each transmitter signal is calculated according to the preset prior probability information of the transmitter signal and the channel information of each transmitter estimated from the transmitted reference signal, and extrinsic information is calculated in combination with the prior probability information. The extrinsic information will pass through grid de-mapping according to the grid mapping pattern of each transmitter, and then a soft information sequence obtained by grid de-mapping will pass through an interleaving pattern $\alpha_k$ corresponding to the transmitter to be de-interleaved, and the de-interleaved soft information is inputted to a decoder. In the decoder, corresponding decoding is performed according to the component code or combination of component codes used by the transmitter. In the first specific embodiment of the present disclosure, the decoding of the repetition spreading code is performed first followed by the decoding of the Turbo code, and finally the data of the transmitter is obtained by a process of decision. To prepare for a next iterative detection, it is necessary to update the prior probability information of the transmitter signal. It is necessary to perform, on the soft information which is obtained by decoding, the same channel coding as at the transmitter, i.e., by a same component code or a combination of component codes as at the transmitter. In the first specific embodiment of the present disclosure, it will pass through a Turbo code with a code rate of $R_1=\frac{1}{2}$ and a repetition spreading code with a size of 2, and then the previous soft information is subtracted to obtain extrinsic information. The obtained extrinsic information successively p to re-interleaving and grid remapping by the interleaving pattern $\alpha_k$ and the grid mapping pattern, and the resulting extrinsic information sequence is fed to the multi-user detector as a prior probability sequence which serves as the prior probability of the next iterative detection. Hereto, an iterative detection is completed, and the above operations are repeated for a next iterative detection decoding. When the number of iterations reaches a preset maximum value, a process of hard decision is performed in the decoder to obtain the final information data result of the transmitter. In the first iteration, there is no prior probability information, and a prior probability input to the multi-user detector is thus an equal-probability distribution, and the prior probability information, which is updated by the last iteration, is used in the subsequent iterations. The multi-user signal detector as described above can be an ESE, or an MPA based detector, or an SIC based detector, or more.

As described above, there are various methods to implement grid mapping in the present disclosure. $\beta_k$ is the grid mapping pattern. Several specific methods of grid mapping will be described below as examples.

Zero-Padding and Interleaving Method

Figure 7:
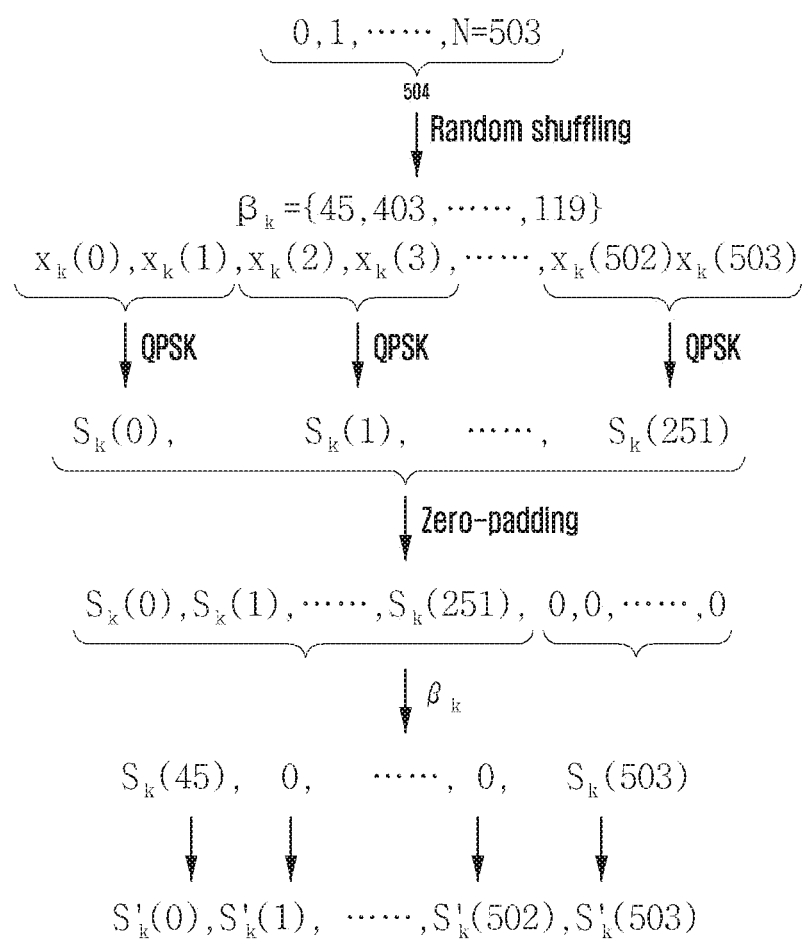
FIG. 7 is a flow diagram of operation of zero-padding and interleaving grid mapping according to an embodiment of the present disclosure.

FIG. 7 is a flow diagram of operation of zero-padding and interleaving grid mapping according to an embodiment of the present disclosure.

Referring to FIG. 7, during the grid mapping in this embodiment, if it is set to perform grid mapping on the overall symbol sequence together, first, zero-padding is performed on the end of the symbol sequence $S_k$, for example, with a zero-padding size of $L_0$. Here, it is assumed that $L_0=L$, where in other cases the zero-padding size could be zero. In this case, $L'=L+L_0=2L$ and $$\bar{S}_k = \begin{cases} S_k(l'), l' = 0, \ldots, L-1 \\ 0, l' = L, L+1, \ldots, 2L-1 \end{cases}.$$

The zero-padded sequence $\bar{S}_k$ will pass through an interleaving pattern with a size of $L'=2L$ to generate a symbol sequence $S'_k=\{S'_k(l'), l'=0, \ldots, L'-1\}$. The interleaving pattern used can be generated by randomly shuffling $\{0, 1, \ldots, N\}$. For example, in the specific embodiment of the present disclosure, $\beta_k=\{45, 403, \ldots 293, 119\}$, and then $S'_k(0)=\bar{S}_k(45), S'_k(1)=0, \ldots, S'_k(502)=0, S'_k(503)=\bar{S}_k(119)$ can be obtained. If it is set to perform segmented grid mapping on the symbol sequence, the symbol sequence $\bar{S}_k$ is divided into Ns segments first and each segment will pass through zero-padding and interleaving, the interleaver for each segment having a size of Nsc, and the interleavers of the segments can be the same or different, then, the obtained Ns segments of the symbol sequence are successively mapped onto the time-frequency resources.

Figure 8A:
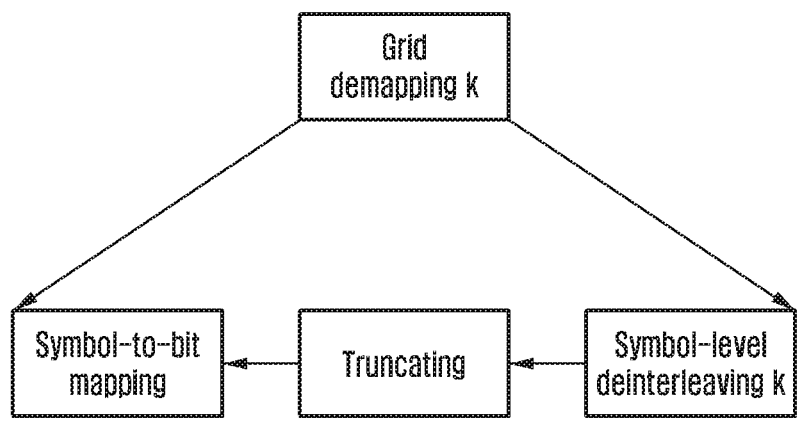
FIGS. 8A and 8B are flow diagrams of grid de-mapping in a method of zero-padding and interleaving according to various embodiments of the present disclosure.
Figure 8B:
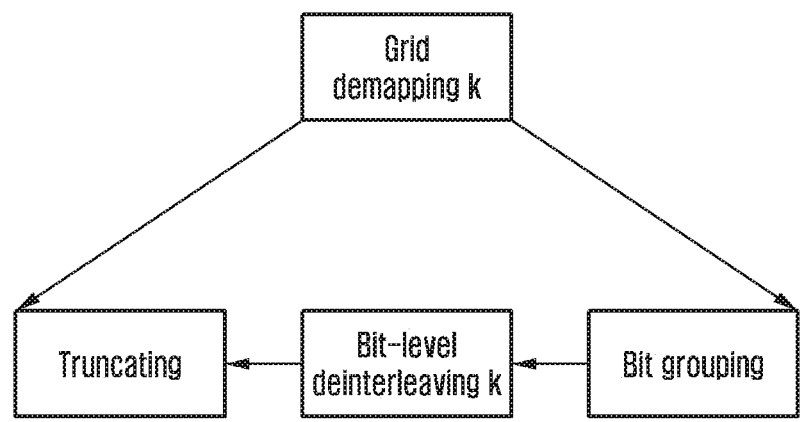

FIGS. 8A and 8B are flow diagrams of grid de-mapping in a method of zero-padding and interleaving according to various embodiments of the present disclosure.

Referring to FIG. 8A, in the multi-user iterative detection decoding in the first specific embodiment of the present disclosure, first, the soft information sequence of the transmitter signal obtained by the multi-user detector will pass through grid de-mapping. In this method, if symbol extrinsic information is outputted by the multi-user detector, the symbol extrinsic information is de-interleaved first by a symbol-level interleaving sequence, then the de-interleaved soft information sequence is truncated, and the symbol extrinsic information with a size of $$L = \frac{L'}{2} = 252$$

in the second half of the sequence is truncated and discarded, because the second 252-bit symbol extrinsic information is in the position of zero-padding performed by the transmitter and only the first 252-bit symbol extrinsic information is information-bearing, and the obtained symbol extrinsic information sequence will pass through symbol-to-bit mapping, and fed to the interleaving pattern $\alpha_k$ to be de-interleaved.

Referring to FIG. 8B, if bit extrinsic information is outputted by the multi-user detector, the bit extrinsic information is segmented first in such a way that each two bits form a group, the bit groups will pass through grid de-mapping to obtain the bit extrinsic information, and then the de-interleaved bit groups are truncated. In the first specific embodiment of the present disclosure, in the case of using QPSK at transmitter, and in this case, the bit extrinsic information is divided into total 504 groups with each two bits forming a group, and the obtained 504 groups of data will pass through de-interleaving process, after which the de-interleaved second 252 groups of information will be truncated and discarded. This is also due to the second 252 groups of bit extrinsic information are in the positions of zero padded in the transmitter. Only the first 252 groups of bit extrinsic information are data-bearing. The remaining 252 groups of bit extrinsic information sequence is successively merged and fed to the interleaving pattern $\alpha_k$ to be de-interleaved. During the updating of the prior probability information by iteration, the extrinsic information sequence output by the decoder will pass through processing by the same interleaving pattern and grid mapping pattern as at the transmitter to obtain a processed soft information sequence, and this soft information sequence is fed to the multi-user detector as the updated prior probability information. If the transmitter employs a process of performing segmented grid mapping on the symbol sequence, during the grid de-mapping, the bit extrinsic information sequence of each segment should pass through grid de-mapping, and then, the value in the positions of zero padded in the transmitting end is discarded, and the grid de-mapped bit extrinsic information data is cascaded to obtain a bit extrinsic information sequence which is then fed to the interleaving pattern to be de-interleaved.

FIG. 9 is a diagram of the grid mapping pattern design through zero-padding and interleaving based on specific requirements according to an embodiment of the present disclosure.

Referring to FIG. 9, in a zero-padding and interleaving method, the mapping pattern $\beta_k$ used is generated by randomly shuffling the order, and the $\beta_k$ can be specially designed under a special restriction. For example, such an optimization condition can be that for each transmitter, non-zero symbols are evenly distributed on the time-frequency resources, i.e. the number of non-zero symbols borne on each of resource elements (REs) is same. It is assumed that there are four transmitters, K=4, and $\beta_k$ designed according to the above special condition can be: $\beta_1$={43, 67, 365, 430, 46, 208, 263, 277, . . . , 170, 199, 427, 360}, $\beta_2$={451, 500, 113, 220, 437, 359, 187, 214, . . . , 368, 262, 9, 17}, $\beta_3$={117, 469, 123, 290, 99, 305, 174, 428, . . . , 89, 397, 244, 435}, $\beta_4$={497, 34, 268, 175, 255, 67, 363, 152, . . . , 376, 173, 480, 140}, then data of the four transmitters are superposed on the same 504 time-frequency REs each bearing two non-zero symbols. It is to be noted that, $\beta_k$ designed on the basis of this condition is not unique.

Direct Zero-Inserting Method

Figure 10:
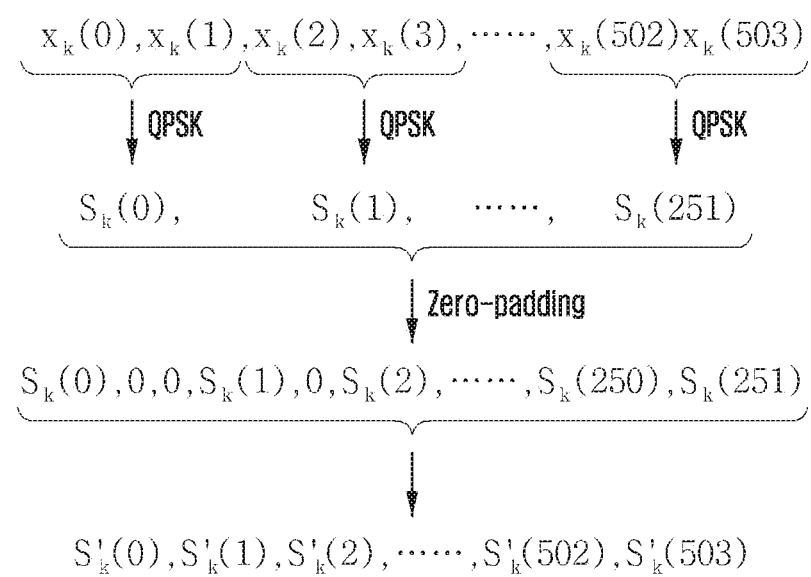
FIG. 10 is a flow diagram of direct zero-inserting according to an embodiment of the present disclosure.

FIG. 10 is a flow diagram of direct zero-inserting according to an embodiment of the present disclosure.

Referring to FIG. 10, the grid mapping pattern $\beta_k$ corresponds to a zero-inserting pattern used by the transmitter, if it is set to perform grid mapping on the overall symbol sequence together, Specifically, the symbol sequence $S_k$ will pass through zero-inserting, with a zero-inserting size of $L_0$. In the first specific embodiment of the present disclosure, it is assumed that $L_0$=L, that is, zero-inserting results in L'=2L. The position of zero-inserting is determined according to the configured zero-inserting pattern. The zero-inserting pattern can be randomly generated, or can be a pattern specially designed. For example, a zero-inserting pattern is designed such that zero values inserted are evenly distributed in the generated sequence. Similarly to the zero-padding and interleaving method, K transmitters obtain respective grid mapping pattern information by physical broadcast channels, physical downlink control channels, or physical downlink shared channels. The grid mapping pattern information indicates zero-inserting pattern information for grid mapping, which can be indicated in a form of a lookup table or more. However, differing from the zero-padding and interleaving method, zero-inserting will not change the relative positions of data symbols. That is, in $S'_k$, symbols carrying data are still arranged in a same order as in $S_k$, but there can be zero, one or more zero values between adjacent data symbols. Referring again to FIG. 10, after random zero-inserting, the symbol sequence becomes $S_k(0)$, 0, 0, $S_k(1)$, 0, $S_k(2)$, . . . , $S_k(250)$, $S_k(251)$, and the symbol sequence passed through the multi-carrier modulation becomes $S'_k(0)$= $S_k(0)$, $S'_k(1)$=$S'_k(2)$=0, $S'_k(3)$=$S_k(1)$, . . . , $S'_k(502)$ $S_k(250)$, $S'_k(503)$=$S_k(251)$. If it is set to perform segmented grid mapping on the symbol sequence, the symbol sequence $S_k$ is divided into Ns segments first and then each segment will pass through zero-inserting process, and then, the obtained Ns segments of the symbol sequence are successively mapped onto the allocated time-frequency resources.

Figure 11A:
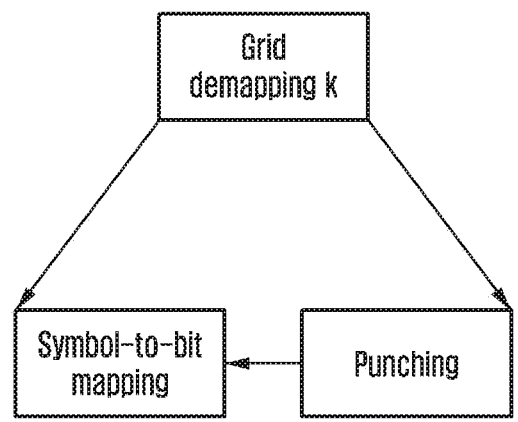
FIGS. 11A and 11B are flow diagrams of grid de-mapping by a receiver in a method of direct zero-inserting according to various embodiments of the present disclosure.
Figure 11B:
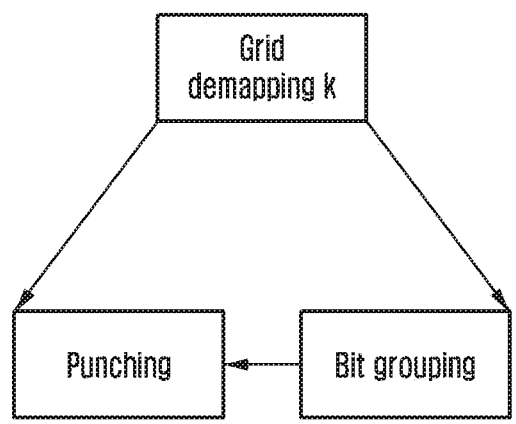

FIGS. 11A and 11B are flow diagrams of grid de-mapping by a receiver in a method of direct zero-inserting according to various embodiments of the present disclosure.

Referring to FIG. 11A, in the multi-user iterative detection decoding in the first specific embodiment of the present disclosure, first, the soft information sequence of the transmitter signal obtained by the multi-user detector will pass through grid de-mapping. In this method, if symbol extrinsic information is output by the multi-user detector, punching is performed in corresponding zero-value positions according to the zero-inserting pattern used by the transmitter first, that is, data in the zero-inserting position of the transmitter is directly discarded, and the reconstructed symbol extrinsic information sequence will pass through symbol-to-bit mapping.

Referring to FIG. 11B, if bit extrinsic information is outputted by the multi-user detector, two bit extrinsic information which is mapped to the same symbol are grouped together. The obtained 504 groups of bit extrinsic information in the corresponding zero-value position by using the same zero-inserting pattern as at the transmitter will be punched, that is, the bit extrinsic information in the zero-value position at the transmitter is directly discarded, and the obtained bit extrinsic information sequence is fed to the interleaving pattern $\alpha_k$ to be de-interleaved. During the updating of the prior probability information by iteration, the extrinsic information sequence output by the decoder will pass through processing by the same interleaving pattern and grid mapping pattern as at the transmitter to obtain a processed soft information sequence, and this soft information sequence is fed to the multi-user detector as the prior probability information. If the transmitter employs a process of performing segmented grid mapping on the symbol sequence, during the grid de-mapping, the bit extrinsic information sequence of each segment should pass through grid de-mapping, and then, the value in the positions of zero padded in the transmitting end is discarded, and the grid de-mapped bit extrinsic information data is cascaded to obtain a bit extrinsic information sequence which is then fed to the interleaving pattern to be de-interleaved.

Figure 12:
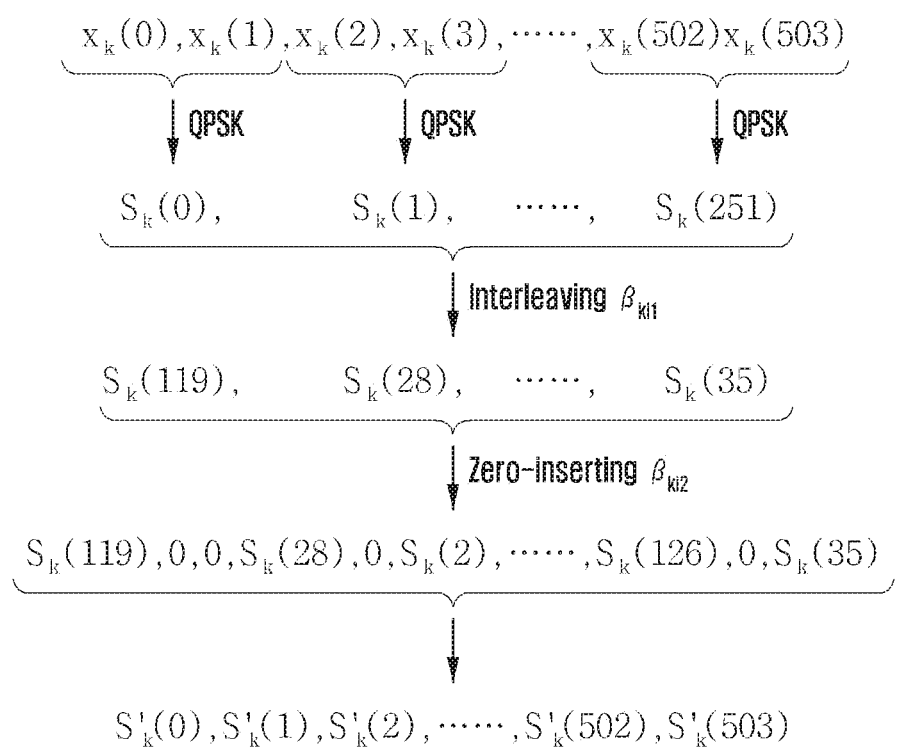
FIG. 12 is a diagram of operation of interleaving and zero-inserting grid mapping according to an embodiment of the present disclosure.

FIG. 12 is a diagram of operation of interleaving and zero-inserting grid mapping according to an embodiment of the present disclosure.

Referring to FIG. 12, the grid mapping pattern $\beta_k$ corresponds to the joint effect of the interleaving pattern $\beta_{ki1}$ used for grid mapping with the zero-inserting pattern $\beta_{ki2}$, and is expressed by $\beta_k = \beta_{ki1}\beta_{ki2}$. Specifically, if it is set to perform grid mapping on the overall symbol sequence together, a symbol sequence $S_k$ is interleaved by a configured interleaving pattern $\beta_{ki1}$ used for grid mapping to generate an interleaved sequence, and the interleaved sequence will then pass through zero-inserting according to a configured zero-inserting pattern to generate a sequence k. In this method, the size of the interleaving pattern $\beta_{ki1}$ is L. Differing from the interleaving pattern in the zero-padding and interleaving method, no zero-padding will be performed and the size of the interleaving pattern will thus not change with respect to the size of $S_k$. The number of zero values in the zero-inserting pattern is $L_0$. In the first specific embodiment of the present disclosure, it is assumed that $L_0 = L$, that is, zero-inserting results in L'=2L. The position of zero-inserting is determined according to the configured zero-inserting pattern. The zero-inserting pattern can be randomly generated, or can be a pattern specially designed. For example, a zero-inserting pattern is designed such that zero values inserted are evenly distributed in the generated sequence. Similarly to the last method, K transmitters obtain respective grid mapping pattern information by physical broadcast channels, physical downlink control channels, or physical downlink shared channels. The grid mapping pattern information indicates the interleaving pattern and zero-inserting pattern used for grid mapping, which can be indicated in a form of a lookup table or more. S'$_k$ is mapped to the allocated time-frequency REs. An example of the operation of interleaving and zero-inserting grid mapping. If it is set to perform segmented grid mapping on the symbol sequence, the symbol sequence $S_k$ is divided into Ns segments first and each segment will pass through interleaving and zero-inserting, and the interleaving sequence and zero-inserting pattern of the segments can be the same or different, and then, the obtained Ns segments of the symbol sequence are successively mapped onto the time-frequency resources.

In the multi-user iterative detection decoding in the first specific embodiment of the present disclosure, first, the soft information sequence of the transmitter signal obtained by the multi-user detector is inversely operated by grid mapping. Referring to FIG. 11A, if symbol extrinsic information is output by the multi-user detector, punching is performed in a corresponding zero-value position according to the zero-inserting pattern used by the transmitter first, that is, data in the zero-inserting position of the transmitter is directly discarded, the reconstructed symbol extrinsic information sequence is symbol-level de-interleaved, and the de-interleaved symbol sequence will pass through symbol-to-bit mapping. Referring to FIG. 11B, if bit extrinsic information is outputted by the multi-user detector, in the case of using QPSK at transmitter, the two bit extrinsic information which are mapped to the same symbol are grouped together. The obtained 504 groups of the bit extrinsic information in the corresponding zero-value position by using the same zero-inserting pattern as at the transmitter will be punched, that is, the groups of the bit extrinsic information is directly discarded, and the obtained 252 groups of bit extrinsic information sequence is fed to the interleaving pattern $\beta_{ki1}$ to be de-interleaved, and then the obtained 252 groups of bit extrinsic information is fed to the interleaving pattern $\alpha_{k\_}$ to be de-interleaved. During the updating of the prior probability information by iteration, the extrinsic information sequence output by the decoder will pass through processing by the same interleaving pattern and grid mapping pattern as at the transmitter to obtain a processed soft information sequence, and this soft information sequence is fed to the multi-user detector as the prior probability information. If the transmitter employs a process of performing segmented grid mapping on the symbol sequence, during the grid de-mapping, the bit extrinsic information sequence of each segment should pass through grid de-mapping, and then, the value in the positions of zero padded in the transmitting end is discarded, and the grid de-mapped bit extrinsic information data is cascaded to obtain a bit extrinsic information sequence which is then fed to the interleaving pattern to be de-interleaved.

Figure 13A:
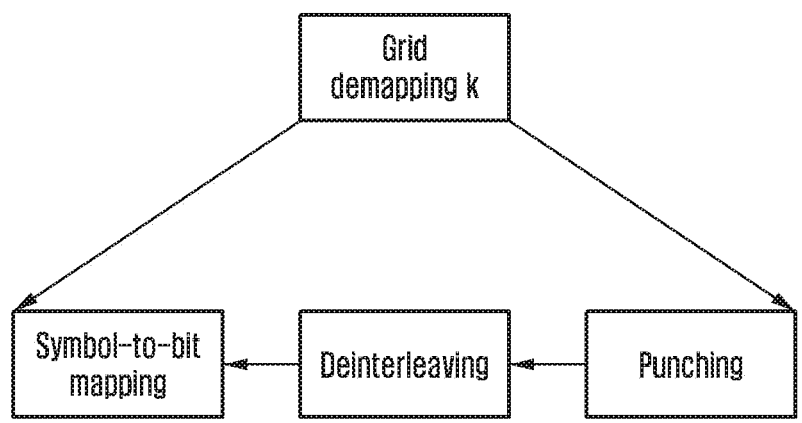
FIGS. 13A and 13B are diagrams of grid de-mapping by a receiver in a method of interleaving and zero-inserting according to various embodiments of the present disclosure.
Figure 13B:
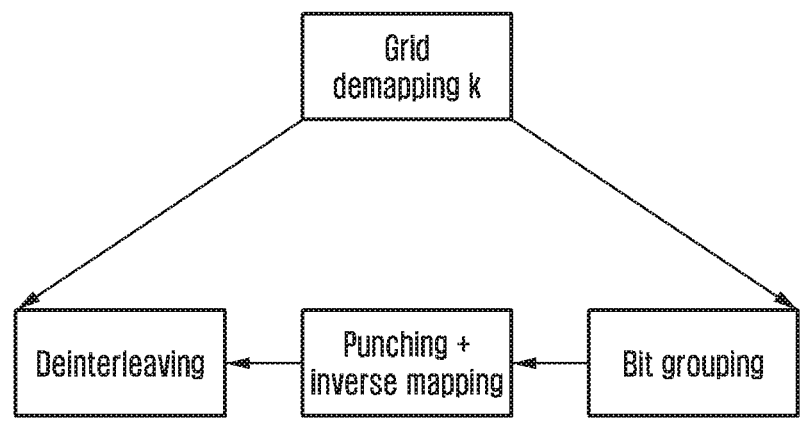

FIGS. 13A and 13B are diagrams of grid de-mapping by a receiver in a method of interleaving and zero-inserting according to various embodiments of the present disclosure.

Figure 14:
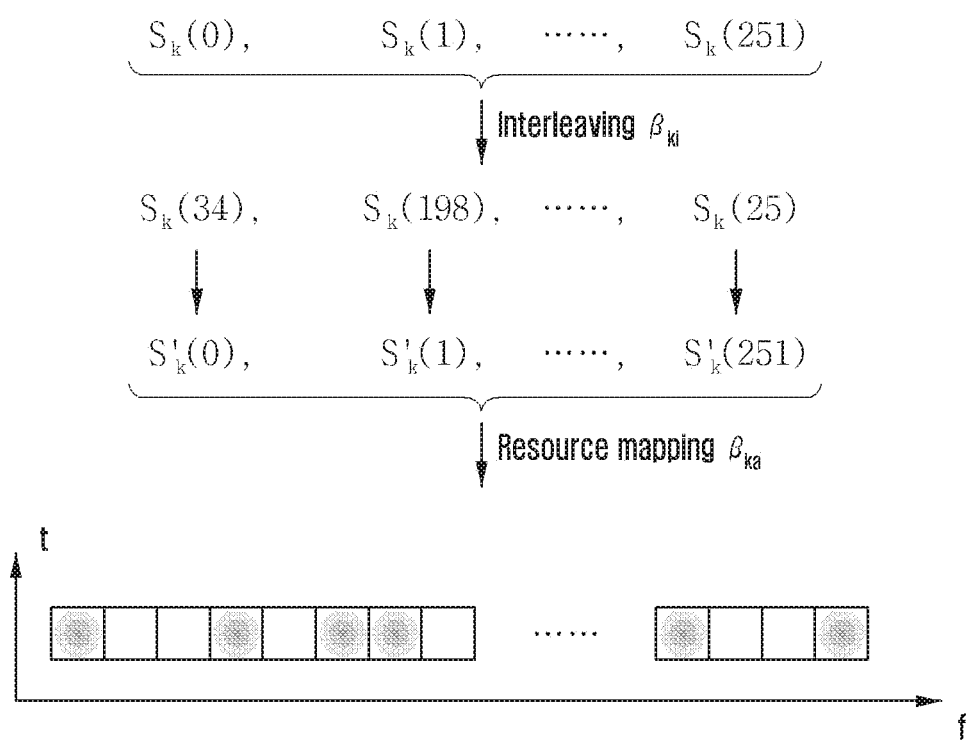
FIG. 14 is a diagram of interleaving grid mapping according to an embodiment of the present disclosure.

FIG. 14 is a diagram of interleaving grid mapping according to an embodiment of the present disclosure.

The main difference from the above methods lies in that no zero-padding or zero-inserting is required, and instead, the modulated symbol sequence is directly interleaved and then directly mapped onto corresponding time-frequency REs according to the mapping pattern given by the grid mapping pattern information. At this moment, the grid mapping pattern $\beta_k$ corresponds to joint effect of the interleaving pattern $\beta_{ki}$ used for grid mapping with a resource mapping pattern $\beta_{ka}$, and is expressed by $\beta_k = \beta_{ki}\beta_{ka}$. Specifically, if it is set to perform process on the overall symbol sequence together, a symbol sequence $S_k$ is interleaved by a configured interleaving pattern $\beta_{ki}$ used for grid mapping to generate an interleaved sequence S'$_k$. In this method, the size of the interleaving pattern $\beta_{ki}$ is L. Differing from the interleaving pattern in the zero-padding and interleaving method, no zero-padding will be performed and the size of the interleaving pattern and the size of the interleaved sequence S'$_k$ will thus not change with respect to the size of $S_k$. Similarly to the last method, K transmitters obtain respective grid mapping pattern information by physical broadcast channels, physical downlink control channels, or physical downlink shared channels. The grid mapping pattern information indicates the interleaving pattern and resource mapping pattern used for grid mapping, which can be indicated in a form of a lookup table or more. S'$_k$ is mapped to all or part of the allocated time-frequency REs according to the configured mapping pattern $\beta_{ka}$. An example of the operation of interleaving grid mapping is as shown in FIG. 14. If it is set to perform segmented grid mapping on the symbol sequence, the symbol sequence $S_k$ is divided into Ns segments first and each segment will pass through interleaving process, and the interleaving sequence of the segments can be the same or different, and then, the obtained Ns segments of the symbol sequence are successively mapped onto the time-frequency resources. In this case, according to the density information of the grid mapping pattern, there will be corresponding idle time-frequency resource units.

Figure 15A:
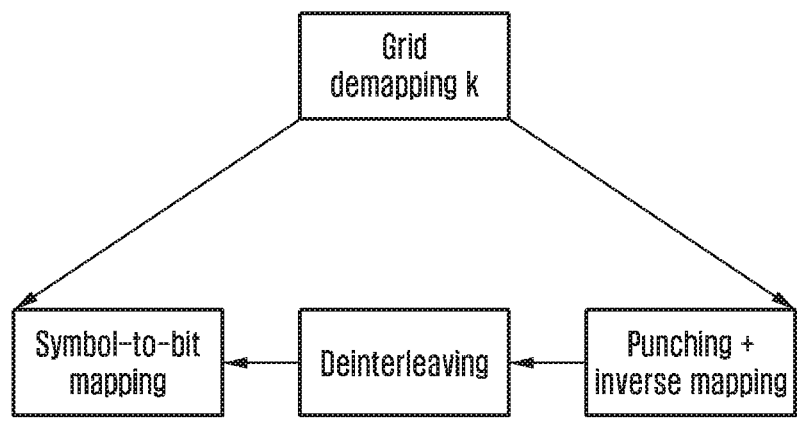
FIGS. 15A and 15B are diagrams of grid de-mapping with respect to the interleaving grid mapping according to an embodiment of the present disclosure.
Figure 15B:
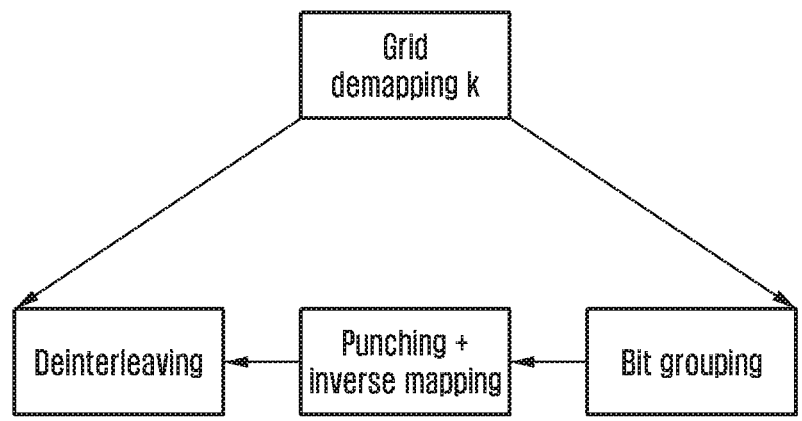

FIGS. 15A and 15B are diagrams of grid de-mapping with respect to the interleaving grid mapping according to an embodiment of the present disclosure.

Referring to FIG. 15A, in the multi-user iterative detection decoding in the first specific embodiment of the present disclosure, first, the soft information sequence of the transmitter signal obtained by the multi-user detector is inversely operated by grid mapping. If symbol extrinsic information is output by the multi-user detector, punching is performed in a corresponding idle position, i.e., a position without data, according to the resource mapping pattern $\beta_{ka}$ used by the transmitter first, that is, data in the zero-inserting position of the transmitter is directly discarded, the reconstructed symbol extrinsic information sequence is inversely mapped according to the resource mapping pattern $\beta_{ka}$ to obtain a symbol-level extrinsic information sequence, and the inversely mapped symbol sequence is de-interleaved according to the interleaving pattern $\beta_{ki}$ used by the transmitter and then will pass through symbol-to-bit mapping.

Referring to FIG. 15B, if bit extrinsic information is outputted by the multi-user detector, in the case of using QPSK at transmitter, the two bit extrinsic information which are mapped to the same symbol are grouped together. The obtained 504 groups of the bit extrinsic information in the corresponding zero-value position by using the same zero-inserting pattern $\beta_{ka}$ as at the transmitter is punched, that is, the groups of the bit extrinsic information is directly discarded, and then the obtained bit extrinsic information is fed to the interleaving pattern $\beta_{ki}$ to be de-interleaved, and then obtained 252 groups of bit extrinsic information is merged in order and then fed to the interleaving pattern $\alpha_k$ to be de-interleaved. During the updating of the prior probability information by iteration, the extrinsic information sequence output by the decoder will pass through processing by the same interleaving pattern and grid mapping pattern as the transmitter to obtain a processed soft information sequence, and this soft information sequence is fed to the multi-user detector as the prior probability information. If the transmitter employs a process of performing segmented grid mapping on the symbol sequence, during the grid de-mapping, the bit extrinsic information sequence of each segment should pass through grid de-mapping, and then, the value in the corresponding idle resource units in the transmitting end is discarded, and the grid de-mapped bit extrinsic information data is cascaded to obtain a bit extrinsic information sequence which is then fed to the interleaving pattern to be de-interleaved.

Figure 16:
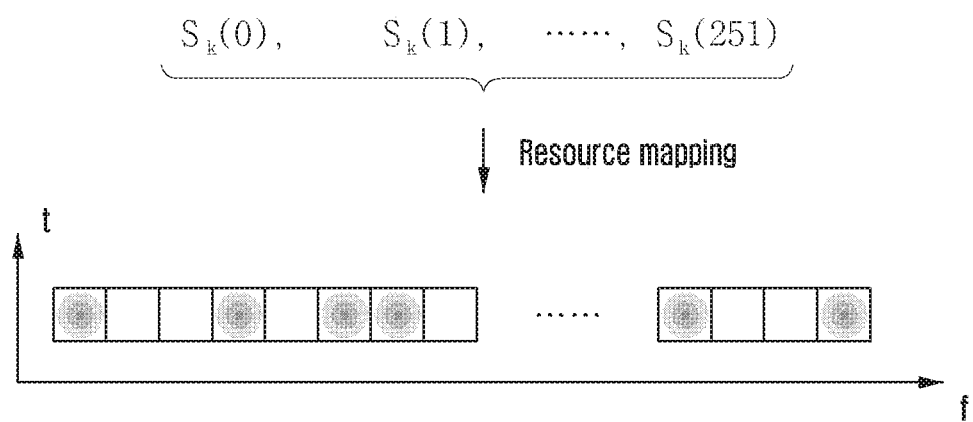
FIG. 16 is a diagram of direct grid mapping according to an embodiment of the present disclosure.

FIG. 16 is a diagram of direct grid mapping according to an embodiment of the present disclosure.

Referring to FIG. 16, the main difference from the above methods lies in that no zero-padding, interleaving or zero-inserting is required, and instead, the modulated symbol sequence is directly mapped onto corresponding resources according to the resource mapping pattern given by the grid mapping pattern information. In this case, the grid mapping pattern $\beta_k$ corresponds to the resource mapping pattern used for grid mapping. Specifically, a symbol sequence $S_k$ is directly mapped according to the configured resource mapping pattern $\beta_k$ used for grid mapping. Similarly to the last method, K transmitters obtain respective grid mapping pattern information by physical broadcast channels, physical downlink control channels, or physical downlink shared channels. The grid mapping pattern information indicates the resource mapping pattern used for grid mapping, which can be indicated in a form of a lookup table or more. An example of the operation of direct grid mapping. If it is set to perform segmented grid mapping on the symbol sequence, the symbol sequence $S_k$ is divided into Ns segments first and each segment of the symbol sequence is successively mapped onto the time-frequency resources. In this case, according to the density information of the grid mapping pattern, there will be corresponding idle time-frequency resource units.

Figure 17A:
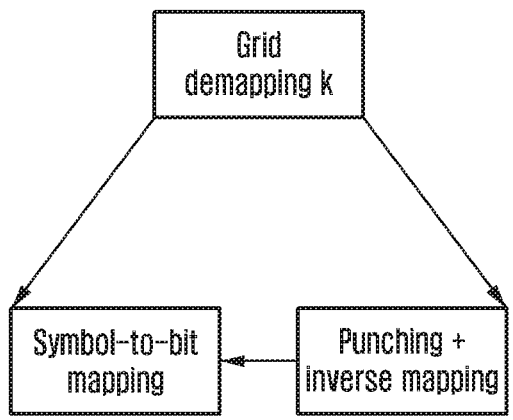
FIGS. 17A and 17B are diagrams of grid de-mapping with respect to the direct grid mapping according to various embodiments of the present disclosure.
Figure 17B:
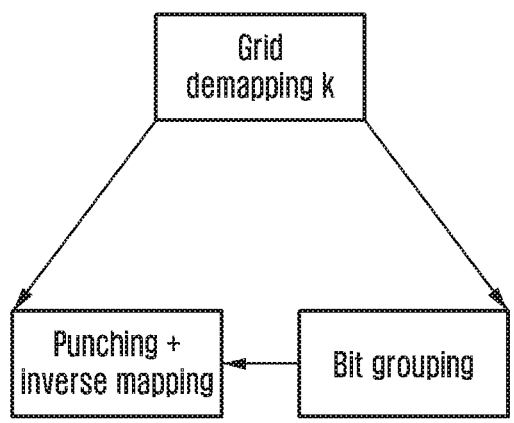

FIGS. 17A and 17B are diagrams of grid de-mapping with respect to the direct grid mapping according to various embodiments of the present disclosure.

Referring to FIG. 17A, in the multi-user iterative detection decoding in the first specific embodiment of the present disclosure, first, the soft information sequence of the transmitter signal obtained by the multi-user detector will pass through grid de-mapping. If symbol extrinsic information is output by the multi-user detector, punching is performed in a corresponding idle position, i.e., a position without data, according to the resource mapping pattern $\beta_k$ used by the transmitter first, that is, data in the idle position of the transmitter is directly discarded, the reconstructed symbol extrinsic information sequence is inversely mapped according to the resource mapping pattern $\beta_k$ to obtain a symbol-level extrinsic information sequence, and the inversely mapped symbol sequence will pass through symbol-to-bit mapping.

Referring to FIG. 17B, if bit extrinsic information is outputted by the multi-user detector, in the case of using QPSK at transmitter, the two bit extrinsic information which are mapped to the same symbol are grouped together. The obtained 504 groups of the bit extrinsic information in the corresponding zero-value position by using the same zero-inserting pattern $\beta_{ka}$ as at the transmitter is punched, that is, the groups of the bit extrinsic information is directly discarded, and then the obtained bit extrinsic information is fed to the interleaving pattern $\beta_{ki}$ to be de-interleaved, and then obtained 252 groups of bit extrinsic information is fed to the interleaving pattern $\alpha_k$. During the updating of the prior probability information by iteration, the extrinsic information sequence output by the decoder will pass through processing by the same interleaving pattern and grid mapping pattern as at the transmitter to obtain a processed soft information sequence, and this soft information sequence is fed to the multi-user detector as the prior probability information. If the transmitter employs a process of performing segmented grid mapping on the symbol sequence, during the grid de-mapping, the bit extrinsic information sequence of each segment should pass through grid de-mapping, and then, the value in the corresponding idle resource units in the transmitting end is discarded, and the grid de-mapped bit extrinsic information data is cascaded to obtain a bit extrinsic information sequence which is then fed to the interleaving pattern to be de-interleaved.

Codebook Grid Mapping Method

The main difference from the above methods lies in the grid mapping is performed on the modulated symbol sequence according to a preset codebook. In this case, the grid mapping pattern corresponds to the codebook in the grid mapping. Specifically, if it is set to perform grid mapping on the overall symbol sequence together, a symbol sequence $S_k$ is directly mapped according to the configured codebook. Similarly to the above methods, K transmitters obtain respective grid mapping pattern information by physical broadcast channels, physical downlink control channels, or physical downlink shared channels. The grid mapping pattern information indicates the codebook used for grid mapping, which can be indicated in a form of a lookup table or more. First, the receiver will preset a codebook set and allocate a codebook for each transmitter.

Figure 37:
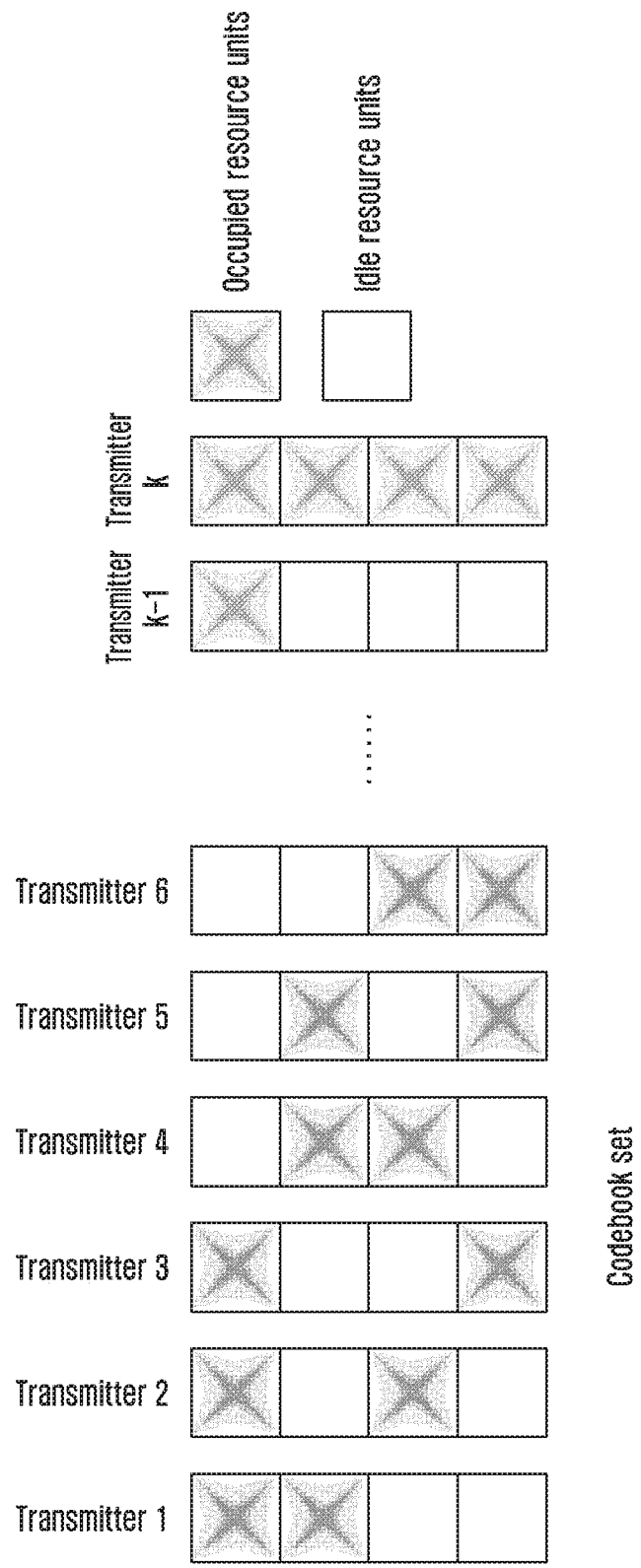
FIG. 37 is a diagram of a codebook set according to an embodiment of the present disclosure.

It is assumed that the codebook has a size of $N_{mp}$, and an example of the codebook set having a size of $N_{mp=4}$ is as shown in FIG. 37.

Figure 38:
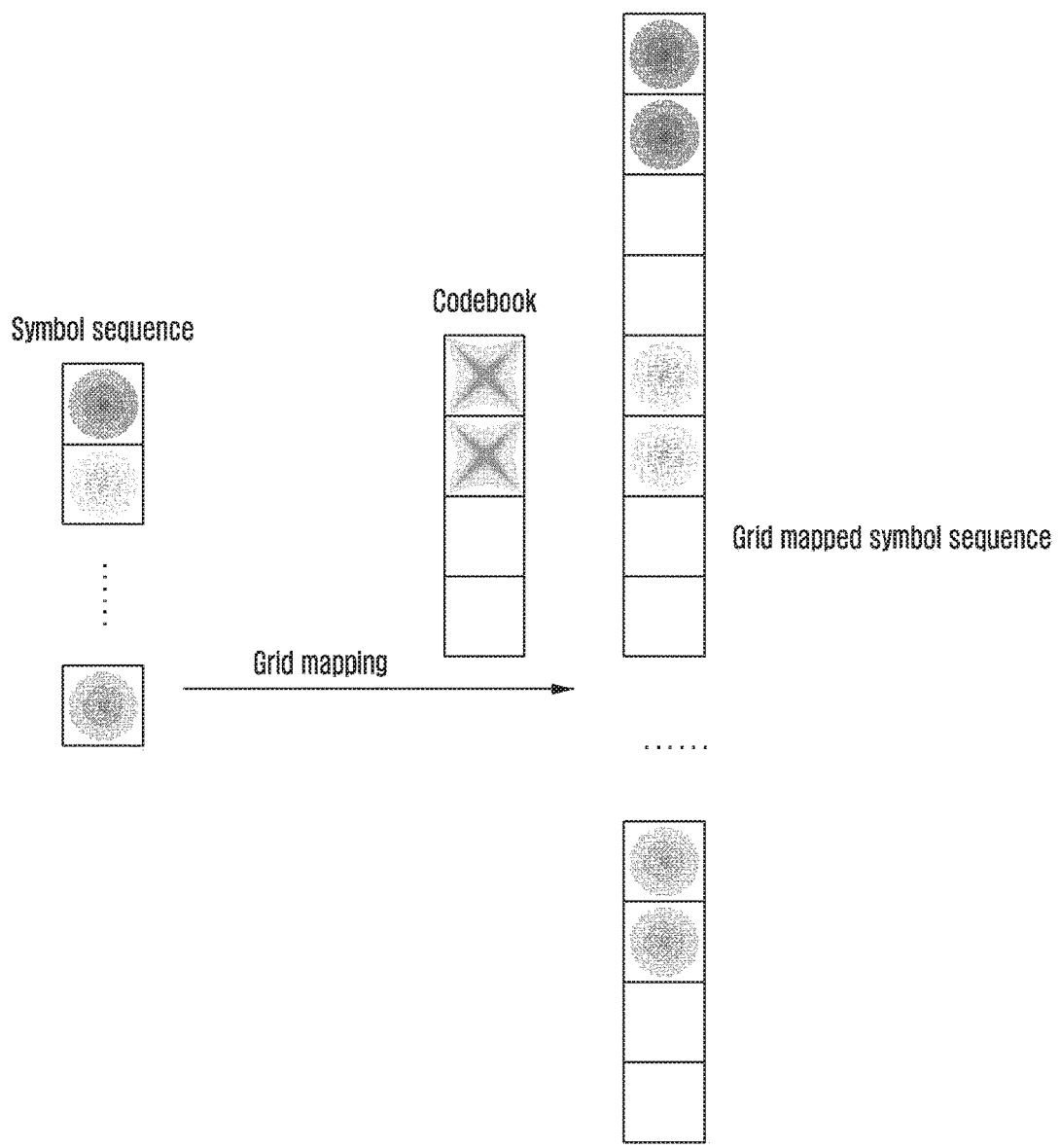
FIG. 38 is a schematic diagram of performing grid mapping by use of a codebook by the transmitter according to an embodiment of the present disclosure.

Grid mapping is performed on each symbol in the symbol sequence of the transmitter according to the allocated codebook. If there are $M_{ore}$ ($M_{ore} \leq N_{mp}$) occupied resource units in one codebook, first, the data symbols to be processed are repeated for $M_{ore}$ times, and then $M_{ore}$ symbols are mapped onto the positions of the corresponding occupied resource units according to the codebook. It is to be noted that, $M_{ore}$ can be 1. FIG. 38 is a schematic diagram of completing grid mapping by the transmitter by use of the allocated codebook.

If it is set to perform segmented grid mapping on the symbol sequence, a symbol sequence $S_k$ is divided into Ns segments first, and each segment of the symbol sequence is successively processed according to the codebook and finally completely mapped onto the allocated time-frequency resources.

In the multi-user iterative detection decoding in the first specific embodiment of the present disclosure, first, the soft information sequence of the transmitter signal obtained by the multi-user detector will pass through grid de-mapping. In this method, if symbol extrinsic information is output by the multi-user detector, punching is performed in a corresponding idle position, i.e., a position without data, according to the resource mapping pattern used by the transmitter first, that is, data in the idle position of the transmitter is directly discarded, the reconstructed symbol extrinsic information sequence is inversely mapped according to the resource mapping pattern to obtain a symbol-level extrinsic information sequence. In this implementation, grid de-mapping is performed according to the codebook. Then, the inversely mapped symbol sequence will pass through symbol-to-bit mapping. If bit extrinsic information is outputted by the multi-user detector, first, bits of the bit extrinsic information mapped onto one symbol are grouped, and with regard to the bit groups, punching is performed in a corresponding idle position by using the same resource mapping pattern $\beta_k$ as at the transmitter, and the obtained bit extrinsic information sequence is fed to the interleaving pattern $\alpha_k$ to be interleaved. During the updating of the prior probability information by iteration, the extrinsic information sequence output by the decoder will pass through processing by the same interleaving pattern and grid mapping pattern as at the transmitter to obtain a processed soft information sequence, and this soft information sequence is fed to the multi-user detector as the prior probability information. If the transmitter employs a process of performing segmented grid mapping on the symbol sequence, during the grid de-mapping, the bit extrinsic information sequence of each segment should pass through grid de-mapping, and then, the value in the corresponding idle resource units in the transmitting end is discarded, and the grid de-mapped bit extrinsic information data is cascaded to obtain a bit extrinsic information sequence which is then fed to the interleaving pattern to be de-interleaved.

Codebook Interleaving Grid Mapping Method

The main difference from the implementation in codebook grid mapping lies in that, in addition to codebook mapping, interleaving is performed according to the symbol-level interleaving pattern allocated by the receiver. In this case, the grid mapping pattern $\beta_k$ corresponds to the codebook in the grid mapping and the symbol-level interleaving pattern. Specifically, if it is set to perform grid mapping on the overall symbol sequence together, a symbol sequence $S_k$ is mapped according to the configured codebook and then symbol-level interleaved, or is symbol-level interleaved and then codebook mapped. Similarly to the above methods, K transmitters obtain respective grid mapping pattern information by physical broadcast channels, physical downlink control channels, or physical downlink shared channels. The grid mapping pattern information indicates the codebook and the symbol-level interleaving pattern used for grid mapping by the transmitter, which can be indicated in a form of a lookup table or more. First, as shown in the codebook grid mapping method, the receiver will preset a codebook set and allocate a codebook for each transmitter. It is assumed that the pattern has a size of $N_{mp}$. Grid mapping is performed on each symbol in the symbol sequence of the transmitter according to the allocated codebook. If there are $M_{ore}$ occupied resource units in one codebook, first, the data symbols to be processed are repeated for $M_{ore}$ times, and then $M_{ore}$ symbols are mapped onto the positions of the corresponding occupied resource units according to the codebook. It is to be noted that, $M_{ore}$ can be 1.

Figure 39A:
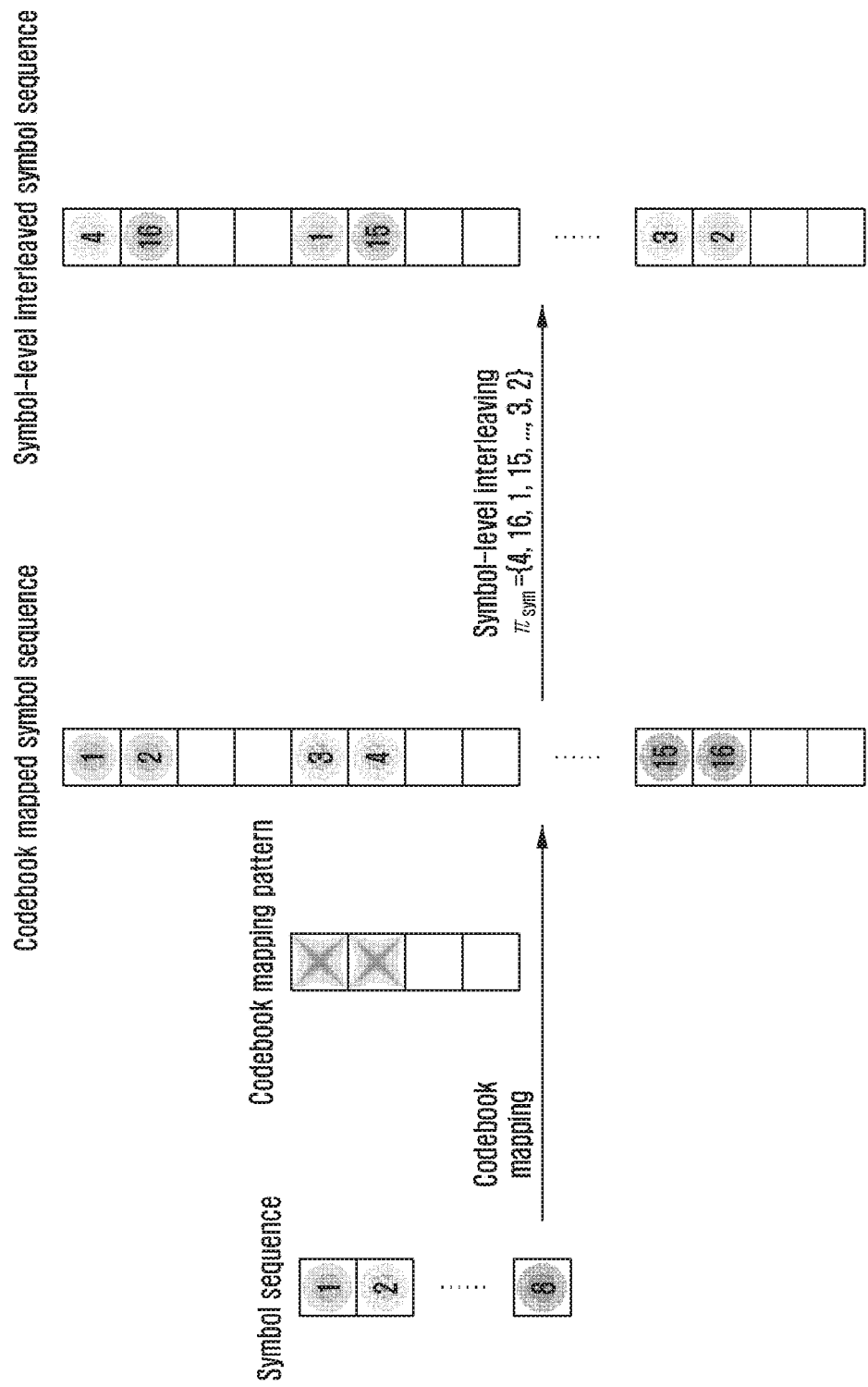
FIGS. 39A and 39B are schematic diagrams of a grid mapping implementation based on codebook mapping and symbol-level interleaving according to various embodiments of the present disclosure.
Figure 39B:
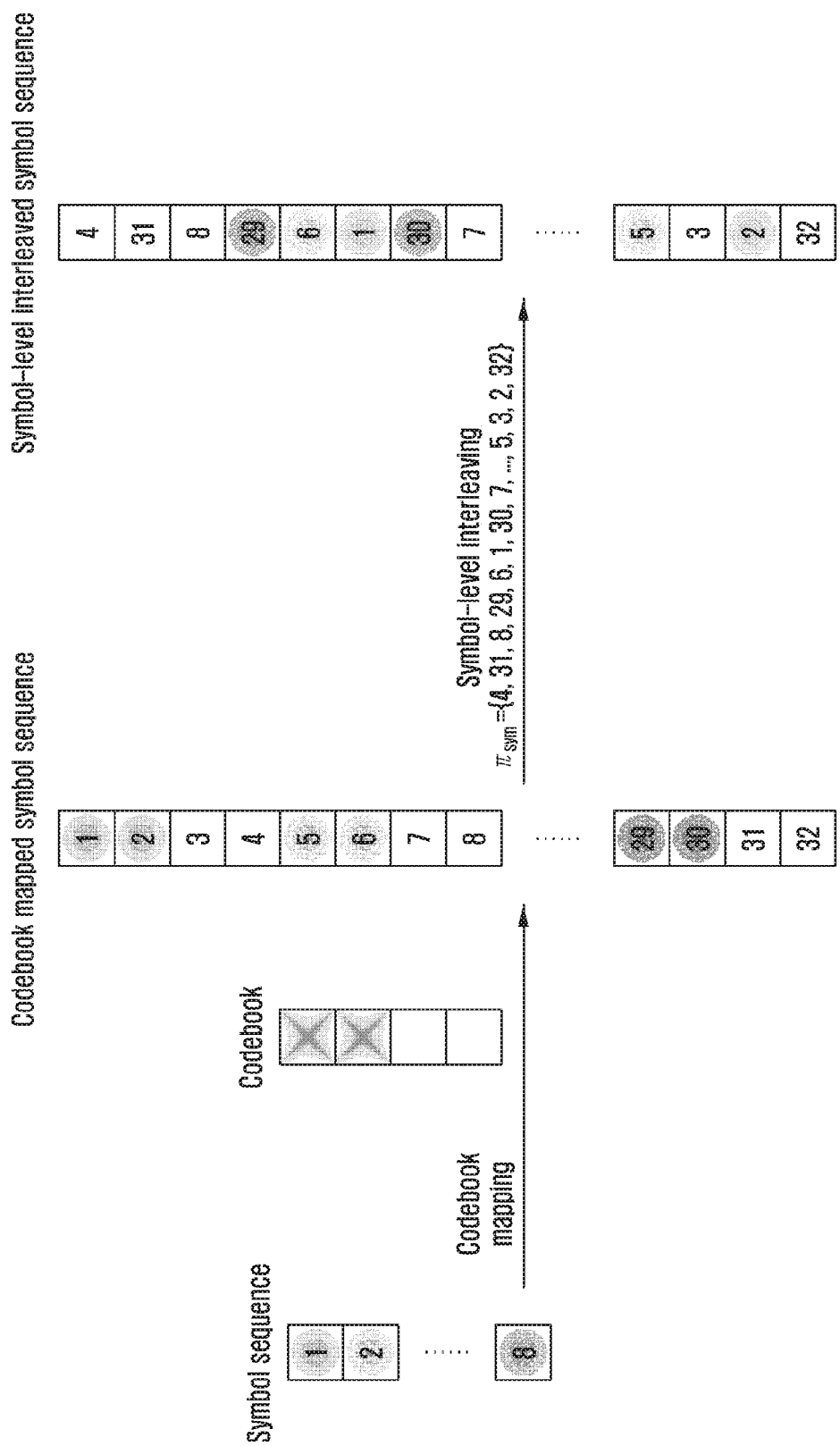

FIGS. 39A and 39B are schematic diagrams of a grid mapping implementation based on codebook mapping and symbol-level interleaving according to an embodiment of the present disclosure.

Referring to FIGS. 39A and 39B, if the symbol-level interleaving pattern is expressed by $\pi_{sym}$, 1) if the symbol-level interleaving pattern acts before codebook mapping, the size of the interleaver is the size L of the symbol sequence; 2) if the symbol-level interleaving pattern acts after codebook mapping and acts on the occupied resource units only, the size of the interleaver is the size $L*M_{ore}$ of the symbol sequence, as shown in FIG. 39A which is a schematic diagram of a grid mapping implementation based on codebook mapping and symbol-level interleaving, and the symbol-level interleaving acts on the occupied resource units only; 3) if the symbol-level interleaving pattern acts after codebook mapping and acts on the entire symbol sequence mapped according to the codebook, the size of the interleaver is L', as shown in FIG. 39B which is a schematic diagram of a grid mapping implementation based on codebook mapping and symbol-level interleaving, and the symbol-level interleaving acts on all resource units. The interleaved symbol sequence is then mapped onto the allocated time-frequency resources.

If it is set to perform segmented grid mapping on the symbol sequence, a symbol sequence $S_k$ is divided into Ns segments first, and each segment of the symbol sequence is successively processed according to the codebook and symbol-level interleaved, and finally each segment of the grid mapped symbol data is mapped onto the allocated time-frequency resources.

In the multi-user iterative detection decoding in the first specific embodiment of the present disclosure, first, the soft information sequence of the transmitter signal obtained by the multi-user detector will pass through grid de-mapping. In this method, if symbol extrinsic information is output by the multi-user detector, punching is performed in a corresponding idle position, i.e., a position without data, according to the resource mapping pattern used by the transmitter first, that is, data in the idle position of the transmitter is directly discarded, the reconstructed symbol extrinsic information sequence is inversely mapped according to the resource mapping pattern to obtain a symbol-level extrinsic information sequence. In this implementation, grid de-mapping is performed according to the codebook and the symbol-level interleaving pattern. Then, the inversely mapped symbol sequence will pass through symbol-to-bit mapping. If bit extrinsic information is outputted by the multi-user detector, first, bits of the bit extrinsic information mapped onto one symbol are grouped, and with regard to the bit groups, punching is performed in a corresponding idle position by using the same resource mapping pattern $\beta_k$ as at the transmitter, and the obtained bit extrinsic information sequence is fed to the interleaving pattern $\alpha_k$ to be interleaved. During the updating of the prior probability information by iteration, the extrinsic information sequence output by the decoder will pass through processing by the same interleaving pattern and grid mapping pattern as at the transmitter to obtain a processed soft information sequence, and this soft information sequence is fed to the multi-user detector as the prior probability information. If the transmitter employs a process of performing segmented grid mapping on the symbol sequence, during the grid de-mapping, the bit extrinsic information sequence of each segment should pass through grid de-mapping, and then, the value in the corresponding idle resource units in the transmitting end is discarded, and the grid de-mapped bit extrinsic information data is cascaded to obtain a bit extrinsic information sequence which is then fed to the interleaving pattern to be de-interleaved.

In a second specific embodiment of the present disclosure, the operation method of a transmitter employing LDPC coding in the present disclosure will be described in detail. The schematic diagram of the transmission principle of the transmitter in this embodiment is as shown in FIGS. 4A and 4B. It is assumed that the transmitter in this embodiment has an information bit sequence $d_k=\{d_k(m), m=0, \ldots, M-1\}$ with a size of M=126, that is, the transmitter has 126 bits. This bit sequence will pass through channel coding. Channel coding is implemented by combination of one LDPC code with a code rate of $R_1=\frac{1}{2}$ and one repetition spreading code with a size of 2, i.e., equivalent code rate of $R_2=\frac{1}{2}$. In this case, the code rate of the whole channel coding is $R_3=R_2R_1=\frac{1}{4}$. Channel coding also can be implemented directly by one LDPC code with a code rate of ¼ or other component codes. The bit sequence $d_k$ will pass through channel coding to obtain a coded sequence $c_k=\{c_k(n), n=0, \ldots, N-1\}$, where N is the size of a channel coded sequence, $N=M/R_3=126*4=504$. The coded sequence $c_k$ is interleaved by an interleaving pattern $\alpha_k$ to obtain an interleaved sequence $x_k=\{x_k(n), n=0, \ldots, N-1\}$. The interleaving pattern $\alpha_k$ is a bit or chip-level interleaver, and the size of the interleaved sequence is kept consistent with the size of the sequence before interleaving. By interleaving, the correlation of adjacent bits or chips is decreased, and this is useful for the receiver to detect bit by bit or chip by chip. The transmitters obtain respective interleaving pattern information and grid mapping pattern information by physical broadcast channels and/or physical downlink control channels and/or physical downlink shared channels. The interleaving pattern information and grid mapping pattern information indicate an interleaving pattern and a grid mapping pattern, which can be indicated in a form of a lookup table or more. In the multiple access method in the second specific embodiment of the present disclosure, the specific information of the interleaving pattern information can be directly configured, or the transmitters can generate respective interleaving pattern according to a master interleaving pattern and a certain generation rule. For example, after a master interleaving pattern is configured, it is cycled k bits to obtain the interleaving pattern of the $k^{th}$ transmitter.

The resulting interleaved sequence $x_k$ will pass through bit-to-symbol modulation to obtain a symbol sequence $S_k=\{S_k(l), l=0, \ldots, L-1\}$, where L is the size of the symbol sequence and depends upon the modulation method used and the size of the interleaved sequence. In the second specific embodiment of the present disclosure, the modulation method used is QPSK, the modulation order is $M_s=2$, that is, two code words (bits) are mapped to one symbol. The size of the symbol sequence is $$L = \frac{N}{M_s} = 252.$$

The symbol sequence $S_k$ will pass through grid mapping to generate a symbol sequence $S'_k=\{S'_k(l'), l=0, \ldots, L'-1\}$, where L' is the size of the grid mapped sequence. There can be various methods to implement grid mapping, and the methods thereof have been described in the first specific embodiment of the present disclosure and will not be repeated here. In addition, if signals are mapped to part of resources, the overall equivalent code rate R of the transmitter is further reduced with respect to the code rate $R_3$, and the degree of reduction is related to the density of the grid mapping pattern. In this embodiment, since the size of the symbol sequence is doubled, the equivalent code rate of the transmitter is further reduced by half, i.e., $$R = \frac{R_3}{2} = \frac{1}{8}.$$

The symbol sequence $S'_k$ will pass through a carrier modulation. In this embodiment, $S'_k$ will pass through OFDM multi-carrier modulation, i.e., IFFT, and then to D/A conversion, up-conversion and then baseband-to-RF process, and finally the signal is transmitted.

At the signal receiving end, a similar detection decoding method to that in the first specific embodiment of the present disclosure is employed. The difference lies in that, in this embodiment, the decoding of the repetition spreading code is performed first followed by the decoding of the LDPC code, and finally the data of the transmitter is obtained by a process of decision. Furthermore, during the updating of the prior probability information of the transmitter signal, it will pass through an LDPC code with a code rate of $R_1=\frac{1}{2}$ and a repetition spreading code with a size of 2. The previous soft information is subtracted to obtain extrinsic information. The obtained extrinsic information will successively pass through re-interleaving and grid remapping by the interleaving pattern $\alpha_k$ and the grid mapping pattern, and the resulting extrinsic information sequence is fed to the multi-user detector as a prior probability sequence which serves as the input of the next iterative detection. Other detection decoding steps have been described in the first specific embodiment of the present disclosure and will not be repeated here.

In a third specific embodiment of the present disclosure, according to the transmitter and the multi-user iterative detection decoding method as described in detail in the first specific embodiment, a multiple access method based on such transmitters will be described in this embodiment. The configurations of the transmitters and the receiver are as shown in FIGS. 4A and 4B, wherein there are K=4 transmitters each employing a same transmission method as in the first specific embodiment. It is assumed that the $k^{th}$ transmitter has a bit sequence $d_k=\{d_k(m), m=0, \ldots, M-1\}$ with a size of M=126 to be transmitted, that is, data transmitted by the transmitter has 126 bits. This bit sequence will pass through channel coding. Channel coding is implemented by combination of one LTE standard Turbo code with a code rate of $R_1=\frac{1}{2}$ and one repetition spreading code with a size of 2, i.e., equivalent code rate of $R_2=\frac{1}{2}$. In this case, the code rate of the channel coding is $R_3=R_2R_1=\frac{1}{4}$. Here, channel coding also can be implemented directly by one Turbo code with a code rate of ¼ or other component codes. The bit sequence $d_k$ will pass through channel coding to obtain a coded sequence $c_k=\{c_k(n), n=0, \ldots, N-1\}$, where N is the size of a channel coded sequence, $N=M/R_3=126*4=504$. The coded sequence $c_k$ is interleaved by an interleaving pattern $\alpha_k$ to obtain an interleaved sequence $x_k=\{x_k(n), n=0, \ldots, N-1\}$.

The interleaving pattern $\alpha_k$ is a chip or bit-level interleaving pattern, and the size of the interleaved sequence is kept consistent with the size of the sequence before interleaving. By interleaving, the correlation of adjacent chips is decreased, and this is useful for chip-by-chip detection at the receiver end. In this embodiment, the transmitters interleave data by mutually different interleaving pattern information, and the receiver de-interleaves the mixed information by mutually different interleaving pattern information, that is, the receiver distinguishes different transmitters by the interleaving patterns used by the transmitters. The transmitters obtain respective interleaving pattern information by physical broadcast channels, physical downlink control channels and/or physical downlink shared channels, wherein the interleaving patterns of K transmitters are mutually different. In this embodiment, the interleaving pattern information of the transmitters can be configured in advance, or the transmitters can generate respective interleaving pattern information according to a pre-configured master interleaving pattern and a certain generation rule. For example, after a master interleaving pattern is configured, it is cycled k bits to obtain the interleaving pattern of the $k^{th}$ transmitter. The interleaving pattern $\alpha_k$ can be generated by randomly shuffling $\{0, 1, \ldots, N\}$. Since the size of the interleaving pattern is N, $A=N!$ different interleaving patterns can be generated by randomly shuffling the order, where $N!=N*(N-1)*(N-2)*\ldots*3*2*1$, i.e., a factorial of N. The probability that the randomly generated two interleaving patterns are same is $$\frac{1}{A^2}.$$

In this embodiment, N=504, and then $$\frac{1}{A^2} \approx 0.$$

FIG. 18 is a schematic diagram of generation of different interleaving patterns of transmitters, where there are K=4 transmitters according to an embodiment of the present disclosure.

Referring to FIG. 18, the randomly generated K interleaving patterns are $\alpha_1=\{4, 503, \ldots, 52\}$, $\alpha_2=\{462, 70, \ldots, 5\}$, $\alpha_3=\{27, 329, \ldots, 131\}$, $\alpha_4=\{48, 413, \ldots, 86\}$. In addition, the interleaving pattern $\alpha_k$ can be generated under a predetermined generation condition. For example, the predetermined generation condition is to ensure a maximum average distance between two interleaving patterns. This average distance is defined as $$\frac{1}{N}\sum_{k1 \neq k2, n=0}^{N-1} |\alpha_{k1}(n) - \alpha_{k2}(n)|.$$

The obtained interleaved sequence $x_k$ will pass through bit-to-symbol modulation to generate a symbol sequence $S_k=\{S_k(l), l=0, \ldots, L-1\}$, where L is the size of the symbol sequence and depends upon the modulation method used and the size of the interleaved sequence. In this embodiment, the modulation method used is QPSK, the modulation order is $M_s=2$, that is, two code words (bits) are mapped to one symbol. The size of the symbol sequence is $$L = \frac{N}{M_s} = 252.$$

The symbol sequence $S_k$ will pass through grid mapping by the grid mapping pattern to generate a symbol sequence $S'_k=\{S'_k(l'), l'=0, \ldots, L'-1\}$, where L' is the size of the grid mapped sequence.

There can be various methods to implement grid mapping, and the methods thereof have been described in the first specific embodiment of the present disclosure and will not be repeated here. The transmitters obtain respective grid mapping pattern information by physical broadcast channels, physical downlink control channels and/or physical downlink shared channels. In this embodiment, differing from the requirements on the interleaving pattern, the configurations of the grid mapping patterns of different transmitters can be the same or different. The configuration of the interleaving pattern and the grid mapping pattern follows the following rule: data sequences, which are obtained by performing interleaving and grid mapping on a same data sequence by using different combinations of interleaving patterns and grid mapping patterns, must be different.

Figure 19A:
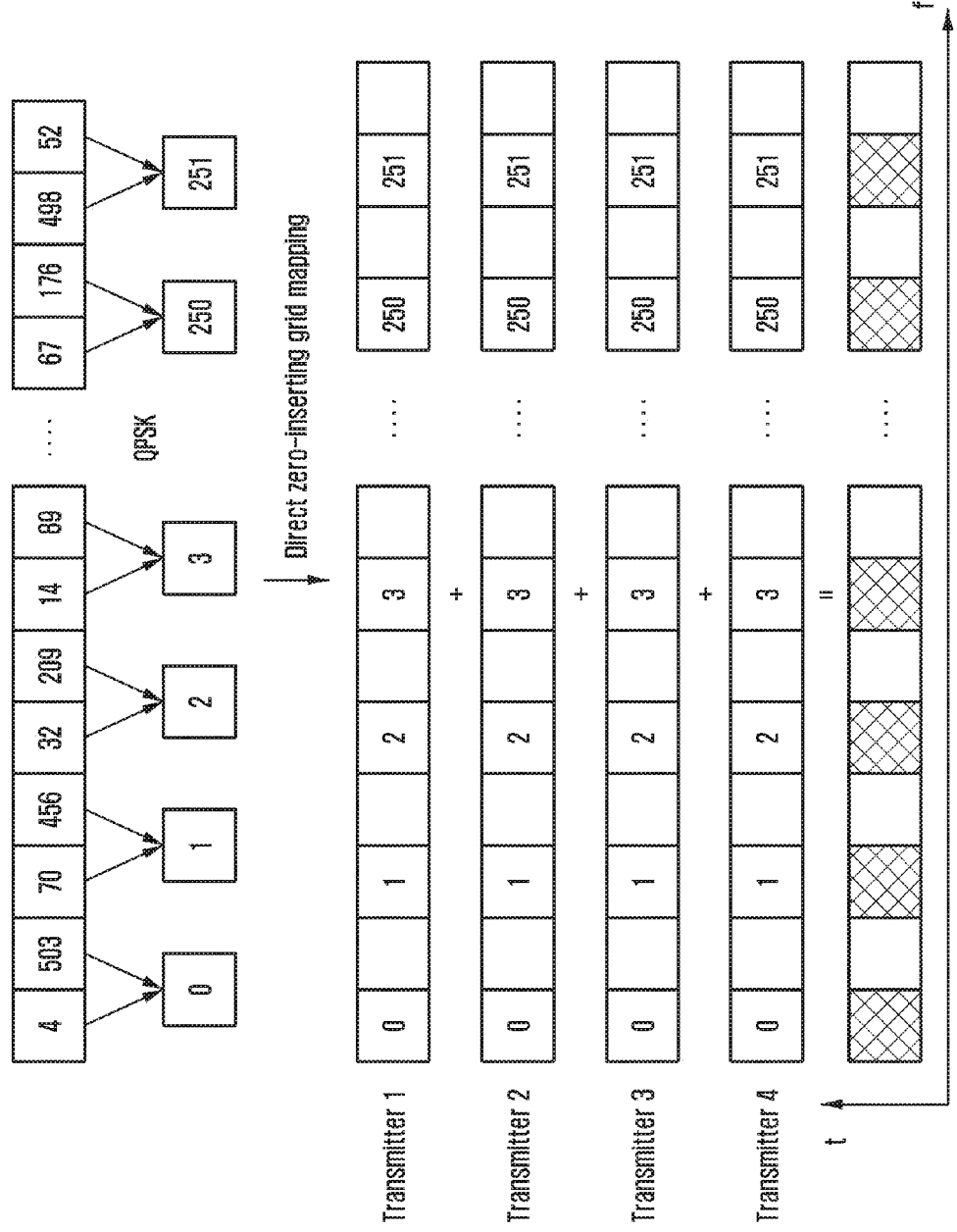

FIGS. 19A to 19C are diagrams of various grid mapping methods according to various embodiments of the present disclosure.

Referring to FIG. 19A, K transmitters employ direct zero-inserting grid mapping as the grid mapping method, and use a same zero-inserting pattern. FIG. 19A only shows a process of a transmitter 1 from $x_1$ to $S'_1$, and a corresponding process of other transmitters is omitted since it is similar to that of the transmitter 1. Due to a same zero-inserting pattern, the relative positions of non-zero symbols of transmitters do not change, and a non-zero symbol in a same position of each transmitter occupies the same time-frequency resource. In addition, different zero-inserting patterns can be used for grid mapping, that is, the relative positions of zero values are different but the order of non-zero symbols does not change.

Referring to FIG. 19B, K transmitters employ zero-padding and interleaving grid mapping as the grid mapping method. The interleaving patterns for grid mapping can be the same or different. The transmitter 3 and the transmitter 4 use a same interleaving pattern, but the interleaving pattern used by these two transmitters is different from those used by the transmitter 1 and the transmitter 2, i.e., $\beta_3=\beta_4 \neq \beta_1 \neq \beta_2$.

K transmitters employ interleaving and zero-inserting grid mapping as the grid mapping method. The interleaving patterns $\beta_{ki1}$ and zero-inserting patterns $\beta_{ki2}$ configured for the transmitters can be the same or different.

K transmitters employ interleaving grid mapping as the grid mapping method. The interleaving patterns $\beta_{ki}$ and resource mapping patterns $\beta_{ka}$ configured for the transmitters can be the same or different.

K transmitters employ direct grid mapping as the grid mapping method. The resource mapping patterns $\beta_k$ configured for the transmitters can be the same or different.

Referring to FIG. 19C, the transmitters can employ different grid mapping methods. For example, the transmitter 1 and the transmitter 2 employ direct zero-inserting gird mapping, where the zero-inserting patterns can be the same or different, and the transmitter 3 and the transmitter 4 employ zero-padding and interleaving grid mapping, where the interleaving patterns can be the same or different. For different transmitters, the various grid mapping methods as described in detail in the first specific embodiment can be configured, or one or more or all of those grid mapping methods can be selected.

The purpose of grid mapping according to the grid mapping pattern is that symbols carrying information about a transmitter can be mapped onto all or part of time-frequency resources allocated thereto. This facilitates combatting interference and fading, and is useful for supporting more transmitters in same time-frequency resources. In addition, since signals are mapped to part of resources, the overall equivalent code rate R of the transmitter is further reduced with respect to the code rate $R_3$, and the degree of reduction is related to the density of the grid mapping pattern. In this embodiment, since the size of the symbol sequence is doubled, the equivalent code rate of the transmitter is further reduced by half, i.e., $$R = \frac{R_3}{2} = \frac{1}{8}.$$

The symbol sequence $S'_k$ will pass through a carrier modulation. In this embodiment, $S'_k$ will pass through OFDM multi-carrier modulation, i.e., IFFT, and then to D/A conversion, up-conversion and then baseband-to-RF process, and finally the signal is transmitted.

At the receiving end, signals transmitted by K transmitters are joined together, and interfered by noise to generate a mixed signal. The receiver employs multi-user iterative detection decoding. The receiver performs RF-to-baseband processing on the received mixed signal first, as shown in FIG. 6. The signal obtained by FFT is fed to a multi-user detector. In the first iteration, first, in the multi-user detector, the posterior probability information of each transmitter signal is calculated according to the preset prior probability information of the transmitter signal and the channel information of each transmitter estimated from the transmitted reference signal, and extrinsic information sequence is calculated in combination with the prior probability information. The extrinsic information sequence will then will pass through grid de-mapping according to the grid mapping pattern of each transmitter, and then a soft information sequence obtained by grid de-mapping will pass through a corresponding interleaving pattern $\alpha_k$ corresponding to the transmitter to be de-interleaved, and the de-interleaved soft information is input to a decoder. In the decoder, corresponding decoding is performed according to the component code used by the transmitter. In this embodiment, the decoding of the repetition spreading code is performed first followed by the decoding of the Turbo code, and finally the data of the transmitter is obtained by a process of decision. To prepare for a next iterative detection, it is necessary to update the prior probability information of the transmitter signal. It is necessary to perform, on the soft information which is obtained by decoding, the same channel coding as at the transmitter, i.e., by a same component code or a combination of component codes as at the transmitter. In this embodiment, it will pass through a Turbo code with a code rate of $R_1=\frac{1}{2}$ and a repetition spreading code with a size of 2, and then the previous soft information is subtracted to obtain extrinsic information. The obtained extrinsic information will successively pass through re-interleaving and grid remapping by the interleaving pattern and the grid mapping pattern, and the resulting extrinsic information sequence is fed to the multi-user detector as a prior probability sequence which serves as the input of the next iterative detection. Hereto, an iterative detection is completed, and the above operations are repeated for a next iterative detection decoding. In the first iteration, there is no prior probability information, and a prior probability input to the multi-user detection is thus an equal-probability distribution, and the prior probability information, which is updated by the last iteration, is used in the subsequent iterations. The multi-user signal detector as described above can be an ESE, or an MPA based detector, or an SIC based detector, or more.

When the number of iterations reaches a preset maximum value, a process of hard decision is performed in the decoder to obtain the final information data result of the transmitter. A transmitter, from which data is transmitted, is distinguished according to a corresponding allocated interleaving pattern $\alpha_k$.

In a fourth specific embodiment of the present disclosure, a multiple access method in which the transmitters are distinguished by the grid mapping pattern will be described in detail. In this embodiment, the configurations of the transmitters and the receiver are as shown in FIGS. 4A and 4B. The system has K=4 transmitters each employing a same transmission method as in the first specific embodiment. It is assumed that the $k^{th}$ transmitter has a bit sequence $d_k=\{d_k(m), m=0, \ldots, M-1\}$ with a size of M=126 to be transmitted, that is, data transmitted by the transmitter has 126 bits. This bit sequence will pass through channel coding. Channel coding is implemented by combination of one LTE standard Turbo code with a code rate of $R_1=\frac{1}{2}$ and one repetition spreading code with a size of 2, i.e., equivalent code rate of $R_2=\frac{1}{2}$. In this case, the code rate of the whole channel coding is $R_3=R_2R_1=\frac{1}{4}$. Here, channel coding also can be implemented directly by one Turbo code with a code rate of $\frac{1}{4}$ or other component codes. The bit sequence $d_k$ will pass through channel coding to obtain a coded sequence $c_k=\{c_k(n), n=0, \ldots, N-1\}$, where N is the size of a channel coded sequence, $N=M/R_3=126*4=504$. The coded sequence $c_k$ is interleaved by an interleaving pattern $\alpha_k$ to obtain an interleaved sequence $x_k=\{x_k(n), n=0, \ldots, N-1\}$. The interleaving pattern $\alpha_k$ is a chip or bit-level interleaving pattern, and the size of the interleaved sequence is kept consistent with the size of the sequence before interleaving. By interleaving, the correlation of adjacent chips or bits is decreased, and this is useful for chip-by-chip detection at the receiver end. In this embodiment, the transmitters obtain respective interleaving pattern information by physical broadcast channels, physical downlink control channels and/or physical downlink shared channels, wherein the interleaving patterns of the transmitters can be the same or different. The transmitters can generate respective interleaving patterns according to respective predetermined generation methods, or can generate respective interleaving patterns according to a configured master interleaving pattern and a certain generation rule. For example, after a master interleaving pattern is configured, it is cycled k bits to obtain the interleaving pattern of the $k^{th}$ transmitter. The interleaving pattern $\alpha_k$ can be generated by randomly shuffling {0, 1, . . . , 503}, where numerical values from 0 to N in the interleaving pattern denote an order of positions in which data occupies.

FIG. 20A is a schematic diagram of a scenario in which a same interleaving pattern is used by K=4 transmitters and FIG. 20B is a schematic diagram of a scenario in which a same interleaving pattern is used by the transmitter 1 and the transmitter 2 while another interleaving pattern is used by the transmitter 3 and the transmitter 4, among K=4 transmitters according to various embodiments of the present disclosure.

Referring to FIG. 20A, different transmitters can use a same interleaving pattern $\alpha_k$, and K transmitters share a same interleaving pattern, i.e., $\alpha_1=\alpha_2=\alpha_3=\alpha_4$. Wherein, one special case is that the interleaving pattern $\alpha_k$ is in an order of {0, 1, . . . , 503}. Equivalently, no interleaver is used for the coded sequence.

Referring to FIG. 20B, in multiple transmitters, some transmitters use a same interleaving pattern while the others use another same interleaving pattern. For example, the transmitter 1 and the transmitter 2 use a same interleaving pattern $\alpha_1=\alpha_2$, and the transmitter 3 and the transmitter 4 use another same interleaving pattern $\alpha_3=\alpha_4$ and $\alpha_1 \neq \alpha_3$.

The resulting interleaved sequence $x_k$ will pass through bit-to-symbol modulation to obtain a symbol sequence $S_k=\{S_k(l), l=0, \ldots, L-1\}$, where L is the size of the symbol sequence and depends upon the modulation method used and the size of the interleaved sequence. In this embodiment, the modulation method used is QPSK, the modulation order is $M_s=2$, that is, two code words (bits) are mapped to one symbol. The size of the symbol sequence is $$L = \frac{N}{M_s} = 252.$$

The symbol sequence $S_k$ will pass through grid mapping to generate a symbol sequence $S'_k=\{S'_k(l'), l=0, \ldots, L'-1\}$, where L' is the size of the grid mapped sequence. There can be various methods to implement grid mapping, and the methods thereof have been described in the first specific embodiment of the present disclosure and will not be repeated here.

The transmitters obtain grid mapping pattern information by physical broadcast channels, physical downlink control channels and/or physical downlink shared channels. In this embodiment, differing from the interleaving pattern, the grid mapping patterns of different transmitters can be kept mutually different to ensure that data from different transmitters can be distinguished at the receiver end. In addition, the configuration of the interleaving pattern and the grid mapping pattern follows the following rule: data sequences, which are obtained by performing interleaving and grid mapping on a same data sequence by using different combinations of interleaving patterns and grid mapping patterns, must be different.

FIG. 21A is a schematic diagram of direct zero-inserting grid mapping according to an embodiment of the present disclosure.

Referring to FIG. 21A, K transmitters all employ direct zero-inserting grid mapping, that is, the zero-inserting patterns of the transmitters must be ensured different. FIG. 21A only shows a process of a transmitter 1 from $x_1$ to $S'_1$, and a corresponding process of other transmitters is omitted since it is similar to that of the transmitter 1. Due to the use of direct zero-inserting, the relative positions of non-zero symbols of transmitters do not change, but a non-zero symbol in a same position of each transmitter can occupy different time-frequency resources.

Figure 21B:
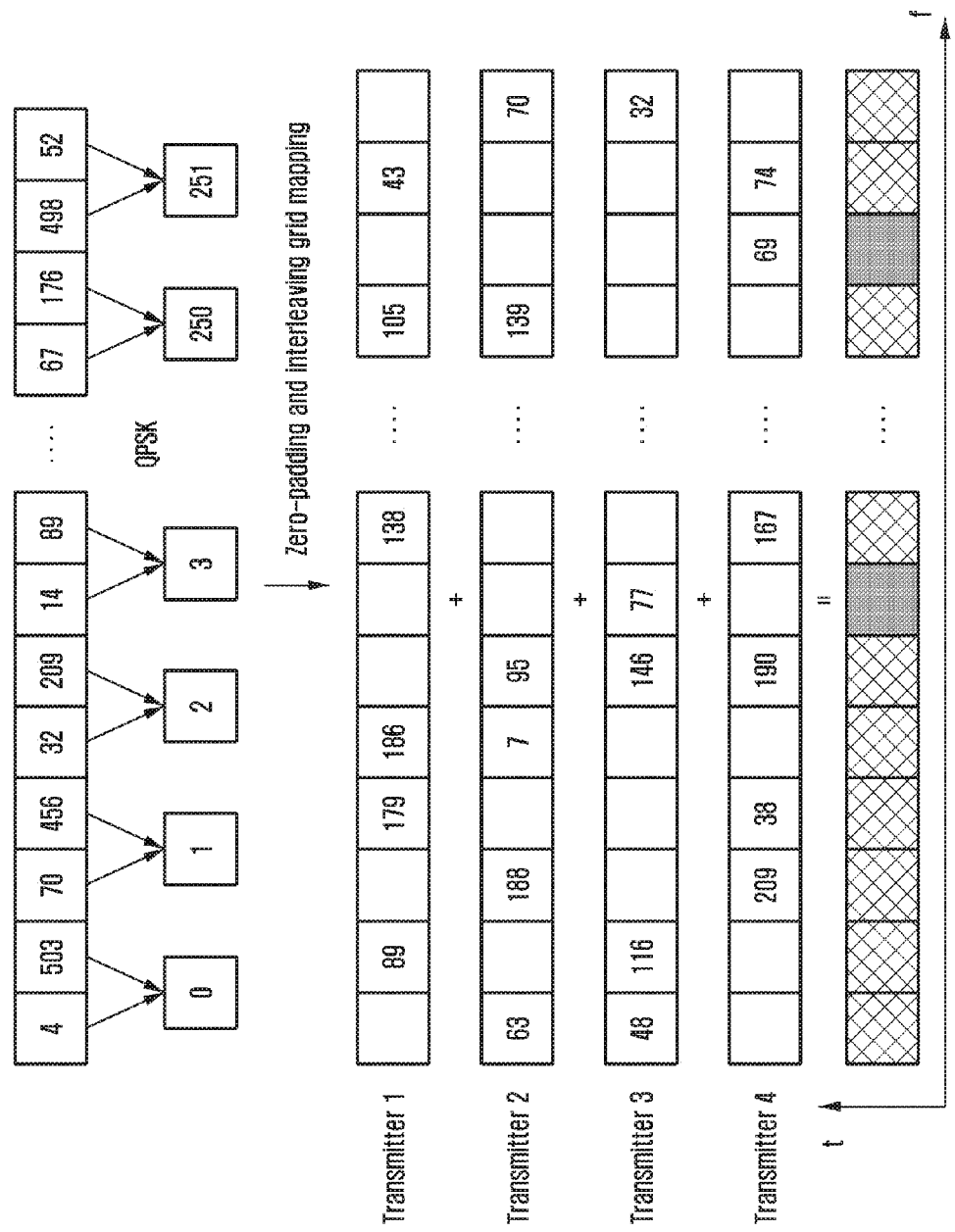

FIG. 21B is a schematic diagram of zero-padding and interleaving grid mapping according to an embodiment of the present disclosure.

Referring to FIG. 21B, zero-padding and interleaving grid mapping also can be used for grid mapping. The interleaving patterns used by different transmitters are different.

In addition, K transmitters can all employ interleaving and zero-inserting grid mapping. The interleaving patterns $\beta_{ki1}$ and zero-inserting patterns $\beta_{ki2}$ configured by the system can be the same or different. The configuration of the interleaving pattern and the zero-inserting pattern follows the following rule: data sequences, which are obtained by through same data to the interleaving patterns $\beta_{ki1}$ and the zero-inserting patterns $\beta_{ki2}$ must be different. That is, the grid mapping patterns $\beta_k$ at different transmitter ends must be ensured different.

In addition, K transmitters can all employ interleaving grid mapping. The configured interleaving patterns $\beta_{ki}$ and resource mapping patterns $\beta_{ka}$ can be the same or different. The configuration of the interleaving pattern and the resource mapping pattern follows the following rule: data sequences, which are obtained by through same data to the interleaving patterns $\beta_{ki}$ and the resource mapping patterns $\beta_{ka}$, must be different. That is, the grid mapping patterns $\beta_k$ at different transmitter ends must be ensured different.

In addition, K transmitters can all employ direct grid mapping. The resource mapping patterns $\beta_k$ configured for different transmitters must be ensured different.

Figure 21C:
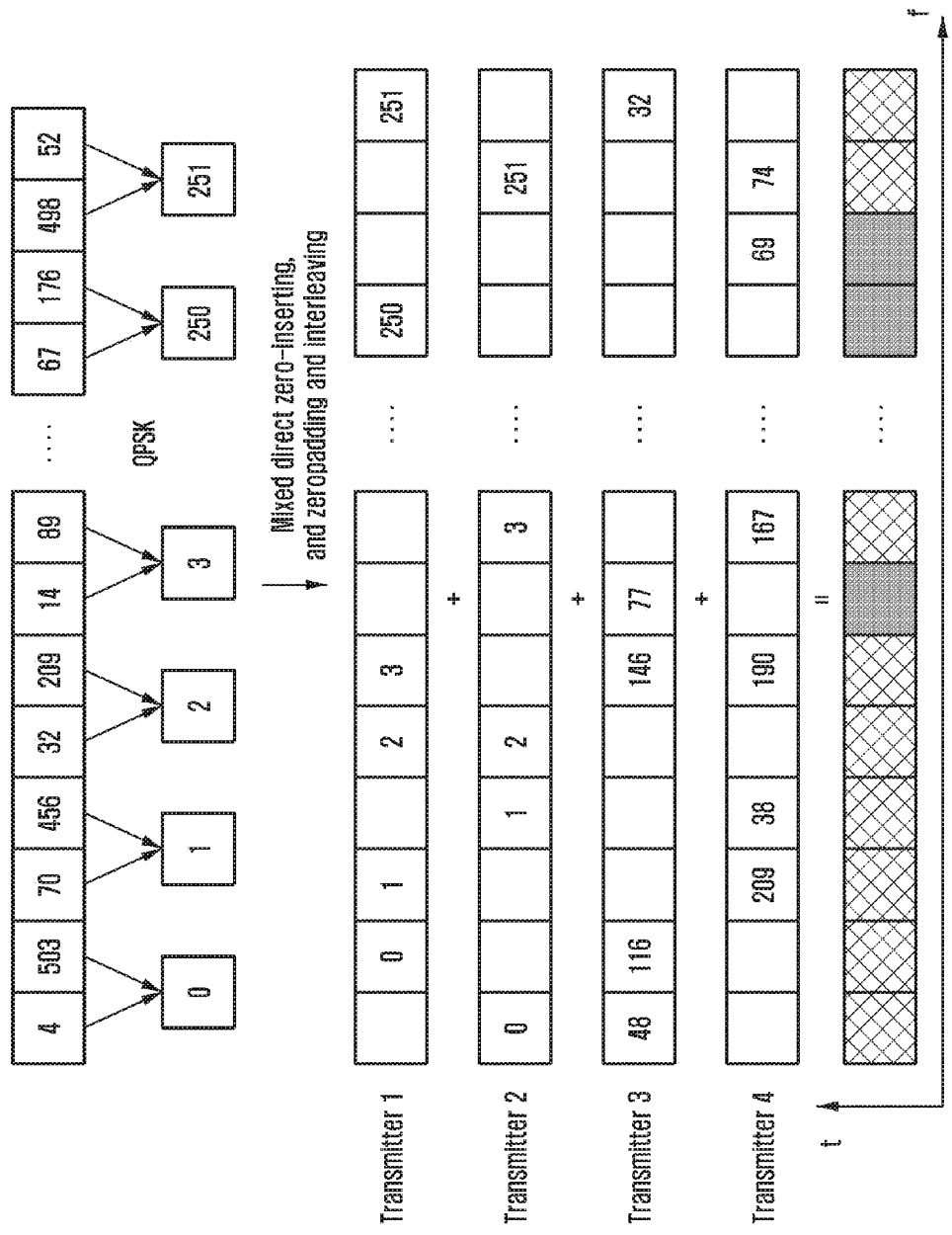

FIG. 21C is a schematic diagram of mixed direct zero-inserting and zero-padding and interleaving grid mapping according to an embodiment of the present disclosure.

Referring to FIG. 21C, different grid mapping methods can be configured for the transmitters. For example, the transmitter 1 and the transmitter 2 both employ direct zero-inserting grid mapping, but the zero-inserting patterns must be different, and the transmitter 3 and the transmitter 4 both employ zero-inserting and interleaving grid mapping, but the zero-inserting and interleaving patterns must be different.

In addition, for different transmitters, the various grid mapping methods as described in the first specific embodiment can be configured, or one or more or all of those grid mapping methods can be selected. The configuration follows the following rule: data sequences, which are obtained through a same data sequence to different grid mapping, must be different.

The purpose of grid mapping according to the grid mapping pattern is that symbols carrying information about a transmitter can be mapped onto time-frequency resources allocated thereto. This facilitates combatting interference and fading, and is useful for supporting more transmitters in same time-frequency resources. In addition, if signals are mapped to part of resources, the overall equivalent code rate R of the transmitter is further reduced with respect to the code rate $R_3$, and the degree of reduction is related to the density of the grid mapping pattern. In this embodiment, since the size of the symbol sequence is doubled, the equivalent code rate of the transmitter is further reduced by half, i.e., $$R = \frac{R_3}{2} = \frac{1}{8}.$$

The symbol sequence $S'_k$ will pass through a carrier modulation. In this embodiment, $S'_k$ will pass through OFDM multi-carrier modulation, i.e., IFFT, and then to resource mapping, D/A conversion, up-conversion and then baseband-to-RF process, and finally the signal is transmitted.

At the receiver end, signals transmitted by K transmitters are joined together by the respective channels, and interfered by noise to generate a mixed signal. The receiver employs multi-user iterative detection. A received mixed signal will pass through RF-to-baseband processing first. The signal obtained by FFT is fed to a multi-user detector. In the first iteration, first, in the multi-user detector, the posterior probability information of each transmitter signal is calculated according to the preset prior probability information of the transmitter signal and the channel information of each transmitter estimated from the transmitted reference signal, and extrinsic information sequence is calculated in combination with the prior probability information, the extrinsic information sequence will then pass through de-interleaving according to the grid mapping pattern of each transmitter. If the output extrinsic information sequence is symbol extrinsic information, the grid de-mapper is a symbol-level de-interleaving pattern, and symbol-to-bit de-mapping is performed after the de-interleaving to obtain the grid de-mapped bit extrinsic information, and if the output extrinsic information is bit extrinsic information, the grid de-mapper groups bits mapped onto one symbol, and performs grid de-mapping on the bit groups to obtain the bit extrinsic information, and then, the grid de-mapped soft information sequence will pass through an interleaving pattern $\alpha_k$ corresponding to the transmitter to be de-interleaved. The de-interleaved soft information is inputted to a decoder. In the decoder, corresponding decoding is performed according to the component code used by the transmitter. In this embodiment, the decoding of the repetition spreading code is performed first followed by the decoding of the Turbo code, and finally the data of the transmitter is obtained by a process of decision. To prepare for a next iterative detection, it is necessary to update the prior probability information of the transmitter signal. It is necessary to perform, on the soft information which is obtained by decoding, the same channel coding as at the transmitter, i.e., by a same component code or a combination of component codes as at the transmitter. In this embodiment, it will pass through a Turbo code with a code rate of $R_1 = \frac{1}{2}$ and a repetition spreading code with a size of 2, and the previous soft information is subtracted to obtain extrinsic information. The obtained extrinsic information will successively pass through remapping by the interleaving pattern $\alpha_k$ and the grid mapping pattern, and the resulting extrinsic information sequence is fed to the multi-user detector as a prior probability sequence which serves as the input of the next iterative detection. Hereto, an iterative detection is completed, and the above operations are repeated for a next iterative detection decoding. In the first iteration, there is no prior probability information, and a prior probability input to the multi-user detector is thus an equal-probability distribution, and the prior probability information, which is updated by the last iteration, is used in the subsequent iterations. The multi-user signal detector as described above can be an ESE, or an MPA based detector, or an SIC based detector, or more.

When the number of iterations reaches a preset maximum value, a process of hard decision is performed in the decoder to obtain the final information data result of the transmitter. A transmitter, from which data is transmitted, is distinguished by the receiver according to a corresponding allocated grid mapping pattern. In a fifth specific embodiment of the present disclosure, a multiple access method based on the combination of the interleaving pattern and the grid mapping pattern will be described, that is, the transmitters are distinguished according to a combination of the interleaving pattern and the grid mapping pattern. The configurations of the transmitters and the receiver are as shown in FIGS. 4A and 4B. By K=4 transmitters, a data sequence to be transmitted will pass through channel coding to generate a coded sequence, the coded sequence is fed to the interleaving pattern $\alpha_k$, then to bit-to-symbol modulation, and then to grid mapping. The transmission flow and the detection decoding flow of the receiver have been described in the above embodiments and will not be repeated here.

In this embodiment, the transmitters are distinguished by the combination of the interleaving pattern and the grid mapping pattern. The interleaving pattern and the grid mapping pattern of a transmitter are configured by the system, and each of the transmitters is informed of the interleaving pattern and the grid mapping pattern by a physical broadcast channel, physical downlink control channel or physical downlink shared channel. The combination of the interleaving pattern and the grid mapping pattern, i.e., the joint effect thereof, is expressed by $\alpha_k \beta_k$.

According to the implementations of the interleaving pattern and the grid mapping pattern, there can be following possible combinations.

Different transmitters use same interleaving patterns $\alpha_k$, i.e., $\alpha_1 = \alpha_2 = \alpha_3 = \alpha_4 = \alpha$, but different grid mapping patterns, i.e., $\beta_1 \neq \beta_2 \neq \beta_3 \neq \beta_4$. Different transmitters can use different grid mapping methods, or, can use a same grid mapping method but correspondingly different grid mapping patterns. At the receiver, a multi-user iterative detection receiver distinguishes the transmitters according to a combination of the interleaving pattern and the grid mapping pattern, that is, distinguish the $k^{th}$ transmitter according to $\alpha \beta_k$.

Different transmitters use mutually different interleaving patterns $\alpha_k$, i.e., $\alpha_1 \neq \alpha_2 \neq \alpha_3 \neq \alpha_4$, but same grid mapping patterns, i.e., $\beta_1 = \beta_2 = \beta_3 = \beta_4 = \beta$. Different transmitters can use different grid mapping methods with a same result of grid mapping, that is, data sequences, which are obtained by subjecting a same data sequence to different grid mapping patterns, are the same. At the receiver end, a receiver distinguishes the transmitters according to a combination of the interleaving pattern and the grid mapping pattern, that is, distinguish the $k^{th}$ transmitter according to $\alpha_k \beta$.

The interleaving patterns used by the different transmitters are grouped so that transmitters in a same group use a same interleaving pattern and transmitters between different groups use different interleaving patterns. In this embodiment, the transmitter 1 and the transmitter 2 are in a group and use a same interleaving pattern $\alpha_A$, i.e., $\alpha_1 = \alpha_2 = \alpha_A$, the transmitter 3 and the transmitter 4 are in a group and use a same interleaving pattern $\alpha_B$, i.e., $\alpha_3 = \alpha_4 = \alpha_B$, and $\alpha_A \neq \alpha_B$. According to this method of grouping, transmitters in a same group use different grid mapping patterns and transmitters between different groups use same or different grid mapping patterns. In this embodiment, $\beta_1 \neq \beta_2$ and $\beta_3 \neq \beta_4$, but no restriction on whether $\beta_1$, $\beta_2$ and $\beta_3$, $\beta_4$ are different or not. A receiver distinguishes the transmitters according to a combination of the interleaving pattern and the grid mapping pattern, that is, distinguish the $k^{th}$ transmitter according to $\alpha_k \beta_k$. Optionally, all transmitters use different interleaving patterns and also different grid mapping patterns. The configuration of the interleaving pattern and the grid mapping pattern follows the following rule: data sequences, which are obtained by passing a same data sequence through the combinations of different interleaving patterns and grid mapping patterns, are different. The interleaving pattern information and the grid mapping pattern information employed by multiple transmitters are determined according to network load. It is determined that the multiple transmitter ends employ mutually different interleaving pattern information or mutually different grid mapping pattern information, when the network load is lower than or equal to a preset threshold, and that the multiple transmitters employ mutually different combinations of interleaving pattern information and the grid mapping pattern information, when the network load is higher than the preset threshold. The transmitters are distinguished by the interleaving pattern or grid mapping pattern, when the network load is low, that is, when there is a small number of transmitters, and the transmitters are distinguished by combinations of the interleaving pattern and the grid mapping pattern, when the network load is high, that is, when there is a large number of transmitters. After deciding the method employed to distinguish transmitters, the receiver transmits the interleaving pattern information and the grid mapping pattern information to the transmitters by a physical broadcast channel, physical downlink control channel and/or physical downlink shared channel. The transmitter processes data to be transmitted according to the interleaving pattern information and the grid mapping pattern information acquired from the above channel.

In the forgoing specific embodiments of the present disclosure, multiple transmitters transmit a bit sequence having a same size, i.e., a same M, the bit sequence will pass through a same channel coding method, i.e., a same component code or a combination of component codes, in a same code rate $R_3$, the obtained coded sequence is interleaved by an interleaving pattern having a same size and then will pass through grid mapping by a grid mapping pattern, wherein the density of the grid mapping pattern is also the same, that is, the number of zero values is the same during the zero-padding and interleaving grid mapping, the direct zero-inserting grid mapping, and the interleaving and zero-inserting grid mapping, and the number of idle REs is the same during the interleaving grid mapping and the direct grid mapping, the codebook grid mapping, and the codebook interleaving grid mapping. The overall equivalent code rates R of different transmitters are also the same so as to ensure that symbol sequences from different transmitters can be mapped onto the same time-frequency resources. The number of idle REs is, for an individual transmitter, the number of REs which have not yet been used in the transmission by the $k^{th}$ transmitter among a certain number of time-frequency resource REs allocated thereto.

In a sixth specific embodiment of the present disclosure, by adjusting the code rate $R_{k3}$ and the density $\beta_k$ of the grid mapping pattern of transmitters, different transmitters can have a different overall equivalent code rate R, while ensuring that the symbol sequences of different transmitters can be mapped onto the same time-frequency resources, i.e., same $N_{RE}$ REs.

It is assumed that the $k^{th}$ transmitter has a bit sequence $d_k=\{d_k(m), m=0, \ldots, M_k-1\}$ with a size of $M_k$. This bit sequence will pass through channel coding. If channel coding is implemented by one component code having a rate of $R_{1k}$ and the component code can be a Turbo code or an LDPC code or more, the code rate of the whole channel coding is $R_{k3}=R_{1k}$. If channel coding is implemented by a component code 1 with a code rate of $R_{1k}$, a component code 2 with a code rate of $R_{2k}$, ..., and a component code F with a code rate of $R_{Fk}$, the code rate of the whole channel coding is $R_{k3}=R_{1k}*R_{2k}* \ldots *R_{Fk}$. The bit sequence $d_k$ will pass through channel coding to obtain a coded sequence $c_k=\{c_k(n), n=0, \ldots, N_k-1\}$, where $N_k$ is the size of a sequence channel coded by the $k^{th}$ transmitter, $N_k=M_k/R_{k3}$. The coded sequence $c_k$ is interleaved by an interleaving pattern $\alpha_k$ to obtain an interleaved sequence $x_k=\{x_k(n), n=0, \ldots, N_k-1\}$. The interleaving pattern $\alpha_k$ is a chip or bit-level interleaving pattern, and the size of the interleaved sequence is kept consistent with the size of the sequence before interleaving. By interleaving, the correlation of adjacent chips is decreased, and this is useful for chip-by-chip detection at the receiver end. The generation of and interleaving according to the interleaving pattern $\alpha_k$ have been described in detail in the above embodiments and will not be repeated here.

The obtained interleaved sequence $x_k$ will pass through bit-to-symbol modulation to generate a symbol sequence $S_k=\{S_k(l), l=0, \ldots, L_k-1\}$, where $L_k$ is the size of the symbol sequence and depends upon the modulation method used and the size of the interleaved sequence. In this embodiment, the modulation method used by the $k^{th}$ transmitter has a modulation order of $M_{ks}$, that is, $M_{ks}$ coded bits are mapped to one symbol. The size of the symbol sequence is $$L_k = \frac{N_k}{M_{ks}}.$$

The symbol sequence $S_k$ will pass through grid mapping by the grid mapping pattern to generate a sparse symbol sequence $S'_k=\{S'_k(l'), l'=0, \ldots, L'_k-1\}$, where L' is the size of the grid mapped sequence. There can be various methods to implement grid mapping, and the methods thereof have been described in the first specific embodiment and will not be repeated here. Its purpose is that symbol sequences carrying transmitter information can be mapped onto all or part of time-frequency resources allocated thereto. This facilitates combatting interference and fading, and is useful for supporting more transmitters in same time-frequency resources. In addition, if signals are mapped to part of resources, the overall equivalent code rate $R_k$ of the transmitter is further reduced with respect to the code rate $R_3$, and the degree of reduction is related to the density of the grid mapping pattern. The density of the grid mapping pattern is determined by the number $N_{k0}$ of zero values added by the transmitter to the grid mapping pattern or of idle REs. In this embodiment, same $N_{RE}=504$ REs are allocated to K=4 transmitters, and by adjusting the code rate and the density of the grid mapping pattern, the overall equivalent code rate $R_k$ of the transmitters can be flexibly adjusted. Table 1 is a configuration example of the coding and modulation method and the density of the grid mapping pattern. As shown in Table 1, the transmitter 1 has a lowest density $\rho_k=0.125$, a largest number of zero values $N_{k0}=441$, a maximum degree of reduction of the overall equivalent code rate $R_k$ with respect to the code rate $R_{k3}$, i.e., $$\frac{R_{k3}}{R_k} = \frac{1}{4}.$$

The transmitter 4 requires no addition of zero values, and has a largest density of 1 and an unchanged overall equivalent code rate $R_k$ with respect to the code rate $R_{k3}$.

TABLE 1

| Information size $M_k$ | Code rate $R_{k3}$ | Modulation order $M_{ks}$ | Density $\rho_k$ | Overall equivalent Code rate $R_k$ |
|---|---|---|---|---|
| 63 | 1/2 | 2 | 0.125 | 1/16 |
| 126 | 1/3 | 2 | 0.375 | 1/8 |
| 126 | 1/4 | 4 | 0.25 | 1/16 |
| 252 | 1/4 | 2 | 1 | 1/4 |

If a transmitter k is to transmit a bit sequence with a size of $M_k$, under a given code rate $R_{k3}$ and given time-frequency resources allocated thereto, according to the modulation order $M_s$, it can be determined by calculation that the density of the grid mapping pattern is $\rho_k = M_k/(R_{k3}*M_{ks}*N_{RE})$, the required number of zero values $N_{k0}$ or idle REs is $N_{k0} = N_{RE} - M_k/(R_{k3}*M_{ks})$, and the overall equivalent code rate of the transmitter k is $R_k = M_k/(N_{RE}*M_{ks})$. In addition, under the same power given for the transmitters, by adjusting the density $\rho_k$ or by adjusting $N_{k0}$, the power $P_s$ of an individual symbol can be adjusted, as shown in Table 2. Table 2 shows a relation between the number of zero values $N_{k0}$ and the power $P_s$ of symbols, wherein the configuration conditions of Table 2 are the same as those in Table 1. Further, the total power of each of the transmitter ends is normalized to 1, under given time-frequency resources and data to be transmitted, it can be determined, from Table 2, that the density of the grid mapping pattern at the transmitter ends is inversely proportional to the power of symbols, that is, the number of zero values is directly proportional to the power of symbols. The lower the density is, the bigger the number of zero values is, and the smaller the number of symbols in a symbol sequence is. However, since the total power is constant, the power allocated to each symbol becomes higher. By adjusting the density of the grid mapping pattern or by adjusting the coding and modulation method of the transmitter, the power of symbols of the transmitter can be adjusted.

TABLE 2

| Density $\rho_k$ | The number of zero values $N_{k0}$ | Power of symbol $P_s$ |
|---|---|---|
| 0.125 | 441 | 1/63 ≈ 0.016 |
| 0.375 | 315 | 1/189 ≈ 0.005 |
| 0.25 | 378 | 1/126 ≈ 0.008 |
| 1 | 0 | 1/504 ≈ 0.002 |

The symbol sequence $S'_k$ will pass through carrier modulation. In this embodiment, $S'_k$ will pass through OFDM multi-carrier modulation, i.e., IFFT, and then to resource mapping, D/A conversion, up-conversion and then baseband-to-RF process, and finally the signal is transmitted.

At the receiver end, signals transmitted by multiple transmitters are joined together, and interfered by noise to generate a mixed signal. In this embodiment, the receiver employs multi-user iterative detection. RF-to-baseband processing is performed on a received mixed signal first, and the signal obtained by FFT is fed to a multi-user detector. In the first iteration, first, in the multi-user detector, the posterior probability information of each transmitter signal is calculated according to the preset prior probability information of the transmitter signal and the channel information of each transmitter estimated from the transmitted reference signal, and extrinsic information sequence is calculated in combination with the prior probability information, and then the extrinsic information sequence will pass through grid de-mapping according to the grid mapping pattern employed by each transmitter, and then, the grid de-mapped soft information sequence will pass through an interleaving pattern $\alpha_k$ corresponding to the transmitter to be de-interleaved. The de-interleaved soft information is inputted to a decoder. In the decoder, corresponding decoding is performed according to the component code used by the transmitter. To prepare for a next iterative detection, it is necessary to update the prior probability information of the transmitter signal. Hence, it is necessary to perform, on the soft information which is obtained by decoding, the same channel coding as at the transmitter, i.e., by a same component code or a combination of component codes as at the transmitter, to subtract the soft information obtained by previous calculation to obtain extrinsic information, re-interleave the obtained extrinsic information by the interleaving pattern $\alpha_k$ and grid remap by the grid mapping pattern, and finally, input the obtained extrinsic information sequence to the multi-user detector as the prior probability information which serves as the input of the next iterative detection. Hereto, an iterative detection is completed, and the above operations are repeated for a next iterative detection decoding. When the number of iterations reaches a preset maximum value, a process of hard decision is performed in the decoder to obtain the final data result of the transmitter. In the first iteration, there is no prior probability information, and a prior probability input to the multi-user detector is thus an equal-probability distribution, and the prior probability information, which is updated by the last iteration, is used in the subsequent iterations. The multi-user signal detector as described above can be an ESE, or an MPA based or SIC based detector, or more.

In a seventh specific embodiment of the present disclosure, a solution combining the multiple access method and the carrier modulation will be described in detail. As described in the third specific embodiment, K transmitters employ the multiple access method as provided by the present disclosure, and the receiver detects data transmitted by the K transmitters by a multi-user iterative detection decoding structure as shown in FIGS. 4A and 4B. Since the carrier modulation has the characteristics of flexible resource allocation and facilitation to combat multi-path fading, the combination with the carrier modulation is able to exert the advantages of the multiple access method as provided by the present disclosure. In this embodiment, a specific implementation of combination with various carrier modulation methods will be described in detail.

DFT-spread-orthogonal frequency division multiplexing (DFT-s-OFDM), also called single-carrier OFDMA (SC-FDMA), is an uplink carrier modulation method used in long-term evolution/long-term evolution-Advanced (LTE/LTE-A).

Figure 22:
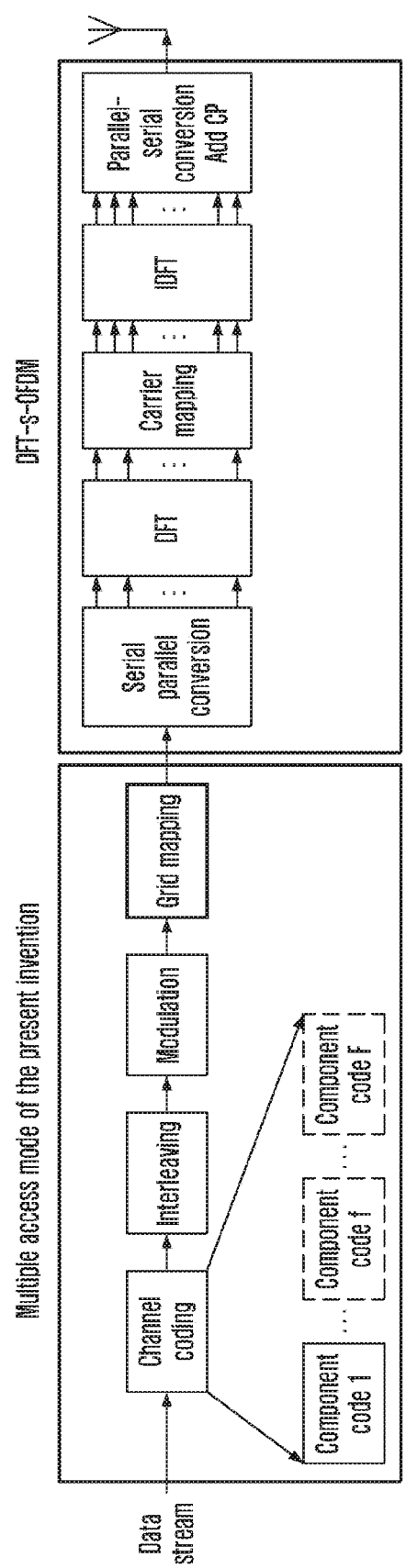
FIG. 22 is a structure diagram of a transmitter complying with the multiple access combined with discrete fourier transfer-s-orthogonal frequency division multiplexing (DFT-s-OFDM) according to an embodiment of the present disclosure.

FIG. 22 is a schematic structure diagram of a transmitter complying with the multiple access method combined with DFT-s-OFDM according to an embodiment of the present disclosure.

Referring to FIG. 22, a data stream to be transmitted will passed through channel coding, interleaving, modulation and grid mapping, and then DFT-s-OFDM modulation. The right half of FIG. 22 is a block diagram of DFT-s-OFDM. A serial data stream will pass through serial-to-parallel conversion to be converted to a parallel data stream. The parallel data stream will pass through DFT to obtain DFT-spread data, and the data will pass through carrier mapping and IDFT and then to parallel-serial conversion and is prefixed with a cyclic prefix (CP) to obtain the data to be transmitted. It is to be noted that, the size of data before carrier mapping is different from that after carrier mapping, and the size of data after carrier mapping is not less than the number of pieces of data before carrier mapping.

In addition, carrier mapping also decides the frequency resources used by a transmitter. DFT-s-OFDM, since it belongs to an orthogonal resource allocation method, can more flexibly support more transmitters when combined with the non-orthogonal multiple access method. Multiple transmitters having same time-frequency resources allocated thereto can be distinguished by the interleaving pattern and the grid mapping pattern, and transmitters allocated with orthogonal time-frequency resources can use same interleaving patterns and same grid mapping patterns. The time-frequency resources, the interleaving patterns and the grid mapping patterns, all allocated to the transmitters, are transmitted by physical broadcast channels, physical downlink control channels and/or physical downlink shared channels. The transmitters select the interleaving patterns, the grid mapping patterns and the time-frequency resources to be used, according to such information.

Figure 23:
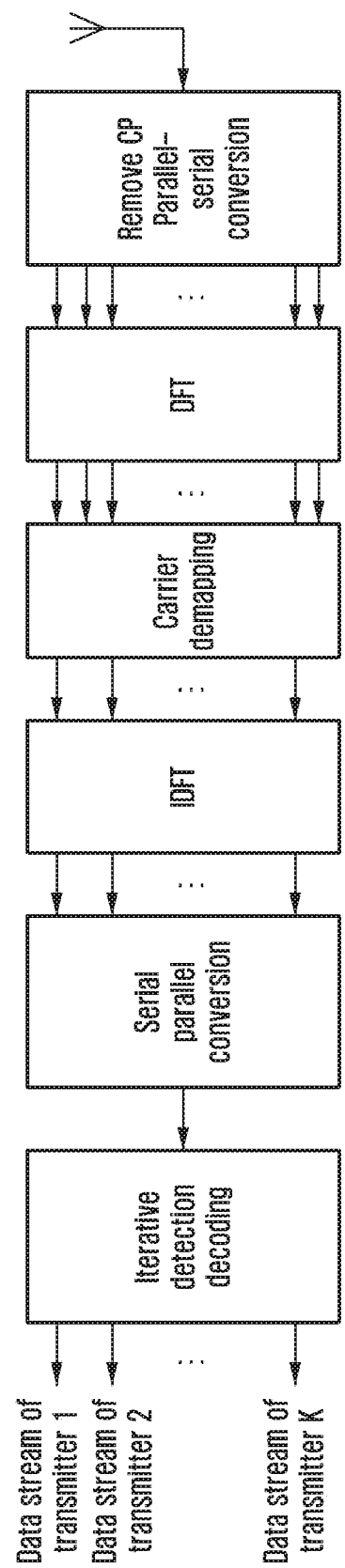
FIG. 23 is a structure diagram of a receiver complying with the multiple access combined with DFT-s-OFDM according to an embodiment of the present disclosure.

FIG. 23 is a schematic structure diagram of a receiver complying with the multiple access method combined with DFT-s-OFDM according to an embodiment of the present disclosure. The demodulation process of DFT-s-OFDM is an inverse process of the modulation process.

Referring to FIG. 23, the demodulated data will pass through a multi-user iterative detection decoding flow similar to that shown in FIGS. 4A and 4B, to obtain the data of the transmitters. It is to be noted that, the receiver structure as shown in FIG. 23 is applicable to a structure in which multiple transmitters are served on a group of time-frequency resources in a non-orthogonal method. In view of transmitters on different time-frequency resources, it is necessary to separately process the different time-frequency resources by the structure as shown in FIG. 23.

OFDM is a downlink carrier modulation method used in LTE/LTE-A.

Figure 24:
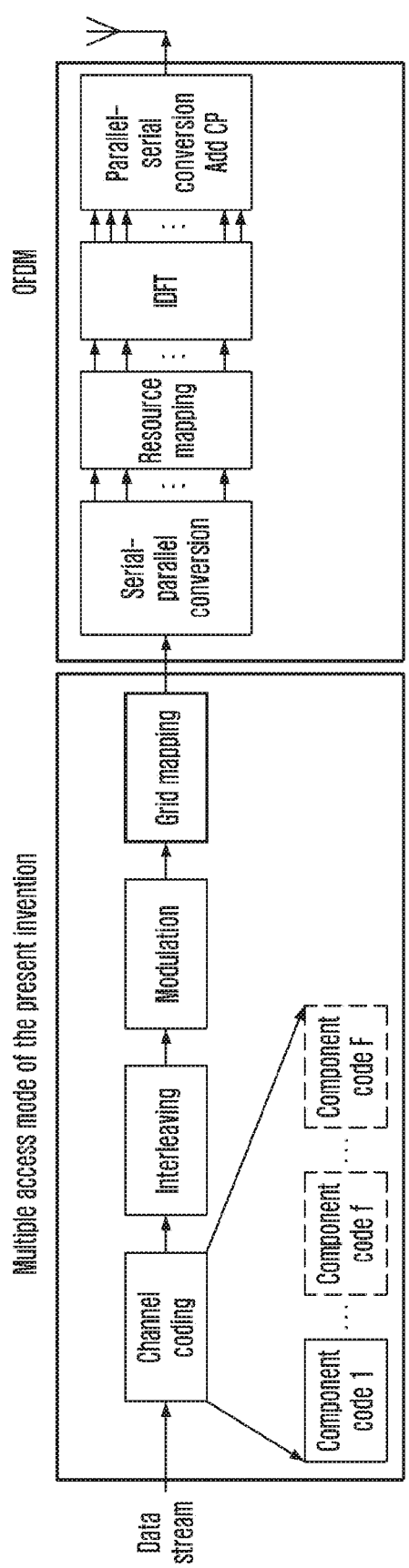
FIG. 24 is a structure diagram of a transmitter complying with the multiple access combined with OFDM according to an embodiment of the present disclosure.

FIG. 24 is a schematic structure diagram of a transmitter complying with a multiple access method based on grid mapping combined with OFDM according to an embodiment of the present disclosure.

Referring to FIG. 24, the grid mapped data stream will pass through OFDM modulation to obtain the data to be transmitted. OFDM modulation includes serial-parallel conversion, resource mapping, IDFT, parallel-serial conversion and CP addition, wherein resource mapping is to map data to be modulated onto different sub-carriers of different OFDM symbols. Similarly to DFT-s-OFDM, OFDM, as an orthogonal multi-carrier modulation method, can provide more flexible resource allocation methods and support more transmitters when combined with the multiple access method based on interleaving and grid mapping. Multiple transmitters having same time-frequency resources allocated thereto can be distinguished by the interleaving pattern and the grid mapping pattern, and transmitters allocated with orthogonal time-frequency resources can use same interleaving patterns and same grid mapping patterns. The information of time-frequency resources, interleaving patterns and grid mapping patterns, are informed to the transmitters by physical broadcast channels, physical downlink control channels and/or physical downlink shared channels. The transmitters obtain the interleaving patterns, the grid mapping patterns and the time-frequency resources to be used, according to such information.

Figure 25:
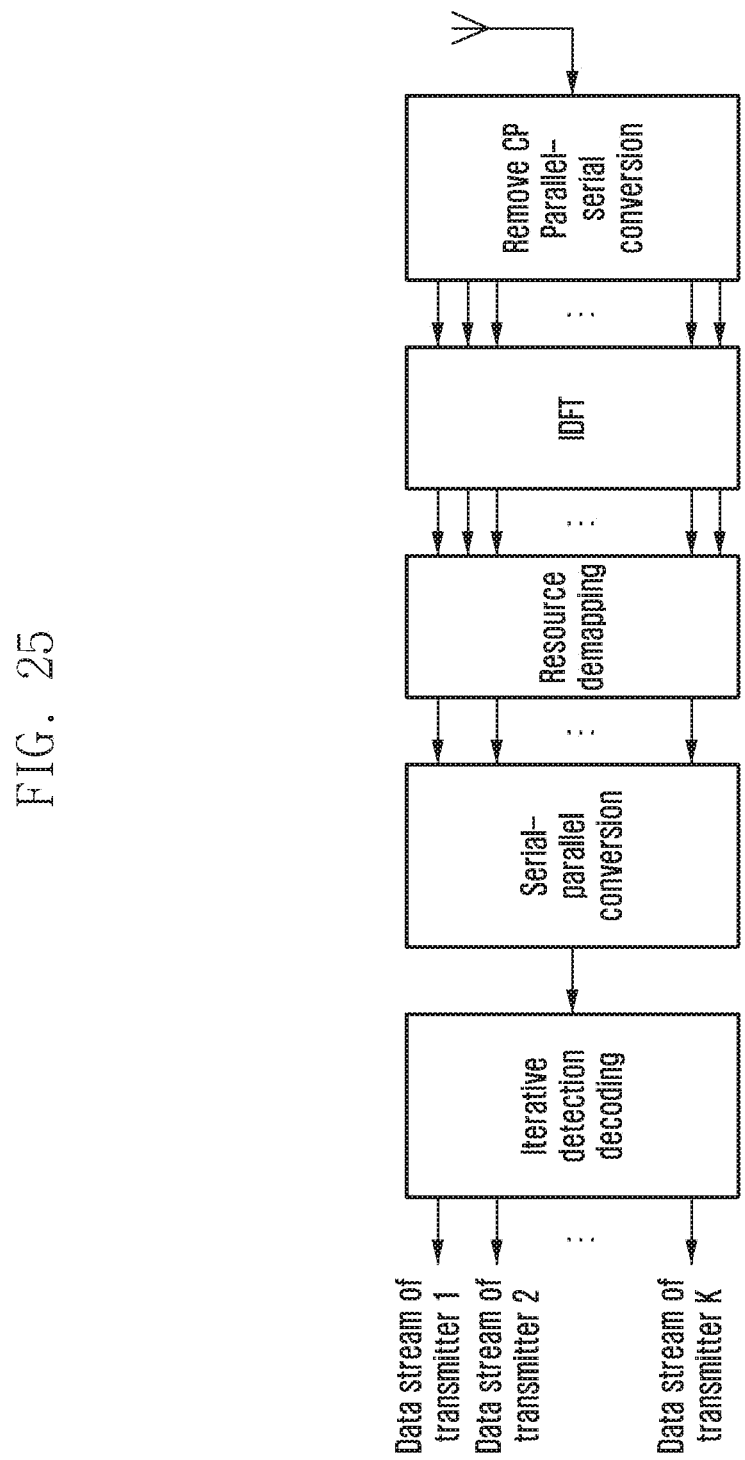
FIG. 25 is a structure diagram of a receiver complying with the multiple access combined with OFDM according to an embodiment of the present disclosure.

FIG. 25 is a schematic structure diagram of a receiver complying with a multiple access method combined with OFDM according to an embodiment of the present disclosure.

Referring to FIG. 25, the demodulation of OFDM is an inverse process of the modulation thereof. A received signal is removed off CP, passing through parallel-serial conversion, DFT processing, resource de-mapping, serial-parallel conversion and then iterative detection decoding, to obtain the data streams of the transmitters.

Filtered-OFDM (F-OFDM), as a waveform modulation technology based on sub-band filtering, can meet the requirements of 5G on out-of-band emission, resource allocation flexibility and more and becomes one of candidates of the novel air interface technology of 5G.

Figure 26:
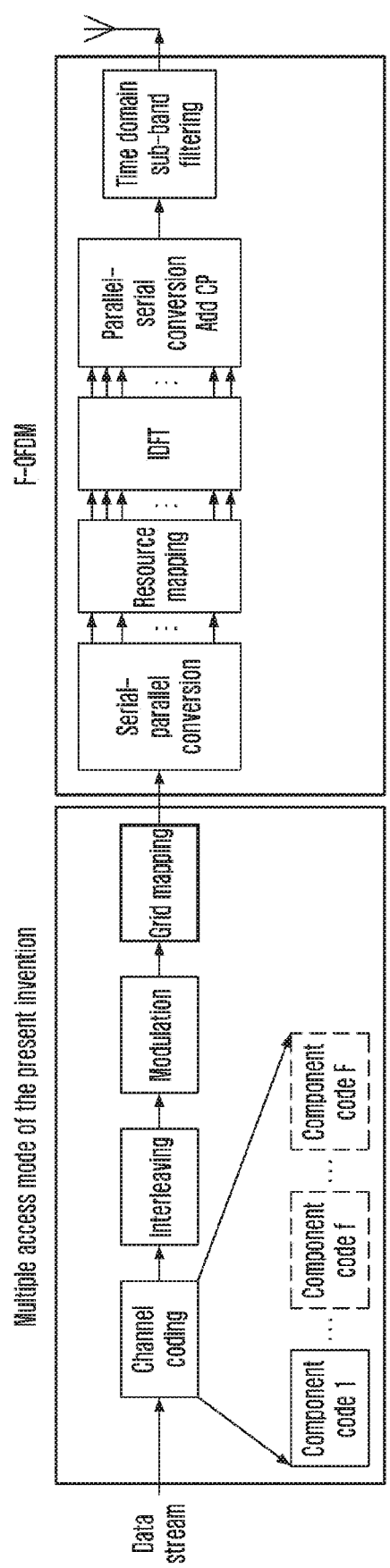
FIG. 26 is a structure diagram of a transmitter complying with the multiple access combined with filter based (F)-OFDM according to an embodiment of the present disclosure.

FIG. 26 is a schematic structure diagram of a transmitter complying with the multiple access method combined with F-OFDM according to an embodiment of the present disclosure.

Referring to FIG. 26, a data stream to be processed will pass through channel coding, interleaving, modulation and grid mapping, and then F-OFDM modulation. The right half of FIG. 26 shows the F-OFDM modulation. The input data will pass through serial-to-parallel conversion to be converted to parallel data. The parallel data will pass through resource mapping and then to IDFT and to parallel-serial conversion and is prefixed with a CP to obtain a time domain signal. According to the frequency band of the sub-band to be used to transmit data, the time domain signal is filtered by time domain sub-band filtering to obtain the time domain signal to be transmitted. Compared with OFDM, F-OFDM supports sub-band filtering and can more flexibly support transmitters configured by various carrier modulations. Meanwhile, F-OFDM remains the advantage of supporting flexible resource allocation by resource mapping. The receiver will inform the transmitters, of the sub-bands and resources allocated thereto and interleaving patterns and grid mapping patterns in a form of lookup table, by physical broadcast channels, physical downlink control channels and/or physical downlink shared channels. The transmitters adjust, according to above information, the used interleaving patterns, grid mapping patterns, resource allocation methods, multi-carrier modulation parameter setting and time domain filter parameter setting.

The receiver distinguishes data from different transmitters by the processed sub-bands, resource allocation methods, interleaving patterns and grid mapping patterns.

Figure 27:
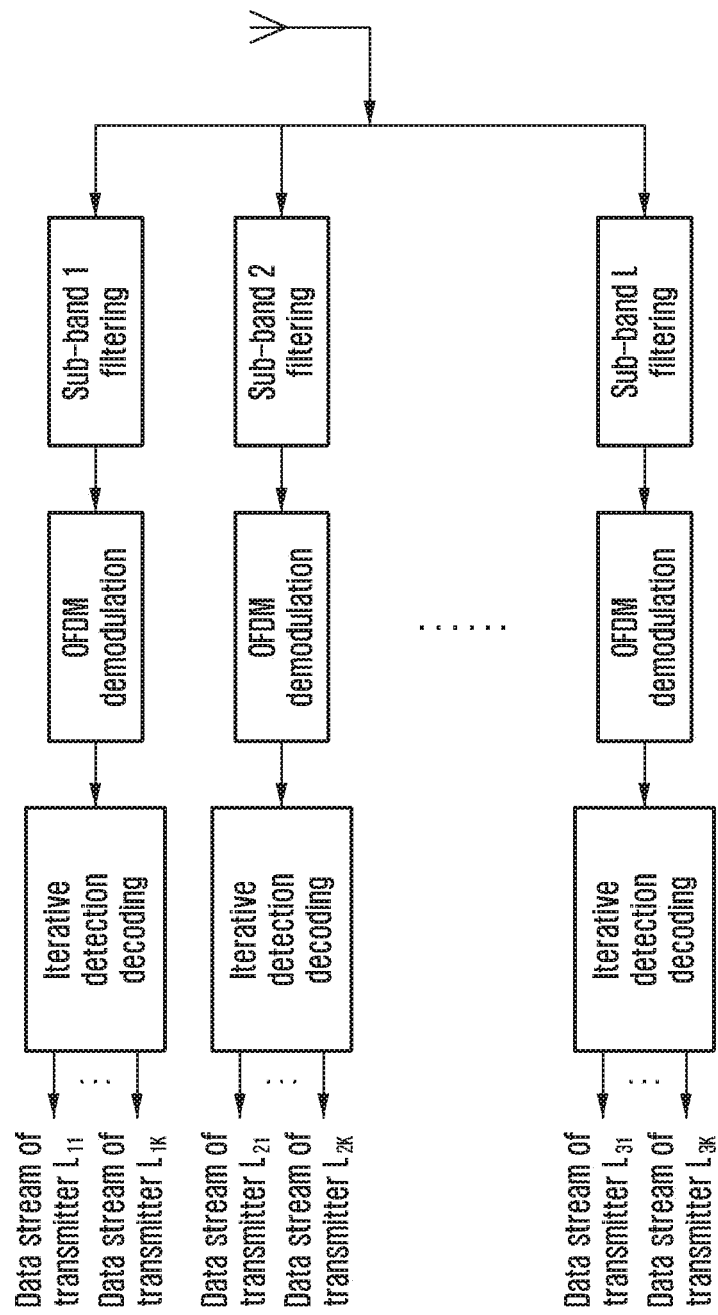
FIG. 27 is a structure diagram of a receiver complying with the multiple access combined with F-OFDM according to an embodiment of the present disclosure.

FIG. 27 is a schematic structure diagram of a receiver complying with the multiple access method combined with F-OFDM according to an embodiment of the present disclosure.

Referring to FIG. 27, the whole frequency band is divided into L sub-bands each in which the access service of data from multiple transmitters is provided by orthogonal resource allocation and non-orthogonal interleave-division multiple access. The receiver acquires information about data in each sub-band by sub-band filtering first, and then acquires data transmitted by the transmitters and allocated to the time-frequency resources by OFDM demodulation. The above two methods of distinguishing transmitters are both orthogonal and ideally free of interference. What is received in same sub-bands and same time-frequency resources is data transmitted by multiple transmitters, and the data is to be detected by a receiver with a structure of an iterative detection decoding as shown in FIG. 2.

It is to be noted that, in addition to the above examples, the multiple access method of the present disclosure can be combined with other carrier modulation technologies, such as, universal-filtered multi-carrier (UFMC), NC-continuous OFDM (NC-OFDM), filter-bank multi-carrier (FBMC) or more.

In an eighth specific embodiment of the present disclosure, a solution in which the data rate of an individual transmitter is improved by superposing multiple transmission streams will be described in detail. As described in the first specific embodiment, K transmitters employ the transmitter structure as provided by the present disclosure, and the receiver detects data transmitted by the K transmitters by a multi-user iterative detection receiver as shown in FIGS. 4A and 4B.

In order to improve the data transmission rate of an individual transmitter, in the transmitter, multiple data streams are transmitted simultaneously and in a same frequency in a method of superposing the multiple streams.

Figure 28:
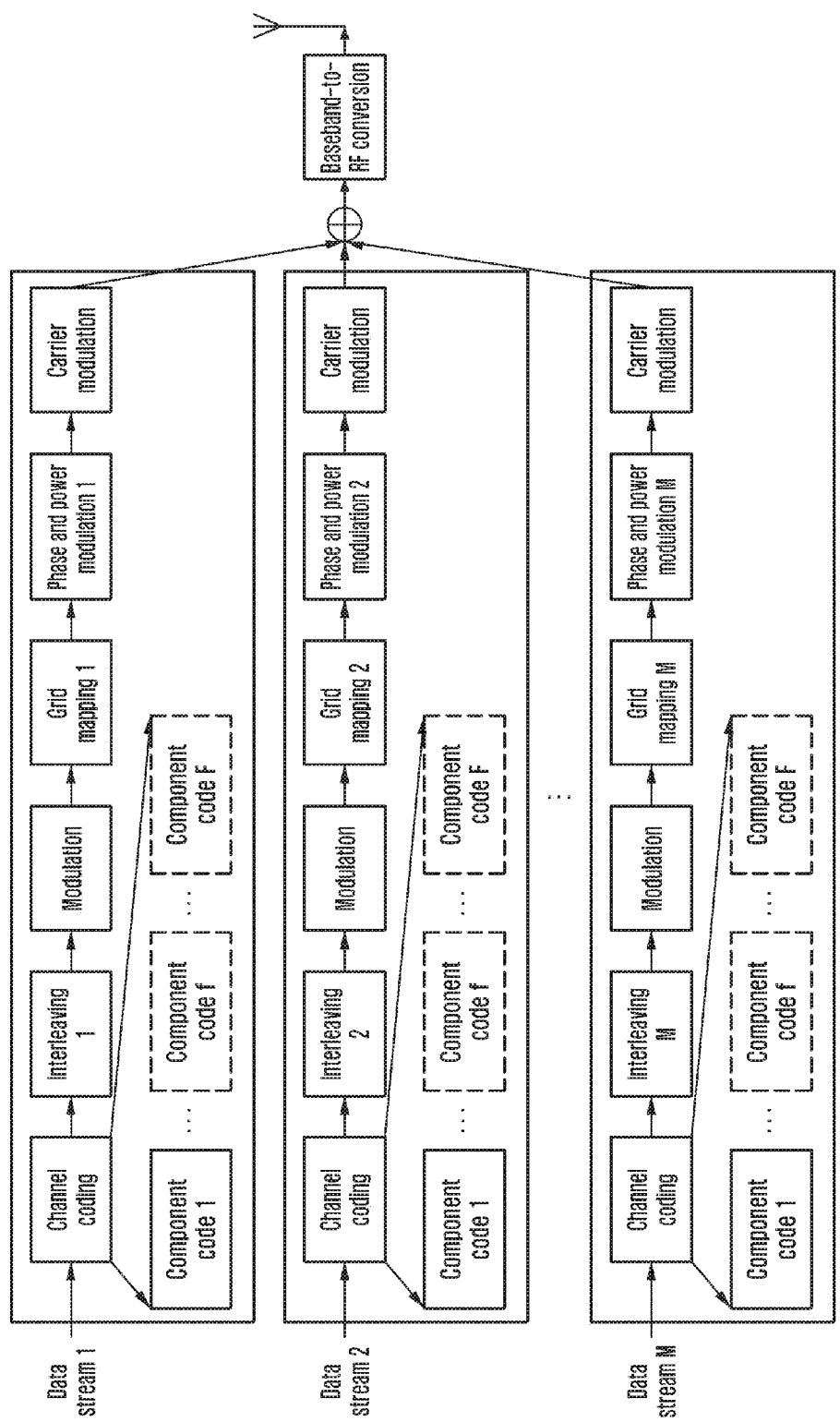
FIG. 28 is a structure diagram of a transmitter complying with the multiple access combined with superposition of data streams according to an embodiment of the present disclosure.

FIG. 28 is a schematic structure diagram of the transmitter according to an embodiment of the present disclosure.

Referring to FIG. 28, data stream 1 to data stream M, as data streams of an individual transmitter, can be generated by producing and distributing one data source, or generated respectively by M independent data streams, or generated in such a method that some data streams are generated by producing and distributing one data source while the others are generated by independent data sources. Data in each data stream will pass through channel coding, interleaving, modulating and grid mapping, and the resulting symbols will pass through to phase and power adjustment and then pass through carrier modulation. The carrier modulated signal streams are superposed and then pass through baseband-to-RF process to be transmitted. The order of carrier modulation and superposition can be interchanged, that is, the data streams are superposed first and then will pass through carrier modulation to be transmitted.

The detection decoding structure of the receiver is similar to the example as shown in FIGS. 4A and 4B. The multi-user detector performs symbol detection according to the phase and power adjustment performed on the modulated symbols of each data stream by each transmitter, and performs the subsequent iterative detection decoding operations. The iterative detection decoder outputs information about all data streams of the transmitters, and the receiver performs the identification and distinguishing of data from the transmitters according to the interleaving pattern and/or grid mapping pattern.

The interleaving pattern and the grid mapping pattern are used as the basis of distinguishing different transmitters and different data streams. The specific allocation method is as follows.

For different data streams of a same transmitter, same interleaving patterns and different grid mapping patterns are allocated, while for different transmitters, different interleaving patterns are allocated. The receiver distinguishes data from different transmitters according to the interleaving patterns and distinguishes different data streams of a same transmitter according to the grid mapping patterns.

For different data streams of a same transmitter, same grid mapping patterns and different interleaving patterns are allocated, while for different transmitters, different grid mapping patterns are allocated. The receiver distinguishes data from different transmitters according to the grid mapping patterns and distinguishes different data streams of a same transmitter according to the interleaving patterns.

For different data streams of different transmitters, different interleaving patterns and different grid mapping patterns are allocated. The receiver distinguishes each data stream according to the interleaving patterns and the grid mapping patterns, to further obtain the data of the transmitters.

The phase and power adjustment follows the following rule: to ensure that symbols corresponding to different data streams from a same transmitter will not be overlapped or offset during the superposition. Preferably, phase and power adjustment specific to constellation point modulation follows the following rule: the modulation in phase and power of low-order modulation data streams is designed by a high-order modulation constellation, under the power limit. By taking a transmitter of the eight-data-stream transmission by BPSK modulation for example, Table 3 shows an example of phase and power adjustment, wherein phase and power adjustment factors for each stream are as shown in Table 3.

TABLE 3

| | Data stream | | | | | | | |
|---|---|---|---|---|---|---|---|---|
| | 1 | 2 | 3 | 4 | 5 | 6 | 7 | 8 |
| Phase (°) $\theta_k$ | 45 | −45 | 45 | −45 | 18.43 | −18.43 | 71.57 | −71.57 |
| Power $a_k$ | 0.2 | 0.2 | 1.8 | 1.8 | 1 | 1 | 1 | 1 |

If the $k^{th}$ data stream has a phase adjustment factor of $\theta_k$ and a power adjustment factor of $a_k$, wherein $\theta_k$ and $a_k$ are determined by Table 3 and the transmission constellation point symbol is $x_k$, then the actual transmission symbol of the $k^{th}$ data stream is $\sqrt{a_k}\exp(j\theta_k)x_k$. After the phase and power adjustment according to Table 3, what is transmitted by the transmitters after superposition is a constellation similar to 16QAM, and for the streams, the transmitted symbols are not overlapped nor offset during the superposition.

In order to serve multiple transmitters on the same time-frequency resources, the receiver will transmit the interleaving patterns, the grid mapping patterns, the corresponding phase and power adjustment factors, and the supported maximum number of streams in a form of lookup table by physical broadcast channels, physical downlink control channels and/or physical downlink shared channels. The transmitters determine the number of streams to be superposed according to the number of data streams need to be transmitted and the maximum supported number of streams, and determine the interleaving pattern, the grid mapping pattern, and the corresponding phase and power adjustment factor allocated to each stream.

If the number of streams K to be actually transmitted is smaller than the supported maximum number of streams $K_{max}$, a transmitter can transmit the data streams in the following methods.

The transmitter only transmits K data streams, and informs the receiver of the number of transmitted streams by a physical uplink control channel and/or physical uplink shared channel. That is, the transmitter transmits an indication indicative of the number of streams, and informs the receiver of the number of streams to be received in a form of a lookup table.

The transmitter transmits $K_{max}$ data streams, wherein K data streams are used for transmitting information and $K_{max}-K$ data streams are used for transmitting full-zero data. Since a full-zero sequence is allowable for channel coding, it is considered that the data stream is not used for transmitting data if the receiver detects a full-zero sequence or a nearly-full-zero sequence. That is, after iterative detection decoding process, the number of zero values in the decoded sequence is counted. If the number of zero values exceeds a predetermined threshold, it is determined that this data stream is used for transmitting an information-bearing sequence, otherwise it is determined that this data stream is not used for transmitting an information-bearing sequence.

In a method of superposing multiple streams, the solution provided by this embodiment can support more transmitters in the same time-frequency resources, and improve the data transmission rate of an individual transmitter and maintain high reliability.

In a ninth specific embodiment of the present disclosure, a solution combining the multiple access method and the multi-antenna technology is provided. As described in the first specific embodiment, K transmitters employ the multiple access transmission method as provided by the present disclosure and are equipped with $N_T$ transmit antennas used for transmitting data in a multi-antenna method. The receiver detects and estimates a transmitted bit stream in the iterative detection decoding method as shown in FIGS. 4A and 4B. The receiver is equipped with NR receiving antennas.

The transmitter transmits data by the multi-antenna technology in the following methods.

Figure 29:
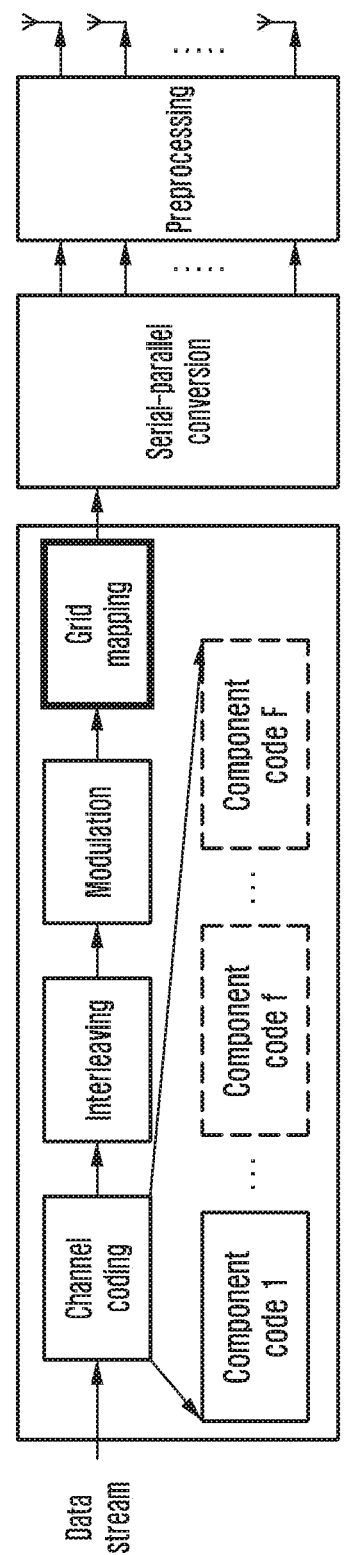
FIG. 29 is a diagram of a multi-antenna combination method for transmitting a single data stream according to an embodiment of the present disclosure.

FIG. 29 is a diagram of a multi-antenna combination method for transmitting an individual data stream according to an embodiment of the present disclosure.

Referring to FIG. 29, only one data stream is transmitted. The data stream will pass through channel coding, interleaving, modulation and grid mapping, and then to serial-parallel conversion so as to convert one data stream into multiple data streams. The data stream can pass through layer mapping similar to LTE so as to convert one data stream into multiple data streams. The multiple data streams are preprocessed to obtain a multi-antenna data stream to be transmitted. The preprocessing includes a space-time precoding operation, for example, multiplication with a precoding matrix or space-time coding or more. In order to estimate the channel state information, the transmitters insert orthogonal reference signals in each link after the serial-parallel conversion or layer mapping, and different transmitters use orthogonal reference signals. The receiver estimates the preprocessed equivalent channel state information according to the reference signals. The receiver still employs the iterative detection decoding structure as shown in FIGS. 4A and 4B, and the specific structure is as shown in FIG. 30.

Figure 30:
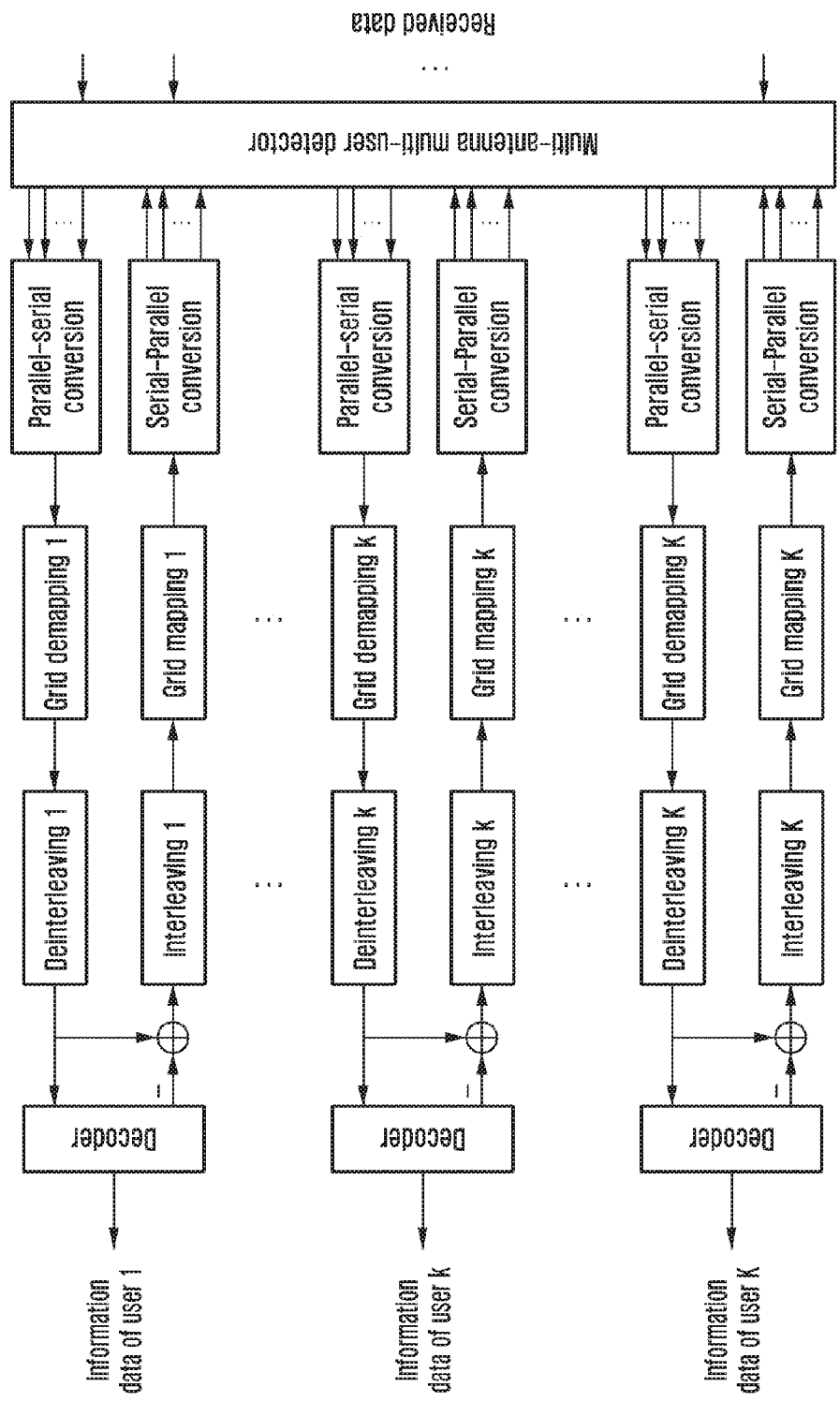
FIG. 30 is a structure diagram of a receiver complying with the multi-antenna combination method for transmitting a single data stream according to an embodiment of the present disclosure.

FIG. 30 is a schematic structure diagram of a receiver employing a multi-antenna combination method for transmitting an individual data stream according to an embodiment of the present disclosure.

A received signal is detected by a multi-antenna multi-user detector to obtain the estimation of each transmitted link data. The link signals will pass through parallel-serial conversion or layer de-mapping to obtain a data stream from one transmitter. The data stream will pass through grid de-mapping, de-interleaving and channel decoding, to obtain the estimation of the data transmitted by the transmitter. The estimation of the data is used as the prior information which will pass through interleaving, grid mapping, and serial-parallel conversion or layer mapping, and then input to the multi-antenna multi-user detector as the prior information of the next iteration.

In order to distinguish data from different transmitters, different transmitters use different interleaving patterns and/or grid mapping patterns. The interleaving pattern allocation methods have been described in detail in the above embodiments and will not be repeated here.

Figure 31:
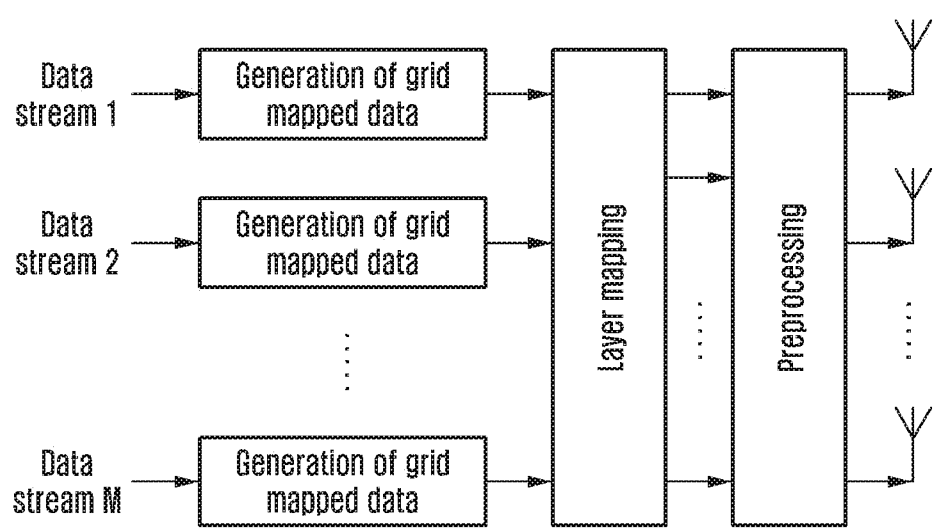
FIG. 31 is a diagram of the multi-antenna combination method for transmitting multiple data streams and supporting separate mapping according to an embodiment of the present disclosure.

FIG. 31 is a diagram of a multi-antenna combination method for transmitting multiple data streams and supporting separate mapping according to an embodiment of the present disclosure.

Referring to FIG. 31, M data streams are transmitted. The data streams will pass through channel coding, interleaving, modulation and grid mapping. In FIG. 31, a module's function of generating grid mapped data is to process a data stream in a method as shown in FIG. 3. The processed data streams will pass through layer mapping and preprocessing, and then transmitted in a multi-antenna method. One possible layer mapping and preprocessing method is that both the layer mapping equivalent matrix and the preprocessing equivalent matrix are identity matrixes, that is, the processed data streams correspond to the transmitting antenna links one by one. In this method, orthogonal reference signals are inserted into each data link to estimate the channel of each data link. When in processing, the receiver regards each link as a different transmitter employing a single antenna. Data bit streams are detected by an iterative detection decoding structure as shown in FIGS. 4A and 4B, and data streams from different transmitters are distinguished by the interleaving pattern and the grid mapping pattern.

The allocation of the interleaving pattern and the grid mapping pattern is informed in a form of a lookup table to the transmitters by physical broadcast channels, physical downlink control channels and/or physical downlink shared channels. In order to distinguish data streams from different transmitters, there are following methods to allocate the interleaving pattern and the grid mapping pattern among the transmitters.

For different data streams of a same transmitter, same interleaving patterns and different grid mapping patterns are used, while for different transmitters, different interleaving patterns are used. The receiver distinguishes data from different transmitters according to the interleaving patterns and distinguishes different data streams of a same transmitter according to the grid mapping patterns.

For different data streams of a same transmitter, same grid mapping patterns and different interleaving patterns are used, while for different transmitters, different grid mapping patterns are used. The receiver distinguishes data from different transmitters according to the grid mapping patterns and distinguishes different data streams of a same transmitter according to the interleaving patterns.

For different data streams of different transmitters, different interleaving patterns and different grid mapping patterns are used. The receiver distinguishes different data streams from different transmitters by combining the interleaving patterns and the grid mapping patterns.

Figure 32:
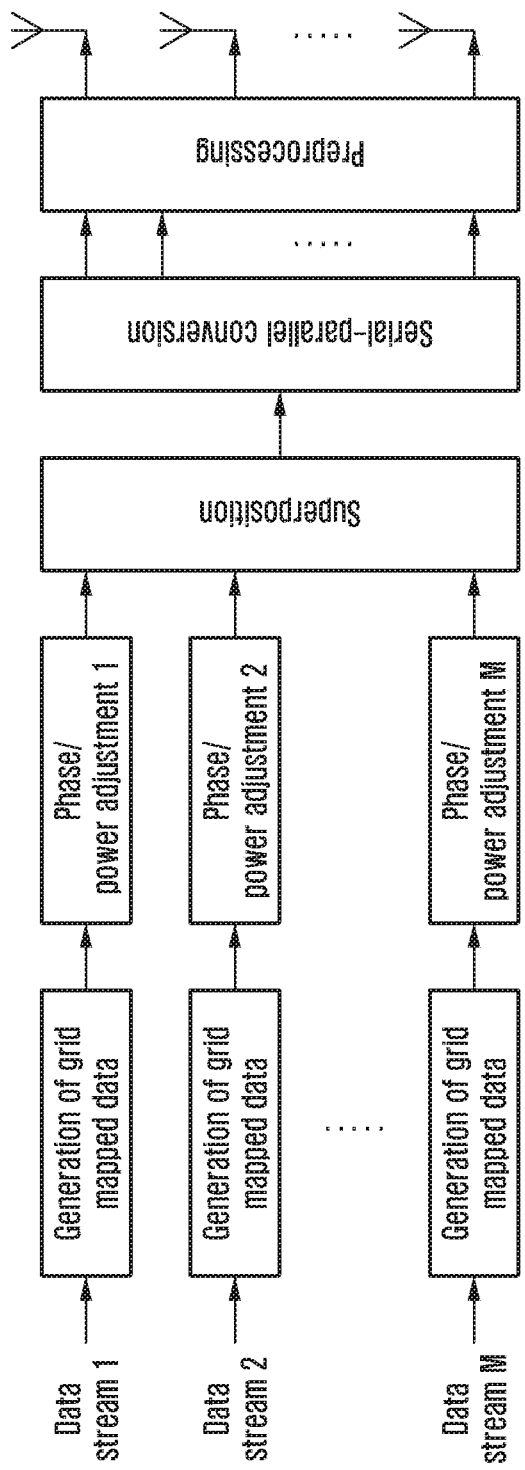
FIG. 32 is a diagram of the multi-antenna combination method based on superposition of data streams according to an embodiment of the present disclosure.

FIG. 32 is a diagram of a multi-antenna combination method based on superposition of data streams according to an embodiment of the present disclosure.

Referring to FIG. 32, a module's function of generating grid mapped data is to process a data stream in a method as shown in FIG. 3. In addition, multiple data streams are transmitted. Different data streams from a same transmitter will pass through phase and power adjustment, superposed, and then will pass through serial-parallel conversion or layer mapping and preprocessing, and finally transmitted out by multiple transmitting antennas. In order to distinguish different data streams from different transmitters, it is necessary to allocate an interleaving pattern and a grid mapping pattern for each data stream. The allocation method has been described in the eighth specific embodiment, and will be informed to each transmitter by physical broadcast channels, physical downlink control channels and/or physical downlink shared channels. The purpose of the phase/power adjustment is to ensure that data streams from a same transmitter will not be overlapped or offset during the superposition, and the specific adjustment method has been described in the eighth specific embodiment. In order to estimate the equivalent channel state information of each link, it is necessary to insert reference signals. The reference signals are inserted after serial-parallel conversion or layer mapping, and transmitted to the receiver after passing through to preprocessing, for estimating a preprocessed equivalent channel. After the phase/power adjustment, the receiver can detect a received signal in a method as shown in FIG. 30, and distinguish different data streams from different transmitters according to the interleaving pattern and the grid mapping pattern.

The combination of at least two of the above three methods. For example, part of links will pass through direct mapping, while some links will pass through serial-parallel conversion then to layer mapping or more.

It is to be noted that, among the above methods, the second method is more suitable for improving the data transmission rate, that is, the data transmission rate is improved in a method of transmitting different data streams in different links, the first method is more suitable for improving the transmission reliability, that is, the spatial diversity is obtained by space-time block coding, space-frequency block coding and other space-time coding methods thus to improve the transmission reliability, by the third method, both the improvement of reliability and the improvement of data rate can be obtained, that is, the spatial diversity is obtained by space-time block coding, space-frequency block coding and other space-time coding methods and meanwhile the improvement of data rate is obtained by the superposition of multiple data streams, and the fourth method can be regarded as a compromise of reliability and data rate.

When a transmitter can obtain the channel state information about a transmission channel by channel estimation or feedback or other methods, interference between different links of a same transmitter can be eliminated by precoding, for example, zero-forcing precoding, and other methods. This will greatly simplify the operations of the receiver. Meanwhile, the above various methods can all be used for improving the data transmission rate.

In the foregoing embodiments, the system employs multiple access by using bit-level interleaving patterns and/or grid mapping patterns. In the tenth specific embodiment of the present disclosure, the transmitting method and the multiple access mode based on bit-level scrambling codes and/or grid mapping patterns will be introduced in combination with the specific parameter settings. The schematic principle diagram of the multiple access in this embodiment is as shown in FIGS. 4A and 4B. It is assumed that one transmitter has a bit sequence $d_k=\{d_k(m), m=0, \ldots, M-1\}$ having a size of $M=126$, channel coding is then performed on the bit sequence. The method of performing channel coding can be channel coding by a combination of one LTE standard Turbo code with the code rate of $R_1=\frac{1}{2}$ and one repetition spreading code having a size of 2, i.e., an equivalent code rate of $R_2=\frac{1}{2}$. Thus, the coding rate over the whole channel coding is $R_3=R_2R_1=\frac{1}{4}$. The method of performing channel coding can be channel coding directly by one Turbo code having a code rate of $\frac{1}{4}$ or other component codes. The bit sequence $d_k$ is channel coded to obtain a coded sequence $c_k=\{c_k, n=0, \ldots, N-1\}$, where N is the size of the channel coded sequence, $N=M/R_3=126*4=504$, and then, the coded sequence $c_k$ is scrambled by the scrambling code $a_k$ to obtain a scrambled sequence $x_k=\{x_k(n), n=0, \ldots, N-1\}$. The size of the scrambled sequence is kept consistent to the size of the sequence before scrambling. By scrambling, the correlation of adjacent bits (chips) is decreased, and this is useful for the receiver to detect bit by bit (chip by chip). The transmitters obtain respective interleaving pattern information and grid mapping pattern information by physical broadcast channels, physical downlink control channels, or physical downlink shared channels. The interleaving pattern information and grid mapping pattern information indicate an interleaving pattern and a grid mapping pattern, which can be indicated in a form of a lookup table or more. The specific information of the scrambling code can be directly configured by the system, and the scrambling code can be generated randomly, or generated based on a pseudorandom sequence (for example, an M sequence or a Gold sequence) or in accordance with a certain rule, and then allocated to users.

The obtained scrambled sequence $x_k$ is bit-to-symbol modulated to generate a symbol sequence $S_k=\{S_k(l), l=0, \ldots, L-1\}$, where L is the size of the symbol sequence and depends on the used modulation mode and the size of the interleaved sequence. In the tenth specific embodiment of the present disclosure, the modulation method used is quadrature phase shift keying (QPSK), the modulation order is $M_s=2$, that is, two code words (bits) are mapped to one symbol.

The size of the symbol sequence is $$L = \frac{N}{M_s} = 252.$$

The symbol sequence $S_k$ will pass through grid mapping to generate a symbol sequence $S'_k=\{S'_k(l'), l'=0, \ldots, L'-1\}$, where L' is the size of the grid mapped sequence. There can be various methods to implement grid mapping, the purpose of which is that symbols carrying information can be mapped onto all or part of allocated time-frequency resources. This facilitates combatting interference and fading, and is useful for supporting more transmitters in same time-frequency resources. In addition, if signals are mapped to part of resources, the overall equivalent code rate R of the transmitter is further reduced with respect to the code rate $R_3$, and the degree of reduction is related to the density of the grid mapping pattern. In the tenth specific embodiment of the present disclosure, since the size of the symbol sequence is doubled, the equivalent code rate of the transmitter is further reduced by half, i.e., $$R = \frac{R_3}{2} = \frac{1}{8}.$$

The symbol sequence $S'_k$ will pass through a carrier modulation. In the tenth specific embodiment of the present disclosure, the $S'_k$ will pass through OFDM multi-carrier modulation, i.e., IFFT and then to D/A conversion, up-conversion and other baseband-to-RF process, and finally the signal is transmitted.

At the receiver, the signals received from multiple transmitters are joined together, and interfered by noise. In the tenth specific embodiment of the present disclosure, the receiver employs multi-user iterative detection decoding. The receiver performs RF-to-baseband processing on the received mixed signal first, as shown in FIG. 6.

The signal obtained by FFT is fed to a multi-user detector. In the first iteration, first, in the multi-user detector, the posterior probability information of each transmitter signal is calculated according to the preset prior probability information of the transmitter signal and the channel information of each transmitter estimated from the transmitted reference signal, and extrinsic information is calculated in combination with the prior probability information. The extrinsic information will pass through grid de-mapping according to the grid mapping pattern of each transmitter, and then a soft information sequence obtained by grid de-mapping will pass through an interleaving pattern corresponding to the transmitter to be de-interleaved, and the de-interleaved soft information is inputted to a decoder. In the decoder, corresponding decoding is performed according to the component code or combination of component codes used by the transmitter. In the tenth specific embodiment of the present disclosure, the decoding of the repetition spreading code is performed first followed by the decoding of the Turbo code, and finally the data of the transmitter is obtained by a process of decision. To prepare for a next iterative detection, it is necessary to update the prior probability information of the transmitter signal. It is necessary to perform, on the soft information which is obtained by decoding, the same channel coding as at the transmitter, i.e., by a same component code or a combination of component codes as at the transmitter. In the tenth specific embodiment of the present disclosure, it will pass through a Turbo code with a code rate of and a repetition spreading code with a size of 2, and then the previous soft information is subtracted to obtain extrinsic information. The obtained extrinsic information successively p to re-interleaving and grid remapping by the interleaving pattern and the grid mapping pattern, and the resulting extrinsic information sequence is fed to the multi-user detector as a prior probability sequence which serves as the prior probability of the next iterative detection. Hereto, an iterative detection is completed, and the above operations are repeated for a next iterative detection decoding. When the number of iterations reaches a preset maximum value, a process of hard decision is performed in the decoder to obtain the final information data result of the transmitter. In the first iteration, there is no prior probability information, and a prior probability input to the multi-user detector is thus an equal-probability distribution, and the prior probability information, which is updated by the last iteration, is used in the subsequent iterations. The multi-user signal detector as described above can be an ESE, or an MPA based detector, or an SIC based detector, or more.

In accordance with the multiple access mode of the transmitter, the transmitting and receiving structures can distinguish users based on:

1. scrambling code sequences;
2. grid mapping patterns; and
3. combination of scrambling code sequences and grid mapping patterns.

The specific allocation and combination methods of scrambling code sequences and grid mapping patterns refer to the allocation and combination methods of interleaving patterns and grid mapping patterns, and will not be repeated here.

It is to be noted that, in the eighth and ninth specific embodiments of the present disclosure, the interleaving pattern information can be replaced with scrambling code information to implement the multiple access solution implemented by the two specific embodiments.

In the eleventh specific embodiment of the present disclosure, a specific system signaling procedure will be provided for the multiple access method of the present disclosure.

Figure 33B:
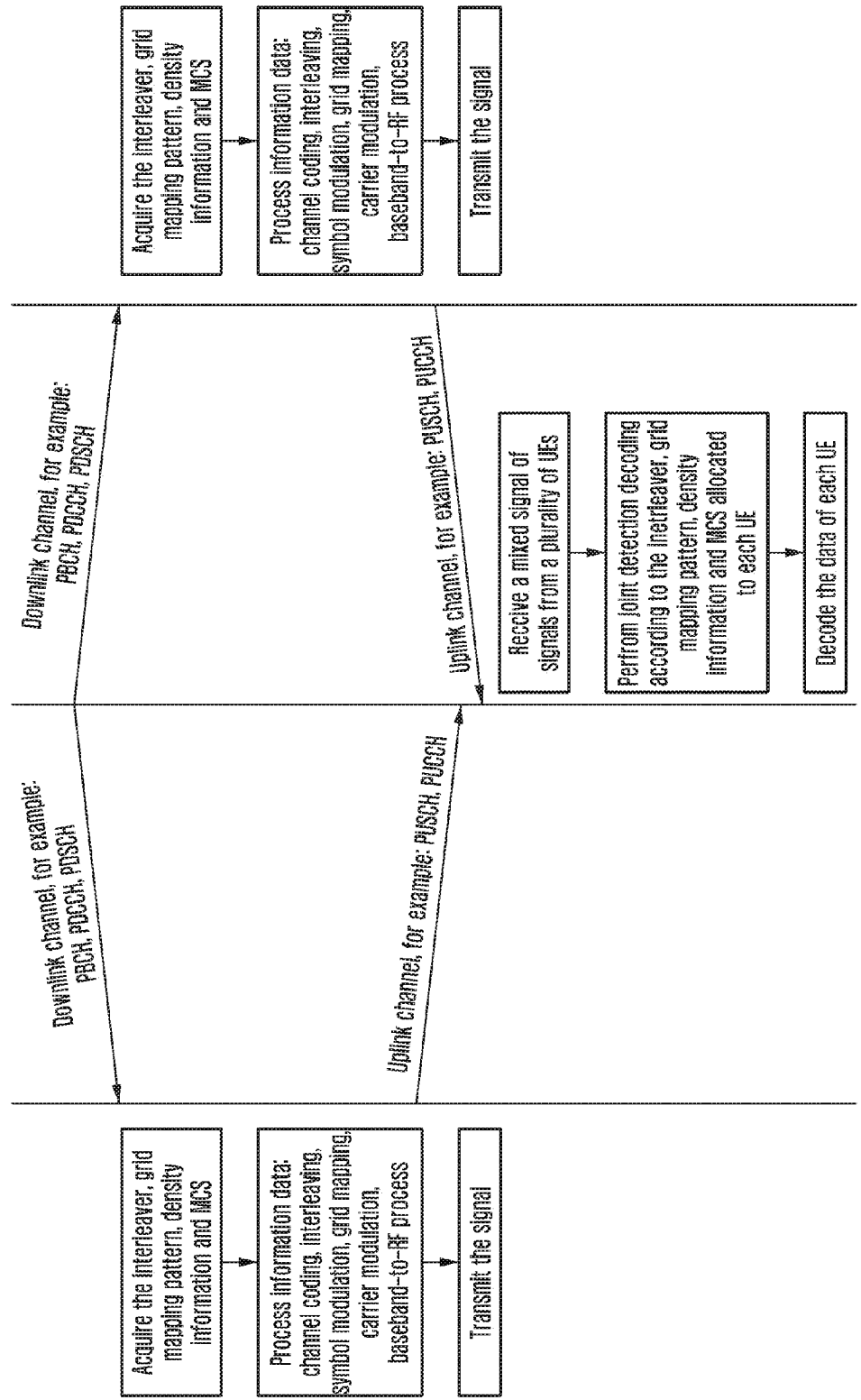

FIGS. 33A and 33B is a schematic flowchart of configuring interleaving pattern information and grid mapping pattern information by a base station according to an embodiment of the present disclosure.

Referring to FIGS. 33A and 33B, in order to serve UEs which have done ULsynchronization, a base station performs the following operations when receiving an uplink data transmitting request.

First, the base station reads load conditions in a network, and selects, according to the load conditions, to use an interleaving pattern and/or grid mapping pattern to distinguish the UEs. The specific allocation method is as described in the fifth specific embodiment, and will not be repeated here.

Second, the base station generates interleaving pattern information and grid mapping pattern information for different UEs with reference to the configuration of UEs, for example, the number of antennas, the number of data streams, or more.

The interleaving pattern information indicates whether a UE uses an interleaver and the used specific interleaving pattern, or the generation method of the used specific interleaving pattern, and the grid mapping pattern information indicates whether a UE uses a grid mapping, the used specific grid mapping method, or the generation method of the used specific grid mapping pattern. The grid mapping pattern information further contains the density information, representing the number of zeros to be added or the number of resource units which have been not occupied during grid mapping.

Third, the base station informs the UE of the generated interleaving pattern information and grid mapping pattern information by a physical downlink shared channel, a physical downlink control channel or a physical broadcast channel.

Fourth, the UE acquires the respective interleaving pattern information and grid mapping pattern information by the channels, and processes data to be transmitted in combination with the configured modulation coding method.

Fifth, according to the transmission method in the first specific embodiment, the UE performs channel coding, interleaving (can be configured not to perform interleaving), symbol modulation, grid mapping, carrier modulation and other baseband-to-RF process on the data to be transmitted, and finally transmits the data on the allocated time-frequency resources by a physical uplink channel, for example, a physical uplink control channel or physical uplink shared channel.

Sixth, the base station receives a mixed signal of signals transmitted by a plurality of UEs on the corresponding time-frequency resources, performs joint detection decoding on the data of a UE by the interleaving pattern information, grid mapping pattern information and other modulation coding method information allocated to each UE, and finally obtains data of each UE.

Figure 34:
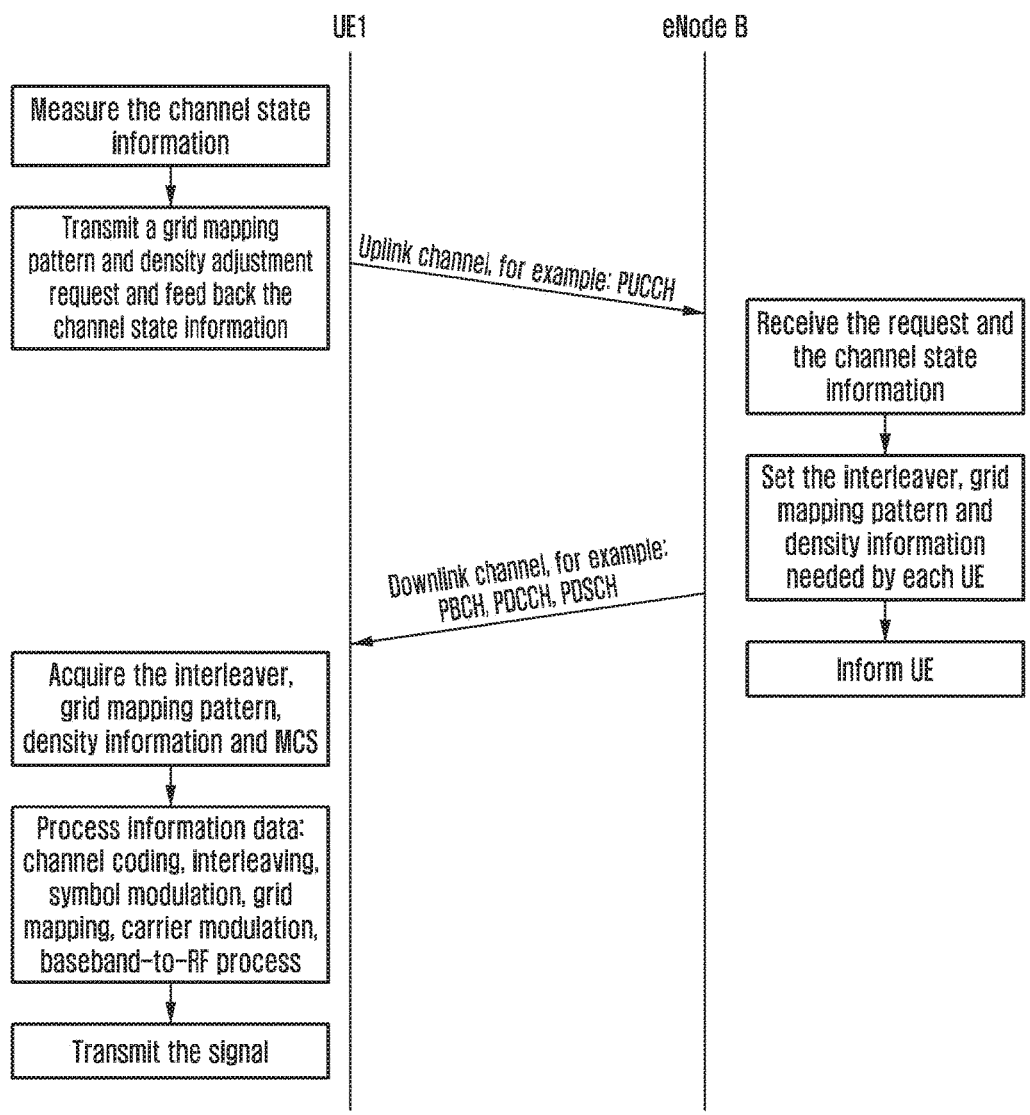
FIG. 34 is a schematic flowchart of transmitting a density adjustment request of a grid mapping pattern by a user equipment (UE) according to an embodiment of the present disclosure.

FIG. 34 is a schematic flowchart of transmitting a density adjustment request of a grid mapping pattern by a UE according to an embodiment of the present disclosure.

Referring to FIG. 34, in addition, the base station also allows the UE to self-adaptively adjust the density of the grid mapping patterns. For example, when the UE measures that the quality of a channel is degraded, the UE can transmit a density adjustment request, adjust the density of the used grid mapping patterns in a way negotiated with the base station, and correspondingly adjust the used code modulation method, interleaving patterns, grid mapping patterns, or the UE can transmit a density adjustment request and feed back the channel state information, and the base station adjusts, according to the uplink channel state information, the interleaving pattern information, grid mapping pattern information and density information used by the UE and the corresponding modulation coding method, as shown in Table 1.

It is to be noted that, the interleaving pattern information in this embodiment can be replaced with the scrambling code information, and in this way, the multiple access of this embodiment can also be implemented.

In the twelfth specific embodiment of the present disclosure, how the transmitter and the multiple access method of the present disclosure work according to grid mapping patterns without interleaving patterns will be introduced. It is assumed that one transmitter has a bit sequence $d_k=\{d_k(m), m=0, \ldots, M-1\}$ having a size of M=126, that is, this transmitter has 126 bits, channel coding is then performed on the bit sequence. The method of performing channel coding can be channel coding by a combination of one LTE standard Turbo code with the code rate of $R_1=\frac{1}{2}$ and one repetition spreading code having a size of 2, i.e., an equivalent code rate of $R_2=\frac{1}{2}$. Thus, the coding rate during the whole channel coding is $R_3=R_2R_1=\frac{1}{4}$. The method of performing channel coding can be channel coding directly by one Turbo code having a code rate of $\frac{1}{4}$ or other component codes. The bit sequence $d_k$ is channel coded to obtain a coded sequence $c_k=\{c_k, n=0, \ldots, N-1\}$, where N is the size of the channel coded sequence, $N=M/R_3=126*4=504$, and then, the coded sequence $c_k$ is bit-to-symbol modulated to generate a symbol sequence $S_k=\{S_k(l), l=0, \ldots, L-1\}$, where L is the size of the symbol sequence and depends on the used modulation mode and the size of the interleaved sequence. In the foregoing embodiments, the transmitter performs interleaving on the channel coded data. If a special interleaver is designed, for example, $a_k=\{1, 2, \ldots, N\}$, and the value or order of elements in the coded sequence $c_k$, it is equivalent that no interleaving pattern process is performed. In this specific embodiment, the modulation method used is QPSK, the modulation order is $M_s=2$, that is, two code words (bits) are mapped to one symbol. The size of the symbol sequence is $$L = \frac{N}{M_s} = 252.$$

The symbol sequence $S_k$ will pass through grid mapping to generate a symbol sequence $S'_k=\{S'_k(l'), l=0, \ldots, L'-1\}$, where L' is the size of the grid mapped sequence. If the allocated time-frequency resources have Ns symbols and Nsc sub-carriers, then L'=Ns*Nsc. In this embodiment, $S'_k$ obtained by performing grid mapping on the overall sequence $S_k$ together is entirely mapped onto the allocated time-frequency resources. Or, the symbol sequence $S_k$ can be divided into Ns segments, and symbols in each segment can be overall grid mapped to obtain Ns segments of symbol data each having a size of Nsc and then the Ns segments of symbol data are successively mapped onto the allocated time-frequency resources. There can be various methods to implement grid mapping, and the specific implementations refer to the foregoing embodiments and will not be repeated here. The purpose of grid mapping is that symbols carrying information can be mapped onto all or part of allocated time-frequency resources. This facilitates combatting interference and fading, and is useful for supporting more transmitters in same time-frequency resources. In addition, if signals are mapped to part of resources, the overall equivalent code rate R of the transmitter is further reduced with respect to the code rate $R_3$, and the degree of reduction is related to the density of the grid mapping pattern. In the first specific embodiment of the present disclosure, since the size of the symbol sequence is doubled, the equivalent code rate of the transmitter is further reduced by half, i.e., $$R = \frac{R_3}{2} = \frac{1}{8}.$$

The symbol sequence $S'_k$ will pass through a carrier modulation. In the first specific embodiment of the present disclosure, the $S'_k$ will pass through OFDM multi-carrier modulation, i.e., IFFT and then to D/A conversion, up-conversion and other baseband-to-RF process, and finally the signal is transmitted.

At the receiver, the signals received from multiple transmitters are joined together, and interfered by noise. In the first specific embodiment of the present disclosure, the receiver employs multi-user iterative detection decoding. The receiver performs RF-to-baseband processing on the received mixed signal first. The signal obtained by FFT is fed to a multi-user detector. In the first iteration, first, in the multi-user detector, the posterior probability information of each transmitter signal is calculated according to the preset prior probability information of the transmitter signal and the channel information of each transmitter estimated from the transmitted reference signal, and extrinsic information is calculated in combination with the prior probability information. The extrinsic information will pass through grid de-mapping according to the grid mapping pattern of each transmitter, and then a soft information sequence obtained by grid de-mapping is inputted to a decoder. In the decoder, corresponding decoding is performed according to the component code or combination of component codes used by the transmitter. In the first specific embodiment of the present disclosure, the decoding of the repetition spreading code is performed first followed by the decoding of the Turbo code, and finally the data of the transmitter is obtained by a process of decision. To prepare for a next iterative detection, it is necessary to update the prior probability information of the transmitter signal. It is necessary to perform, on the soft information which is obtained by decoding, the same channel coding as at the transmitter, i.e., by a same component code or a combination of component codes as at the transmitter. In the first specific embodiment of the present disclosure, it will pass through a Turbo code with a code rate of and a repetition spreading code with a size of 2, and then the previous soft information is subtracted to obtain extrinsic information. The obtained extrinsic information successively p to re-interleaving and grid remapping by the interleaving pattern and the grid mapping pattern, and the resulting extrinsic information sequence is fed to the multi-user detector as a prior probability sequence which serves as the prior probability of the next iterative detection. Hereto, an iterative detection is completed, and the above operations are repeated for a next iterative detection decoding. When the number of iterations reaches a preset maximum value, a process of hard decision is performed in the decoder to obtain the final information data result of the transmitter. In the first iteration, there is no prior probability information, and a prior probability input to the multi-user detector is thus an equal-probability distribution, and the prior probability information, which is updated by the last iteration, is used in the subsequent iterations. The multi-user signal detector as described above can be an ESE, or an MPA based detector, or an SIC based detector, or more.

As for the multiple access method based on this transmission method, the transmitter processes data according to a grid mapping pattern allocated by the receiver, and the network side distinguishes different users according to different grid mapping patterns, and when the transmitter contains a plurality of data streams or data streams from different users, the transmitter processes each stream of data according to a grid mapping pattern allocated by the receiver for each data stream, and the receiver distinguishes different data streams of different transmitters according to different grid mapping patterns.

It is to be noted that, the allocation of a same interleaving pattern $a_k$ and the establishment of $a_k = \{1, 2, \ldots, N\}$ can be regarded as a specific form of this embodiment. The specific multiple access method refers to the foregoing embodiments, and will not be repeated here.

Figure 35:
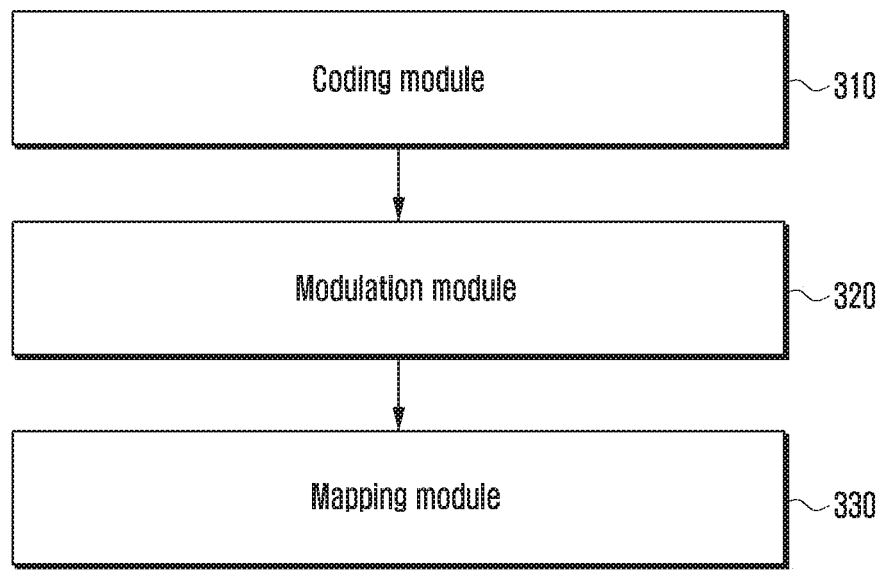
FIG. 35 is a structure diagram of a transmitter for multiple access according to an embodiment of the present disclosure.

FIG. 35 is a schematic structure diagram of a transmitter for multiple access according to an embodiment of the present disclosure.

Referring to FIG. 35, the transmitter includes a coding module 310, a modulation module 320 and a mapping module 330. The coding module 310 is, configured to perform channel coding on a bit sequence to determine a coded sequence, the modulation module 320 is, configured to perform interleaving on the coded sequence, and the mapping module 330 is, configured to perform grid mapping on the modulated symbol sequence to determine a mapped sequence and transmit the mapped sequence.

Preferably, the coding module 310 performs channel coding on a bit sequence to determine a coded sequence.

The method of performing channel coding by the coding module 310 includes but is not limited to channel coding by one component code or by multiple concatenated component codes.

The component code includes but is not limited to at least any one type of a Turbo code, a low density parity check code, a repetition code; and a spreading code.

The modulation module 320 performs interleaving on the coded sequence and performs symbol modulation on the interleaved sequence.

The coded sequence is interleaved. Preferably, the modulation module 320 performs interleaving on the coded sequence by interleaving pattern information, or the modulation module 320 performs interleaving on the coded sequence by scrambling code information.

The transmitter acquires the interleaving pattern information in a method, including but not limited to any one of physical broadcast channels, physical downlink control channels, and physical downlink shared channels.

The modulation module 330 performs symbol modulation on the interleaved sequence.

The method of performing symbol modulation by the modulation module 330 includes but is not limited to constellation modulation; or waveform modulation. The constellation modulation at least includes but is not limited to QAM or PSK modulation; and the waveform modulation at least includes but is not limited to FSK modulation.

The mapping module 340 performs grid mapping on the modulated symbol sequence to determine a mapped sequence and transmits the mapped sequence.

Specifically, the mapping module 340 performs grid mapping on the modulated symbol sequence by grid mapping pattern information.

The method of performing grid mapping includes but is not limited to any one of zero-padding and interleaving grid mapping, direct zero-inserting grid mapping, interleaving and zero-inserting grid mapping, interleaving grid mapping, direct grid mapping; codebook grid mapping, and codebook interleaving grid mapping.

Specifically, the zero-padding and interleaving grid mapping is to perform zero-padding and interleaving on the symbol sequence according to grid mapping pattern information and perform resource mapping on the zero-padded and interleaved sequence.

Specifically, the direct zero-inserting grid mapping is to perform zero-inserting on the symbol sequence according to grid mapping pattern information, and perform resource mapping on the zero-inserted sequence.

Specifically, the interleaving and zero-inserting grid mapping is to perform interleaving on the symbol sequence according to grid mapping pattern information, generate an interleaved sequence, and perform zero-inserting on the interleaved sequence according to the grid mapping pattern information.

Specifically, the interleaving grid mapping is to perform interleaving on the symbol sequence according to grid mapping pattern information, and perform resource mapping on the interleaved sequence.

Specifically, the direct grid mapping is to perform resource mapping on the symbol sequence according to the grid mapping pattern information.

Specifically, the codebook grid mapping is to perform codebook mapping on the symbol sequence on the basis of a codebook contained in the grid mapping pattern information, and perform resource mapping on the codebook mapped sequence.

Specifically, the codebook interleaving grid mapping is to perform codebook mapping on the symbol sequence on the basis of a codebook contained in the grid mapping pattern information, then perform interleaving on the codebook mapped symbol sequence on the basis of a symbol-level interleaving pattern contained in the grid mapping pattern information, and finally perform resource mapping on the interleaved sequence, or the codebook interleaving grid mapping is to perform interleaving on the symbol sequence on the basis of a symbol-level interleaving pattern contained in the grid mapping pattern information, then perform codebook mapping on the interleaved symbol sequence on the basis of a codebook contained in the grid mapping pattern information, and finally perform resource mapping on the mapped sequence.

The transmitter acquires total power allocated thereto in a method including but not limited to any one of physical broadcast channels, physical downlink control channels, and physical downlink shared channels.

Preferably, a grid mapping pattern of a corresponding size and/or a corresponding density is selected according to the method of channel coding and the method of symbol modulation employed by the transmitter as well as the size of time-frequency resources allocated to the transmitter.

Preferably, power for performing symbol modulation by the modulation module 330 is determined by the total power allocated to the transmitter and by the density of the grid mapping pattern.

Preferably, the density of the grid mapping pattern is determined by a ratio of the number of non-zero values or the number of non-idle resources in grid mapping pattern information to the total number of time-frequency resources allocated to the transmitter.

Preferably, the grid mapping pattern information includes the density of a grid mapping pattern.

The transmitter acquires total power allocated thereto in a method including but not limited to any one of physical broadcast channels, physical downlink control channels, and physical downlink shared channels.

Figure 36:
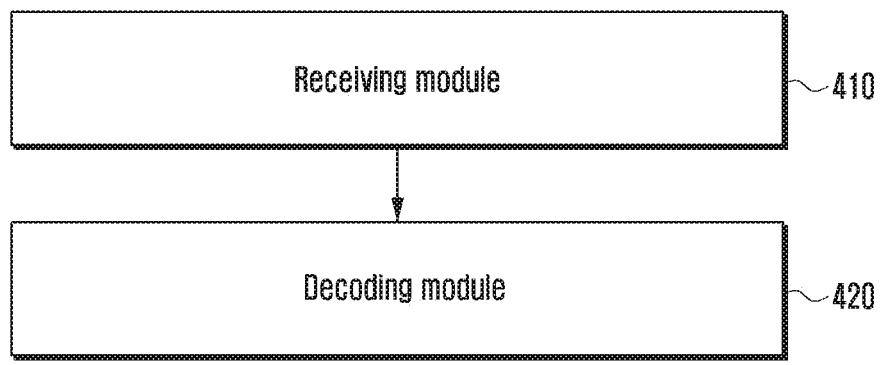
FIG. 36 is a structure diagram of a receiver for multiple access according to an embodiment of the present disclosure.

FIG. 36 is a schematic structure diagram of a receiver for multiple access according to an embodiment of the present.

Referring to FIG. 36, the receiver includes a receiving module 410 and a decoding module 420. The receiving module 410 receives a mixed signal from multiple transmitters, and the mixed signal is a signal obtained by performing grid mapping on data or a signal obtained by performing interleaving and grid mapping on data by each of the multiple transmitters; and the decoding module 420 decodes the mixed signal according to grid mapping pattern information corresponding to each of the transmitters or according to interleaving pattern information or scrambling code information and grid mapping pattern information corresponding to each of the transmitters to obtain data from each of the transmitters.

Preferably, the decoding module 420 is specifically configured to perform de-mapping on the mixed signal by using grid mapping pattern information corresponding to each of the transmitters; or, perform de-mapping on the mixed signal by using grid mapping pattern information corresponding to each of the transmitters, and perform de-interleaving on the de-mapped data by using interleaving pattern information or scrambling code information corresponding to each of the transmitters.

The method of decoding the mixed signal by the decoding module 420 includes but is not limited to any one of performing grid de-mapping and de-interleaving, by the receiver, on the mixed signal respectively according to same grid mapping pattern information and mutually different interleaving pattern information or scrambling code information corresponding to each of the transmitters, performing grid de-mapping and de-interleaving, by the receiver, on the mixed signal respectively according to mutually different grid mapping pattern information and same interleaving pattern information or scrambling code information corresponding to each of the transmitters, and performing grid de-mapping and de-interleaving, by the receiver, on the mixed signal respectively according to mutually different combinations of grid mapping pattern information and interleaving pattern information or scrambling code information corresponding to each of the transmitters.

Preferably, the receiver performs de-interleaving on the de-mapped data according to mutually different interleaving pattern information or scrambling code information, if the mixed signal is a signal received by the receiver and obtained by performing, by each of the transmitters, interleaving according to mutually different interleaving pattern information or scrambling code information and grid mapping on data to be transmitted.

Preferably, the receiver performs grid de-mapping on the mixed signal according to mutually different grid mapping pattern information, if the mixed signal is a signal received by the receiver and obtained by performing, by each of the transmitters, grid mapping on the interleaved data according to mutually different grid mapping pattern information.

Preferably, the receiver performs grid de-mapping and de-interleaving on the mixed signal according to mutually different combinations of interleaving pattern information or scrambling code information and grid mapping pattern information, if the mixed signal is a signal received by the receiver and obtained by performing, by each of the transmitters, interleaving and grid mapping on data to be transmitted according to mutually different combinations of interleaving pattern information or scrambling code information and grid mapping pattern information.

The mutually different combinations of interleaving pattern information and grid mapping pattern information specifically include but are not limited to any one combination method of the interleaving pattern information or scrambling code information is the same while the grid mapping pattern information is mutually different, the interleaving pattern information or scrambling code information is mutually different while the grid mapping pattern information is the same, and the interleaving pattern information or scrambling code information is mutually different and the grid mapping pattern information is mutually different.

The decoded data, obtained by performing, by the receiver, grid de-mapping and de-interleaving on the mixed signal according to the mutually different combinations of interleaving pattern information or scrambling code information and grid mapping pattern information corresponding to each of the transmitters, are mutually different.

Preferably, the receiver further includes a pattern determination module (not shown), and the pattern determination module determines interleaving pattern information or scrambling code information and grid mapping pattern information employed by the multiple transmitters according to network load.

Determining interleaving pattern information or scrambling code information and grid mapping pattern information employed by the multiple transmitters according to network load specifically includes but is not limited to any one situation of determining that the multiple transmitters employ mutually different interleaving pattern information or scrambling code information or mutually different grid mapping pattern information, when the network load is lower than or equal to a preset threshold, and determining that the multiple transmitters employ the mutually different combinations of interleaving pattern information or scrambling code information and grid mapping pattern information, when the network load is higher than the preset threshold.

Preferably, the mixed signal is a signal received by the receiver and obtained by performing, by each of the transmitters, multi-carrier modulation or single-carrier modulation on the respective grid-mapped data and performing baseband-to-RF process on the carrier modulated data.

More preferably, the receiver further includes a conversion module (not shown) and a demodulation module (not shown), and the conversion module performs RF-to-baseband processing on the received mixed signal, and the demodulation module demodulates the converted data in a method of multi-carrier modulation or single-carrier modulation corresponding to each of the transmitters.

The method of performing multi-carrier modulation includes but is not limited to at least any one of OFDM multi-carrier modulation; filtering-based OFDM multi-carrier modulation, filter-bank multi-carrier modulation, and universal-filtered multi-carrier modulation. The single-carrier modulation at least includes SC-FDMA.

The receiving module 410 receives a signal from a same transmitter, and the signal is a signal obtained by performing grid mapping on data or obtained by performing interleaving and grid mapping on multiple data streams from the same transmitter, and the decoding module 420 decodes the signal according to interleaving pattern information or scrambling code information and grid mapping pattern information corresponding to each of the data streams or according to grid mapping pattern information corresponding to each of the data streams, to obtain the multiple data streams from the same transmitter.

The receiver performs de-interleaving on the de-mapped data according to mutually different interleaving pattern information or scrambling code information, if the signal received by the receiver is obtained by performing, on the multiple data streams from the same transmitter, interleaving by use of mutually different interleaving pattern information or scrambling code information and grid mapping.

The receiver performs grid de-mapping on the received signal according to mutually different grid mapping pattern information, if the signal received by the receiver is obtained by performing grid mapping on the interleaved data of the multiple data streams from the same transmitter by use of mutually different grid mapping pattern information.

The receiver performs de-interleaving and grid de-mapping on the received data according to mutually different combinations of interleaving pattern information or scrambling code information and grid mapping pattern information, if the signal received by the receiver is obtained by performing interleaving and grid mapping on the multiple data streams from the same transmitter by use of the mutually different combinations of interleaving pattern information or scrambling code information and grid mapping pattern information.

The signal received by the receiver is obtained by performing, on the multiple data streams from the same transmitter, interleaving and grid mapping or performing grid mapping and then phase and power adjustment.

The receiver performs grid de-mapping on a signal of the multiple data streams from the same transmitter according to mutually different grid mapping pattern information, when the receiver performs de-interleaving on the de-mapped data from the multiple transmitters according to mutually different interleaving pattern information or scrambling code information.

The receiver performs de-interleaving on the de-mapped data of the multiple data streams from the same transmitter according to mutually different interleaving pattern information or scrambling code information, when the receiver performs grid de-mapping on a mixed signal from the multiple transmitters according to mutually different grid mapping pattern information.

The receiver performs grid de-mapping and de-interleaving on a signal of the multiple data streams from different transmitters according to mutually different combinations of interleaving pattern information or scrambling code information and grid mapping pattern information.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A transmission method for non-orthogonal multiple access by a transmission apparatus, the method comprising:
    performing channel coding on a bit sequence to determine a coded sequence;
    interleaving the coded sequence based on interleaving pattern information corresponding to the transmission apparatus;
    modulating the interleaved sequence;
    mapping the modulated interleaved sequence to determine a mapped sequence for the non-orthogonal multiple access based on grid mapping pattern information corresponding to the transmission apparatus; and
    transmitting the mapped sequence to a reception apparatus,
    wherein the interleaving pattern information and the grid mapping pattern information are used to distinguish signals transmitted from the transmission apparatus, and
    wherein the grid mapping pattern information is determined based on a ratio of a number of resources to which the modulated interleaved sequence is to be mapped in the grid mapping pattern information to a total number of resources allocated to the transmission apparatus.

2. The method of claim 1,
    wherein the interleaving of the coded sequence comprises interleaving the coded sequence by scrambling code information corresponding to the transmission apparatus, and
    wherein the interleaving pattern information or the scrambling code information is transmitted via one of a physical broadcast channel, a physical downlink control channel, or a physical downlink shared channel.

3. The method of claim 1,
    wherein the grid mapping pattern information includes density of the grid mapping pattern information.

4. The method of claim 1, wherein the mapping of the modulated interleaved sequence comprises:
    segmenting the modulated interleaved sequence, and
    successively mapping the modulated interleaved sequence segments obtained by the segmentation.

5. A reception method for non-orthogonal multiple access by a reception apparatus, the method comprising:
    receiving a signal from multiple transmission apparatuses;
    de-mapping the signal including a mapped sequence for the non-orthogonal multiple access based on grid mapping pattern information corresponding to each of the transmission apparatuses;
    de-interleaving the de-mapped signal based on interleaving pattern information corresponding to each of the transmission apparatuses; and
    decoding the de-interleaved signal to obtain a bit sequence transmitted from each of the transmission apparatuses,
    wherein the interleaving pattern information and the grid mapping pattern information are used to distinguish signals transmitted from the transmission apparatuses, and
    wherein the grid mapping pattern information is determined based on a ratio of a number of resources to which a modulated interleaved sequence is to be mapped in the grid mapping pattern information to a total number of resources allocated to the transmission apparatus.

6. The method of claim 5,
    wherein the de-mapping of the signal comprises de-interleaving the de-mapped signal by using scrambling code information corresponding to each of the transmission apparatuses, and
    wherein the interleaving pattern information or the scrambling code information is received via one of a physical broadcast channel, a physical downlink control channel, or a physical downlink shared channel.

7. The method of claim 5,
wherein the grid mapping pattern information includes density of the grid mapping pattern information.

8. A reception apparatus for non-orthogonal multiple access, the reception apparatus comprising:
a receiver; and
at least one processor configured to:
control the receiver to receive a signal from multiple transmission apparatuses,
de-map the signal including a mapped sequence for the non-orthogonal multiple access based on grid mapping pattern information corresponding to each of the transmission apparatuses,
de-interleave the de-mapped signal based on interleaving pattern information corresponding to each of the transmission apparatuses, and
decode the de-interleaved signal to obtain a bit sequence transmitted from each of the transmission apparatuses,
wherein the interleaving pattern information and the grid mapping pattern information are used to distinguish signals transmitted from the transmission apparatuses, and
wherein the grid mapping pattern information is determined based on a ratio of a number of resources to which a modulated interleaved sequence is to be mapped in the grid mapping pattern information to a total number of resources allocated to the transmission apparatus.

9. The reception apparatus of claim 8,
wherein the at least one processor is further configured to de-interleave the de-mapped signal by using scrambling code information corresponding to each of the transmission apparatuses, and
wherein the interleaving pattern information or the scrambling code information is received via one of a physical broadcast channel, a physical downlink control channel, or a physical downlink shared channel.

10. The reception apparatus of claim 8,
wherein the grid mapping pattern information includes density of the grid mapping pattern information.

11. A transmission apparatus for non-orthogonal multiple access, the transmission apparatus comprising:
a transmitter; and
at least one processor configured to:
perform channel coding on a bit sequence to determine a coded sequence,
interleave the coded sequence based on interleaving pattern information corresponding to the transmission apparatus,
modulate the interleaved sequence,
map the modulated interleaved sequence to determine a mapped sequence for the non-orthogonal multiple access based on grid mapping pattern information corresponding to the transmission apparatus, and
control the transmitter to transmit the mapped sequence to a reception apparatus,
wherein the interleaving pattern information and the grid mapping pattern information are used to distinguish signals transmitted from the transmission apparatus, and
wherein the grid mapping pattern information is determined based on a ratio of a number of resources to which the modulated interleaved sequence is to be mapped in the grid mapping pattern information to a total number of resources allocated to the transmission apparatus.

12. The transmission apparatus of claim 11,
wherein the at least one processor is further configured to interleave the coded sequence by scrambling code information corresponding to the transmission apparatus, and
wherein the interleaving pattern information or the scrambling code information is transmitted via one of a physical broadcast channel, a physical downlink control channel, or a physical downlink shared channel.

13. The transmission apparatus of claim 11,
wherein the grid mapping pattern information includes density of the grid mapping pattern.

14. The transmission apparatus of claim 11, wherein the at least one processor is further configured to:
segment the modulated interleaved sequence, and
successively map the modulated interleaved sequence segments obtained by the segmentation.

* * * * *